(12) United States Patent
Sato et al.

(10) Patent No.: US 9,690,378 B2
(45) Date of Patent: Jun. 27, 2017

(54) OPERATION APPARATUS

(71) Applicants: OLYMPUS IMAGING CORP., Shibuya-ku, Tokyo (JP); Olympus Corporation, Shibuya-ku, Tokyo (JP)

(72) Inventors: Kazuhiro Sato, Sagamihara (JP); Sumio Kawai, Hachioji (JP); Osamu Nonaka, Sagamihara (JP); Shinsuke Homma, Hino (JP)

(73) Assignee: OLYMPUS CORPORATION, Tokyo (JP)

(*) Notice: Subject to any disclaimer, the term of this patent is extended or adjusted under 35 U.S.C. 154(b) by 104 days.

(21) Appl. No.: 14/168,790

(22) Filed: Jan. 30, 2014

(65) Prior Publication Data

US 2014/0210601 A1    Jul. 31, 2014

(30) Foreign Application Priority Data

Jan. 30, 2013 (JP) ................ 2013-016076
Mar. 15, 2013 (JP) ................ 2013-053888
Mar. 15, 2013 (JP) ................ 2013-054029
Mar. 28, 2013 (JP) ................ 2013-069800

(51) Int. Cl.
*G06F 3/01* (2006.01)
*G06F 3/041* (2006.01)

(52) U.S. Cl.
CPC .............. *G06F 3/016* (2013.01); *G06F 3/041* (2013.01)

(58) Field of Classification Search
CPC ................ G06F 3/016; G06F 3/041
See application file for complete search history.

(56) References Cited

U.S. PATENT DOCUMENTS 8,325,214 B2*  12/2012  Hildreth ........... H04N 7/147
                                                348/14.03
2005/0057528 A1*  3/2005  Kleen ............... G06F 3/016
                                                345/173
2009/0091650 A1   4/2009  Kodama
2010/0134433 A1   6/2010  Miyanishi
(Continued)

FOREIGN PATENT DOCUMENTS

CN    101393480 A    3/2009
CN    102217299 A    10/2011
(Continued)

OTHER PUBLICATIONS

Office Action mailed is corresponding Japanese Patent Application No. 2013-016076 on Oct. 18, 2016, consisting of 6 pp. (English Translation Provided).
(Continued)

*Primary Examiner* — Andrew Sasinowski
(74) *Attorney, Agent, or Firm* — Volpe and Koenig, P.C.

(57) ABSTRACT

A touch operation device includes a piezoelectric element, a touch detection unit, and a piezoelectric body control circuit. The piezoelectric element has a piezoelectric property and flexibility. The touch detection unit is disposed to correspond to the piezoelectric element and detects a touch operation. The piezoelectric body control circuit selectively applies a signal to a part of the piezoelectric element corresponding to the touch operation detected by the touch detection unit and then bends the part of the piezoelectric element.

22 Claims, 41 Drawing Sheets

(56) References Cited

U.S. PATENT DOCUMENTS

| | | | |
|---|---|---|---|
| 2010/0231541 A1* | 9/2010 | Cruz-Hernandez | G06F 3/0488 345/173 |
| 2010/0328053 A1 | 12/2010 | Yeh | |
| 2011/0304550 A1* | 12/2011 | Romera Jolliff | G06F 3/016 345/168 |
| 2012/0015176 A1* | 1/2012 | Riebel | B32B 27/06 428/323 |

FOREIGN PATENT DOCUMENTS

| | | |
|---|---|---|
| JP | 09-325688 | 12/1997 |
| JP | 2001-025034 | 1/2001 |
| JP | 2003-058321 | 2/2003 |
| JP | 2005-078644 A | 3/2005 |
| JP | 2008-070983 A | 3/2008 |
| JP | 2009-009412 A | 1/2009 |
| JP | 2009-089174 A | 4/2009 |
| JP | 2009-098899 A | 5/2009 |
| JP | 2010-044580 A | 2/2010 |
| JP | 2010-134587 A | 6/2010 |
| JP | 2010-211509 A | 9/2010 |
| JP | 2010-257215 A | 11/2010 |
| JP | 2011-002926 A | 1/2011 |
| JP | 2011-008749 A | 1/2011 |
| JP | 2011-146821 A | 7/2011 |
| JP | 2011-166306 A | 8/2011 |
| JP | 2012-156607 | 8/2012 |
| JP | 2012-216156 A | 11/2012 |
| JP | 2012-232497 A | 11/2012 |
| JP | 2013-008151 | 1/2013 |
| JP | 2013-009106 | 1/2013 |

OTHER PUBLICATIONS

Office Action mailed is corresponding Japanese Patent Application No. 2013-053888 on Nov. 22, 2016, consisting of 7 pp. (English Translation Provided).

Office Action issued is corresponding Chinese Patent Application No. 201410044193.0 on Oct. 10, 2016, consisting of 41 pp. (English Translation Provided).

Office Action mailed is corresponding Japanese Patent Application No. 2013-069800 on Jan. 24, 2017, consisting of 4 pp. (English Translation Provided).

Office Action mailed is corresponding Japanese Patent Application No. 2013-016076 on Feb. 21, 2017, consisting of 5 pp. (English Translation Provided).

Office Action mailed is corresponding Japanese Patent Application No. 2013-053888 on Mar. 7, 2017, consisting of 7 pp. (English Translation Provided).

* cited by examiner

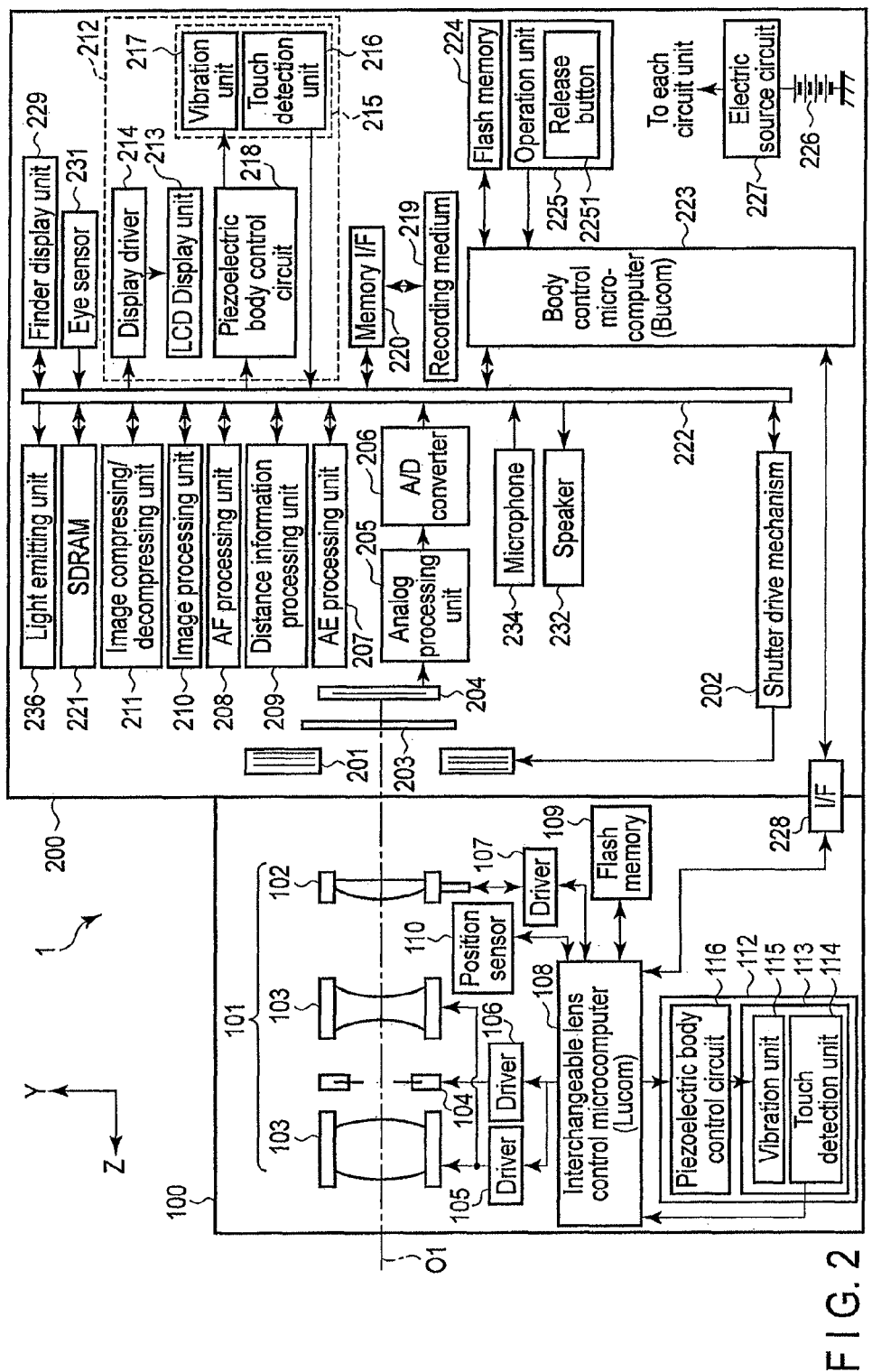
F I G. 2

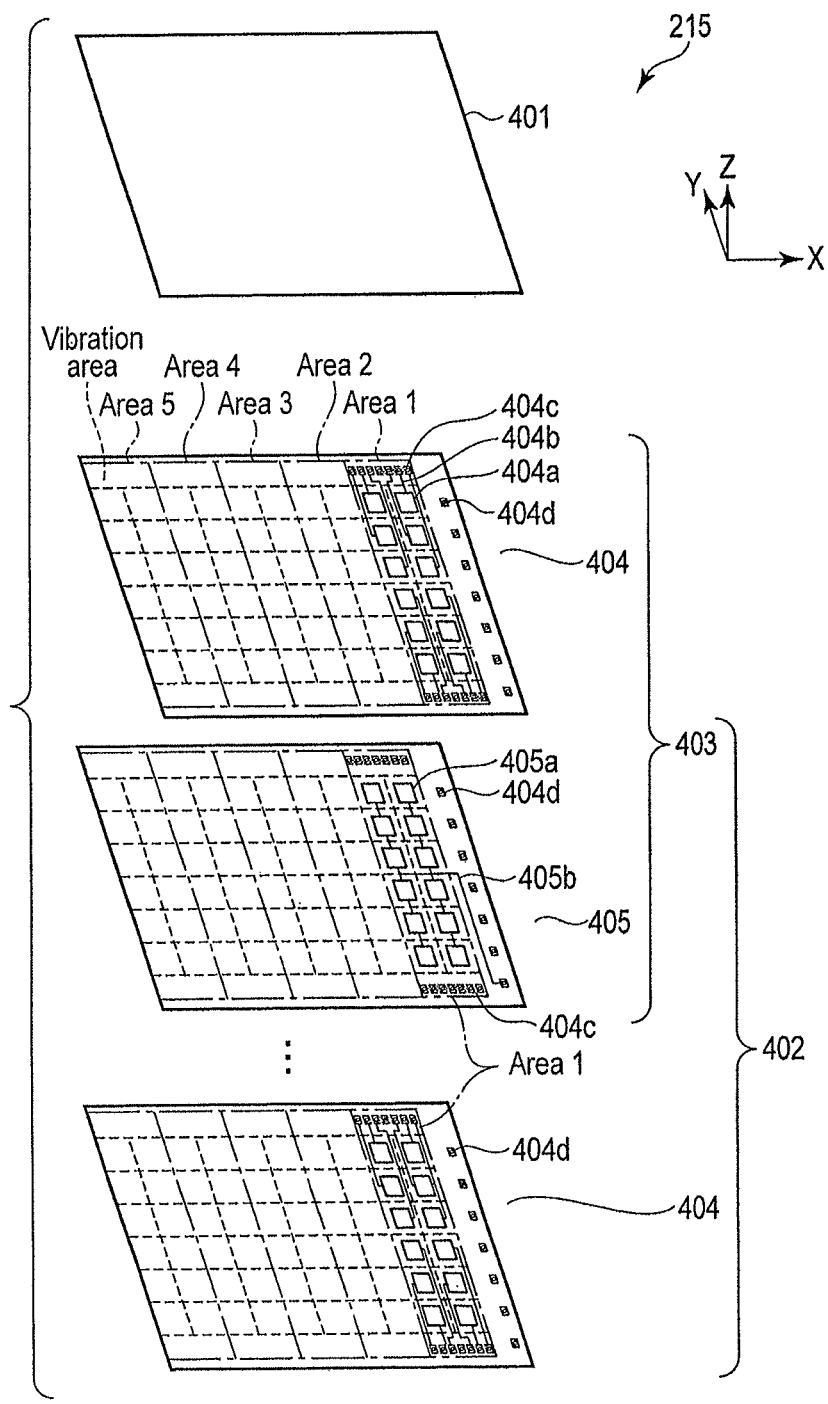
F I G. 5A

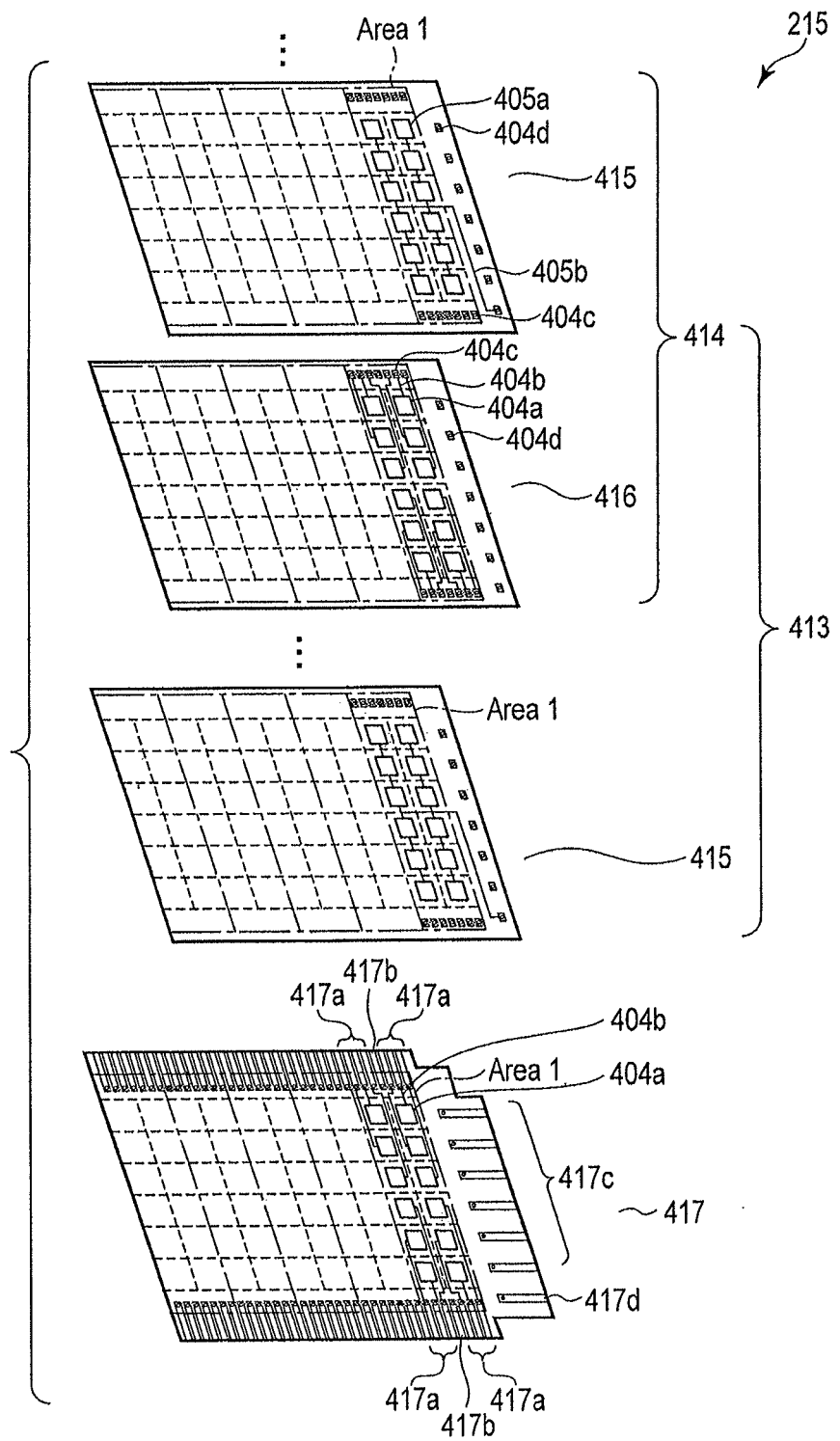
F I G. 5C

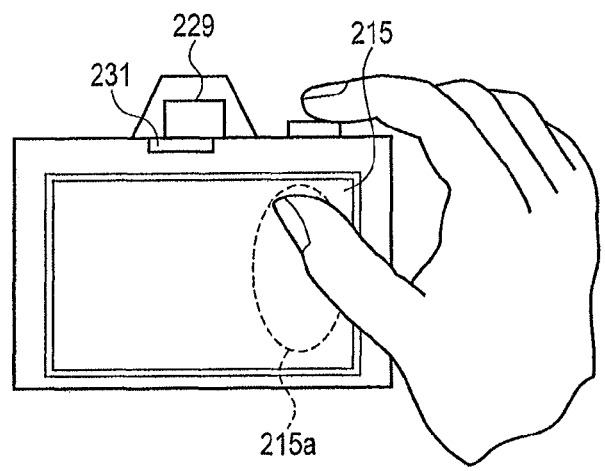
F I G. 11
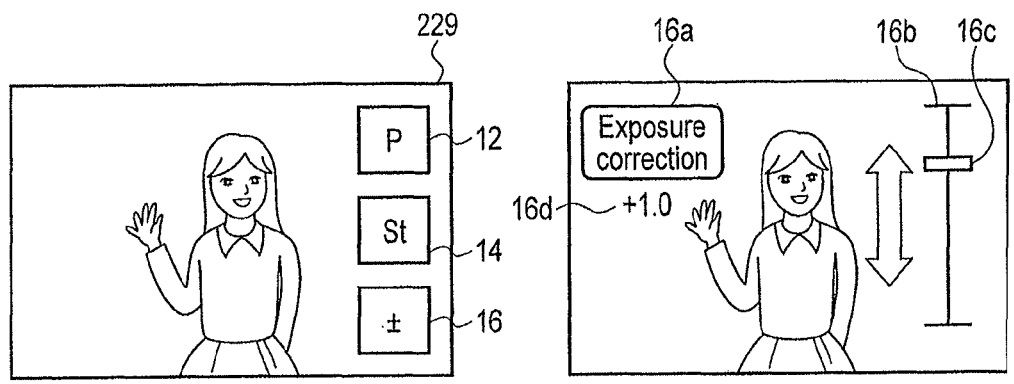
F I G. 12A    F I G. 12B

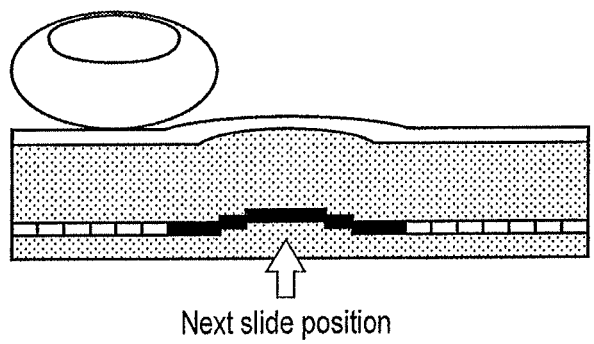
Next slide position
F I G. 16
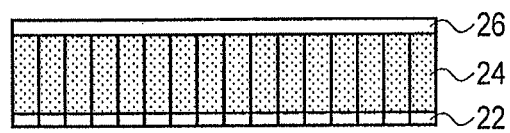
F I G. 17

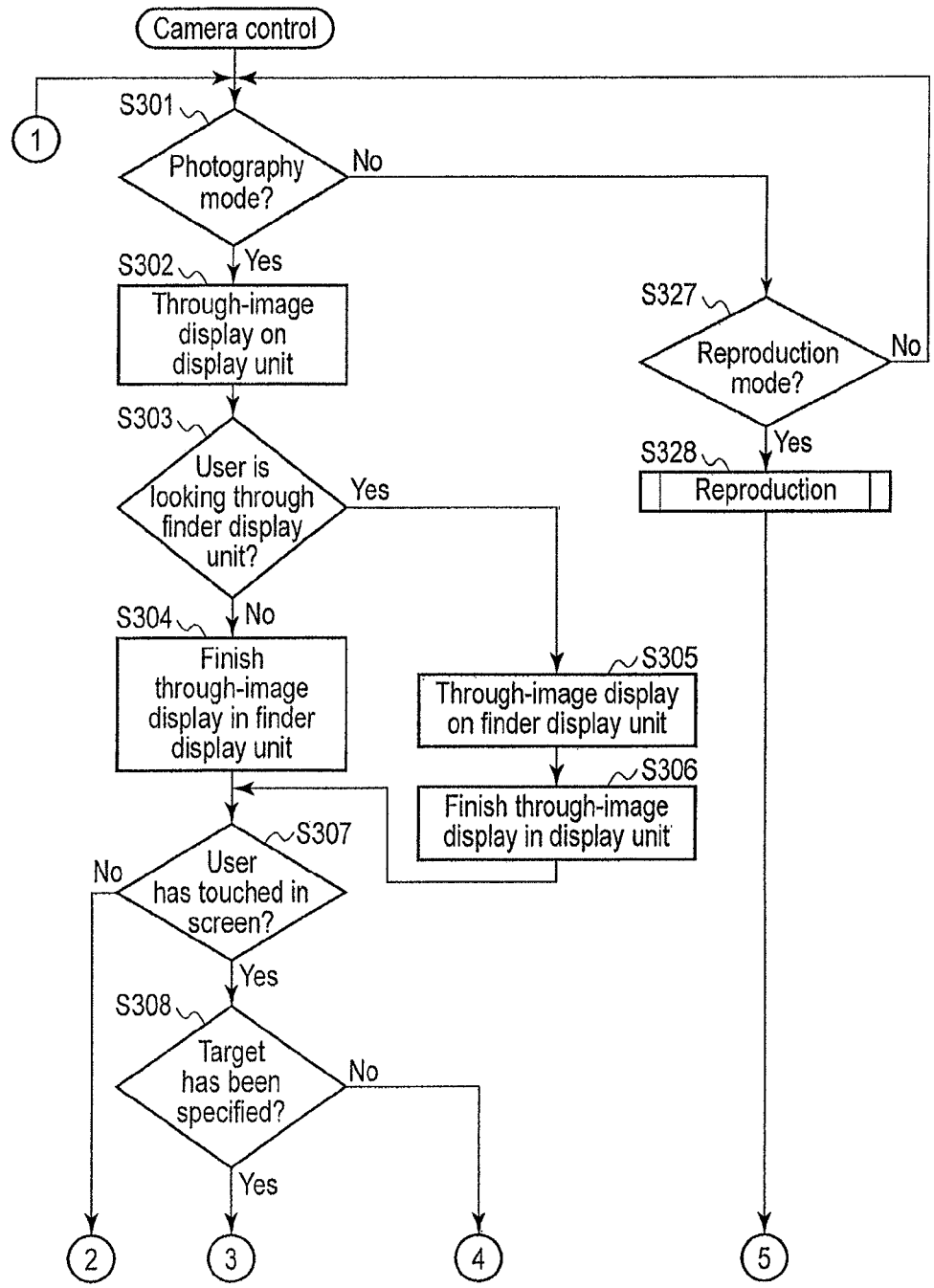
F I G. 18A

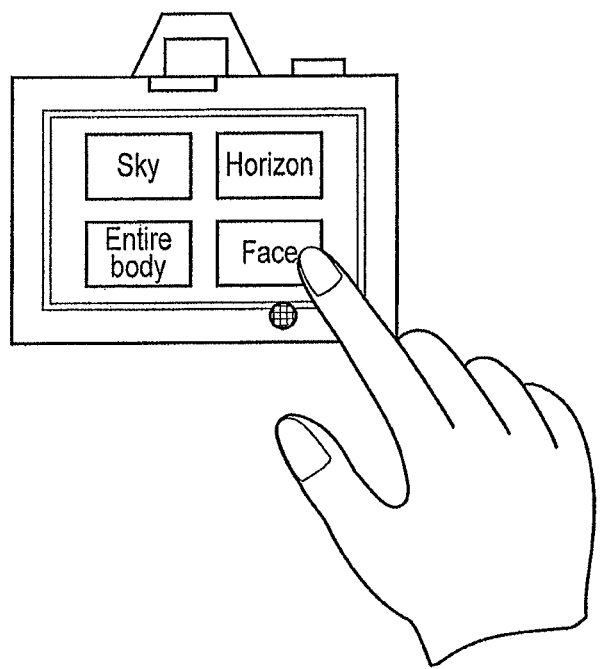
F I G. 19
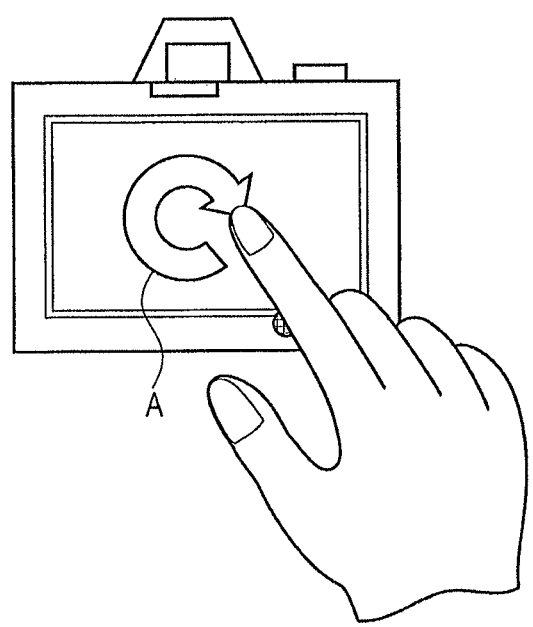
F I G. 20

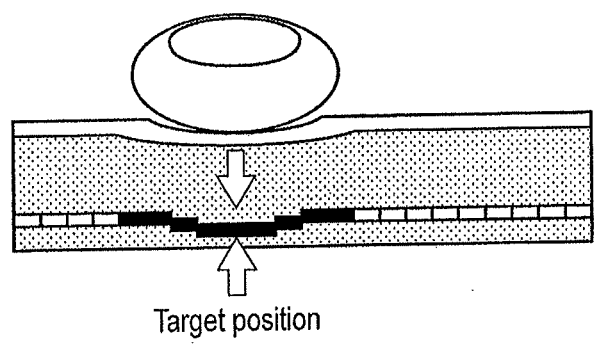
Target position
F I G. 22
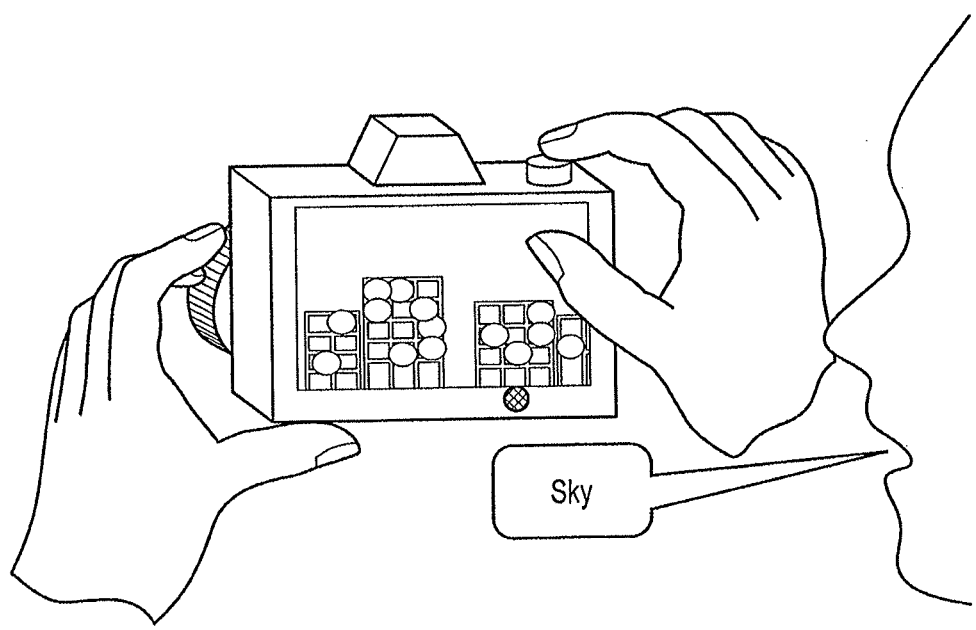
Sky
F I G. 23

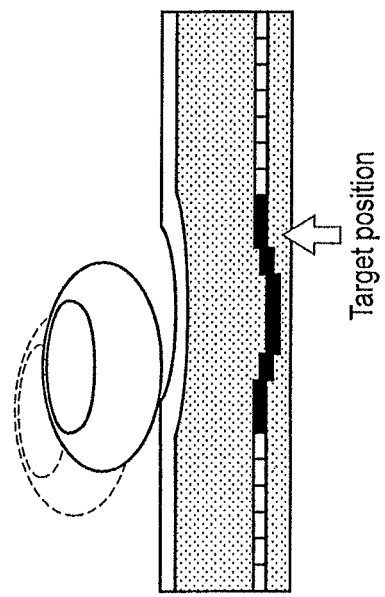
F I G. 24B
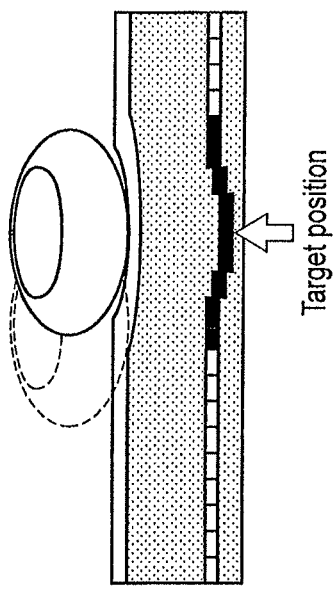
F I G. 24A

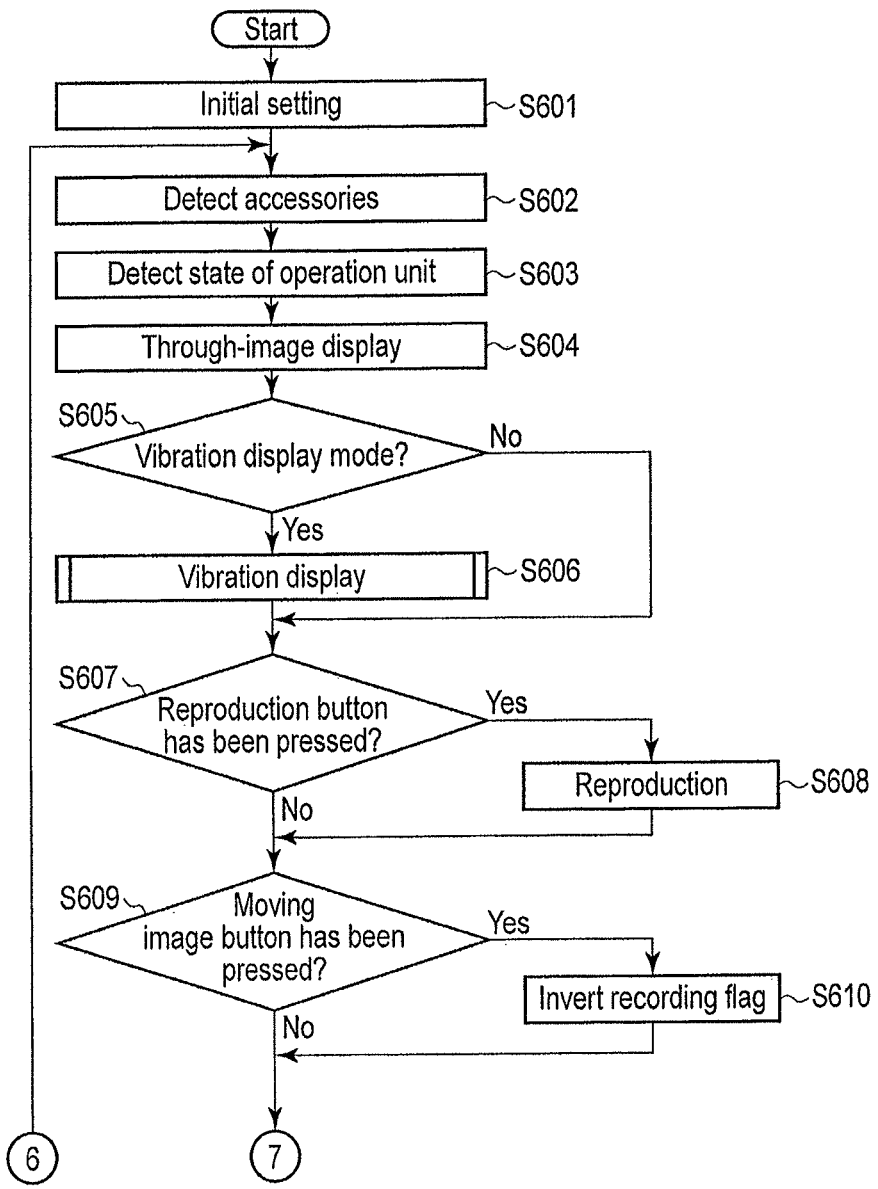
F I G. 28A

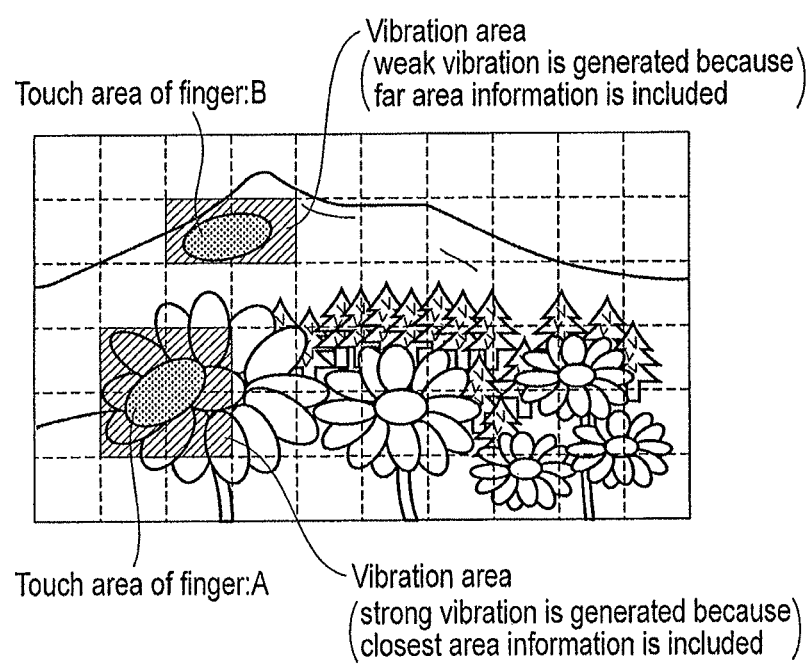
F I G. 30

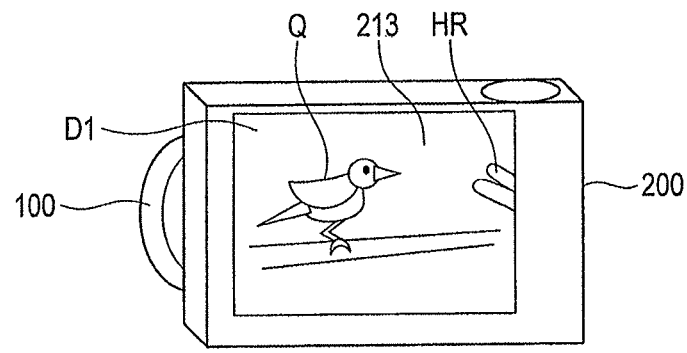
F I G. 35
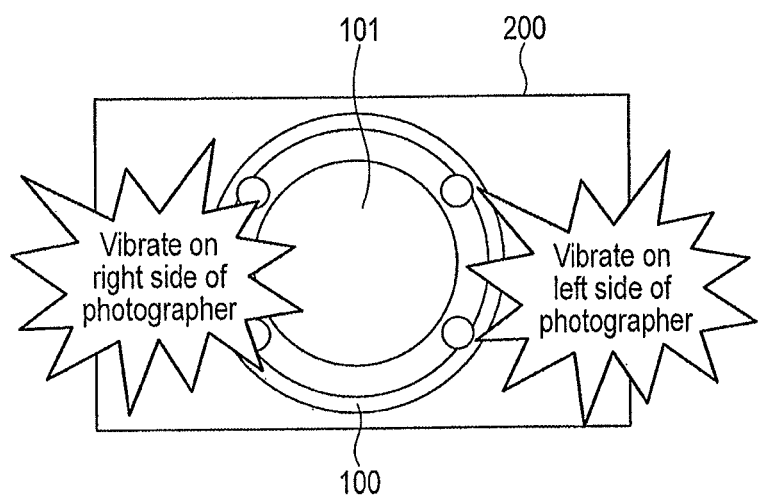
F I G. 36

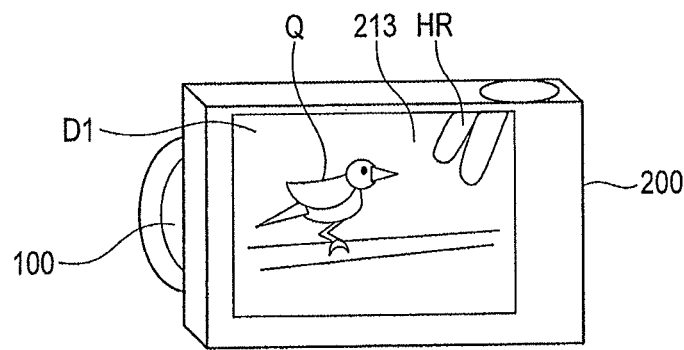
F I G. 37
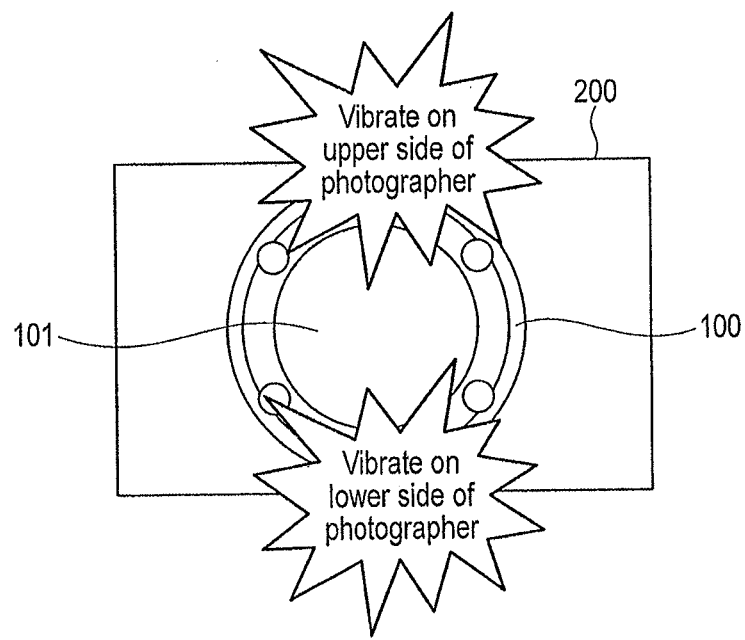
F I G. 38

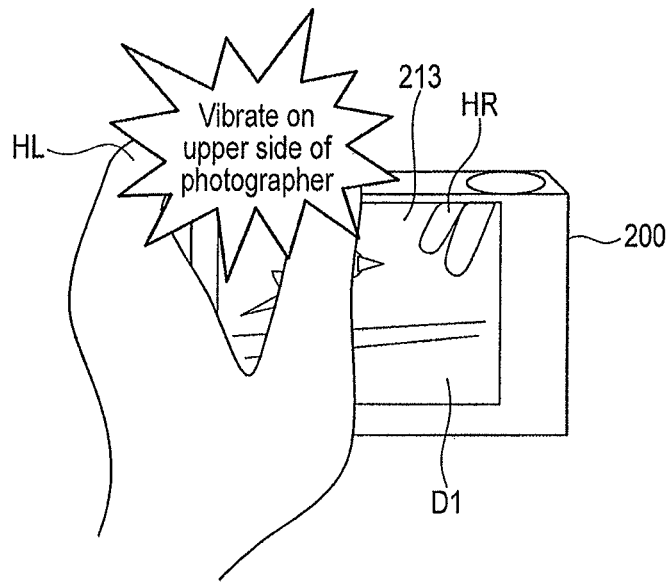
F I G. 39
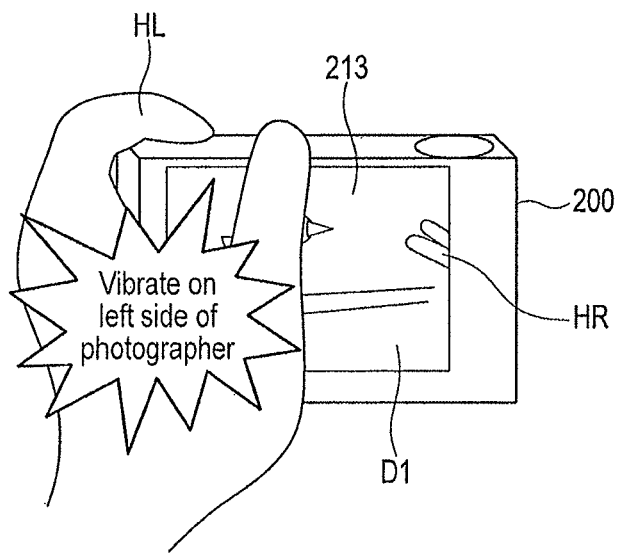
F I G. 40

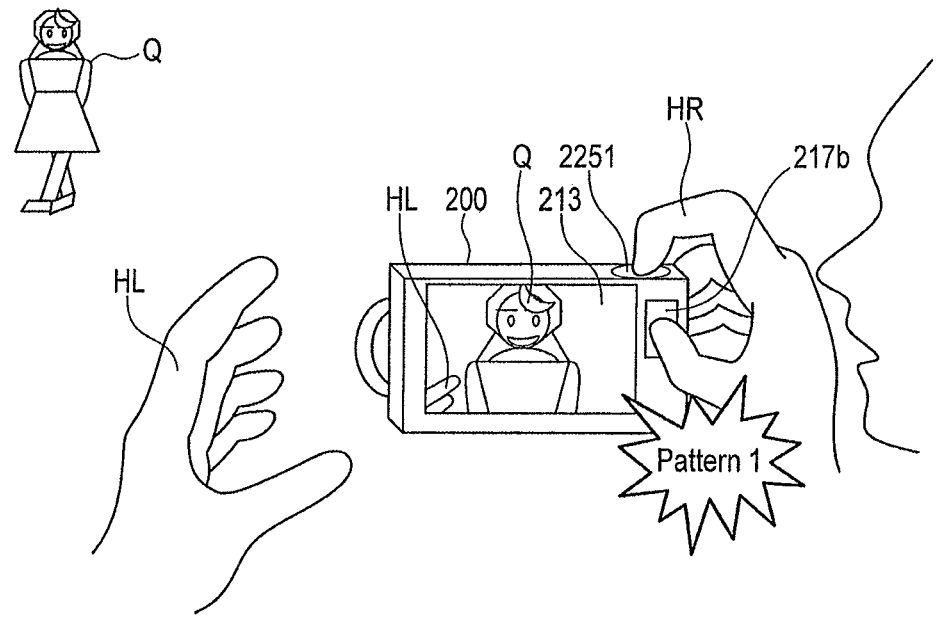
F I G. 44
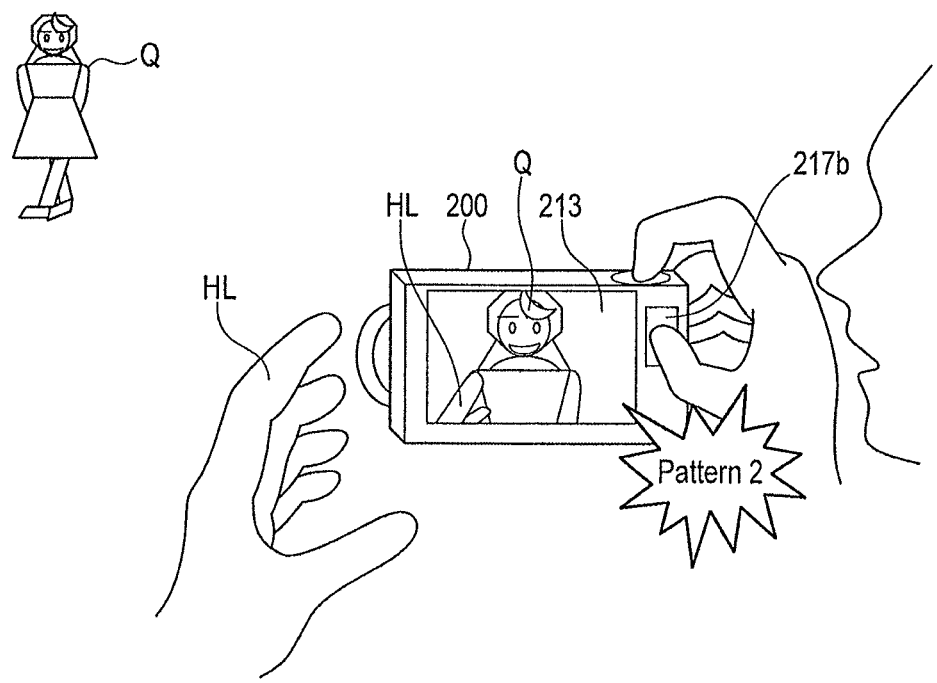
F I G. 45

OPERATION APPARATUS

CROSS-REFERENCE TO RELATED APPLICATIONS

This application is based upon and claims the benefit of priority from the prior Japanese Patent Application No. 2013-016076, filed Jan. 30, 2013, No. 2013-054029, filed Mar. 15, 2013, No. 2013-053888, filed Mar. 15, 2013, and No. 2013-069800, filed Mar. 28, 2013, the entire contents of all of which are incorporated herein by reference.

BACKGROUND OF THE INVENTION

1. Field of the Invention

The present invention relates to an operation apparatus.

2. Description of the Related Art

Recently, digital cameras capable of not only still image photography but also moving image photography have been on the market. The digital camera has a display unit such as a liquid crystal display (LCD). A user can check a subject before photography from an image displayed on the display unit, or immediately check an acquired image. However, the size increase of a display unit of a portable device is limited, the operation cannot always concentrate on this part. Accordingly, an operation that is performed without seeing is required, and is particularly greatly needed in the scene of active use or in the use in a dangerous situation. When acquiring a still image or moving images and when enjoying the acquired picture or moving images, a visually impaired person is not able to visually perceive the images. Even a physically unimpaired person wishes to perceive images in ways other than visual perception, more easily perform photography, and more enjoy images.

In response to such needs, an apparatus which conveys information regarding a subject in ways other than visual perception has been suggested in Jpn. Pat. Appln. KOKAI Publication No. 2013-9106. The camera suggested in Jpn. Pat. Appln. KOKAI Publication No. 2013-9106 has a tactile notification unit which uses vibration to notify the user in a tactile manner of whether a particular subject recognized by a subject recognition unit is located in a predetermined region of an acquire image.

In the meantime, an electronic device which generates vibration in an operation unit disposed to correspond to a display panel has been suggested in Jpn. Pat. Appln. KOKAI Publication No. 2013-8151. The electronic device according to Jpn. Pat. Appln. KOKAI Publication No. 2013-8151 detects an operation position on the display panel and vibrates the part at the detected operation position when the user operates the operation unit corresponding to an operation display displayed on the display panel. Thus, the electronic device according to Jpn. Pat. Appln. KOKAI Publication No. 2013-8151 provides the user with, for example, the sense of pressing, the sense of tracing, and the sense of touching.

Furthermore, Jpn. Pat. Appln. KOKAI Publication No. 2001-25034 has suggested, in order to correctly convey image information to a physically unimpaired person, converting image information to embossed image information having embossed dot information, and displaying a perspective protruding and depressed image on a protruding and depressed display device having a surface embossed in accordance with the embossed image information.

BRIEF SUMMARY OF THE INVENTION

A touch operation device according to a first aspect of the invention comprises: a piezoelectric element having a piezoelectric property and flexibility; a touch detection unit which is disposed to correspond to the piezoelectric element and which detects a touch operation; and a piezoelectric body control circuit which selectively applies a signal to a part of the piezoelectric element corresponding to the touch operation detected by the touch detection unit and then bends the part of the piezoelectric element.

An information device according to a second aspect of the invention comprises: a touch detection unit which has detection points associated with positions of an image and which detects a touch operation on the detection points by a user; a target specifying unit which specifies a target to be photographed or reproduced; a sensory stimulation providing unit which provides a sensory stimulation to the user; and a control unit which uses the sensory stimulation providing unit to provide the sensory stimulation in accordance with positional relation between the position of the target in the image and a touch position detected by the touch detection unit.

An interface device according to a third aspect of the invention comprises: a display unit which displays an image; a touch detection unit which is disposed to correspond to a display region of the display unit and which detects a touch operation; a vibration unit which is disposed to correspond to the display region of the display unit and which provides tactile information for each part of the display region; a region information generating unit which generates region information regarding the image; and a control unit which controls the vibration unit so that tactile information corresponding to the region information regarding the image displayed at a position in the display region corresponding to a position where the touch operation is detected by the touch detection unit.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram showing a configuration example of a camera 1;

FIG. 5A, FIG. 5B, and FIG. 5C are exploded perspective views showing the configuration of an example of a vibration unit 217;

FIG. 11 is a diagram showing a touch operation area;

FIG. 12A is a diagram showing a display example of an operation button;

FIG. 12B is a diagram showing a display example in which an exposure button has been selected;

FIG. 16 is a diagram showing an example of the vibration unit control to swell the vibration unit 217 at a position corresponding to a slide direction;

FIG. 17 is a diagram showing a configuration example in which the vibration unit is composed of an array of piezoelectric bodies;

FIG. 18A and FIG. 18B are flowcharts showing the main operation of the camera 1 according to the second embodiment;

FIG. 19 is a diagram showing an example of a menu screen displayed in a target exclusive specifying mode;

FIG. 20 is a diagram showing a modification of a position exclusive specifying mode;

FIG. 22 is a diagram showing an example of the vibration unit control in which a touch position is the same as the position of the target;

FIG. 23 is a diagram showing an operation example of the vibration unit control in which the touch position is the same as the position of the target;

FIG. 24A and FIG. 24B are diagrams showing an example of the vibration unit control in which the touch position is different from the position of the target;

FIG. 28A and FIG. 28B are flowcharts showing the main operation of the camera 1 according to the third embodiment;

FIG. 30 is a diagram illustrating a vibration operation in the vibration display mode;

FIG. 35 is a diagram showing that the right hand has intruded from the right edge of the image on the display unit 213 in the camera 1 according to the fourth embodiment;

FIG. 36 is a schematic diagram showing vibration generated on the right/left (right) side of an interchangeable lens 100 to correspond to the right edge where the right hand has intruded in the camera 1 according to the fourth embodiment;

FIG. 37 is a diagram showing that the right hand has intruded from the upper edge of the image on the display unit 213 in the camera 1 according to the fourth embodiment;

FIG. 38 is a schematic diagram showing vibration generated on the upper (upper/lower) side of the interchangeable lens 100 as on the upper edge where the right hand has intruded in the camera 1 according to the fourth embodiment;

FIG. 39 is a diagram showing vibration generated on the upper side in the camera 1 according to the fourth embodiment;

FIG. 40 is a diagram showing vibration generated on the lower side in the camera 1 according to the fourth embodiment;

FIG. 44 is a diagram illustrating a vibration pattern when fingers have intruded in an imaging range in the camera 1 according to the fifth embodiment;

FIG. 45 is a diagram illustrating a vibration pattern when the fingers have intruded into the imaging range and come into contact with a subject in image data in the camera 1 according to the fifth embodiment;

DETAILED DESCRIPTION OF THE INVENTION

Hereinafter, embodiments of the present invention will be described with reference to the drawings.

First Embodiment

Figure 1B:
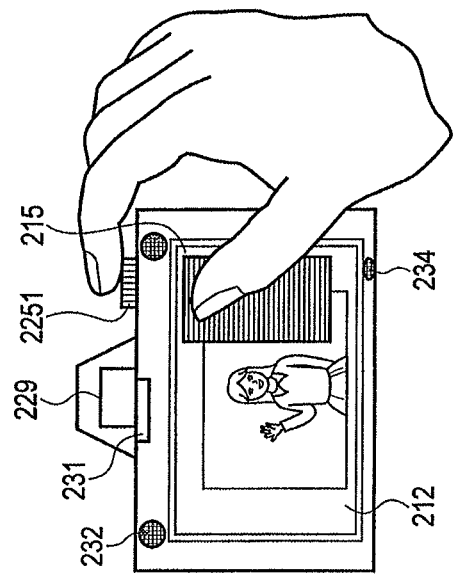
FIG. 1A and FIG. 1B are outside views of a digital camera equipped with a touch operation device according to embodiments of the present invention.
Figure 1A:
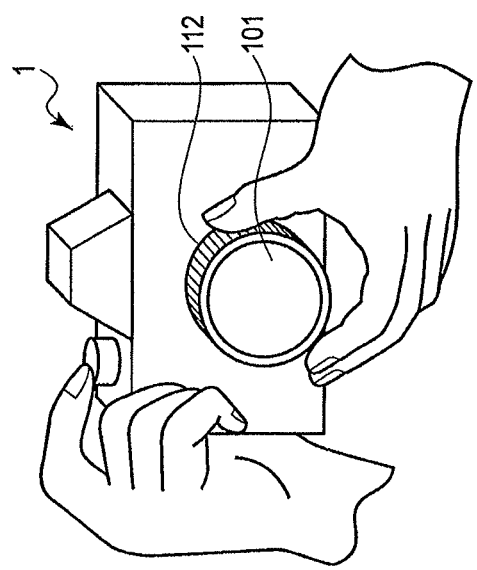

FIG. 1A and FIG. 1B are outside views of a digital camera (hereinafter briefly referred to as a camera) equipped with a touch operation device according to the embodiments of the present invention. Here, FIG. 1A is an outside view showing the camera viewed from the front side (subject side), and FIG. 1B is an outside view showing the camera viewed from the rear side. Although the digital camera is shown by way of example here, the technique according to the present embodiments is also applicable to, for example, a mobile telephone or a portable terminal. This technique is a checking method which not only depends on visual perception but also effectively uses the five senses, and is therefore widely applicable to industrial use and to medical observation equipment. It should be understood that this technique does not impose visual restriction and is therefore applicable to in-vehicle equipment and surveillance cameras.

In the case of the camera, the user often carefully watches the subject to avoid missing a photographic opportunity. In this case, the user concentrates on the subject, and operates the camera without visually checking the camera. According to the present embodiment, the camera can be correctly operated without the visual check. For example, if the user concentrates on a small screen, the user may miss changes outside the screen and run into danger. Even if the situation is not so serious, a conversation partner may change expression, for example, during photography in an interview.

As shown in FIG. 1A, a photographic lens 101 is provided in the front of the body of a camera 1. The photographic lens 101 has a cylindrical lens barrel, and an optical system housed in the lens barrel. In the present embodiment, a touch operation device 112 is formed around the lens barrel. The user can use the touch operation device 112 instead of a focus ring or a zoom ring to perform manual focus or manual zoom.

As shown in FIG. 1B, a display device 212 is provided in the rear surface of the body of the camera 1. In the present embodiment, a touch operation device 215 is formed in the display device 212. The user can use the touch operation device 215 to perform various operations. In the example shown in FIG. 1B, the touch operation device 215 is formed in a part of a display screen of the display device 212. In contrast, the touch operation device 215 may be formed in the entire display screen. In the following, the touch operation device 215 is formed in the entire display screen of the display device 212.

As shown in FIG. 1B, a finder display unit 229 and an eye sensor 231 are provided in the upper part of the rear surface of the body of the camera 1. The camera 1 can also perform, in the finder display unit 229, display similar to that in the display device 212. Whether to display on the display device 212 or on the finder display unit 229 is switched in accordance with a detection result in the eye sensor 231. Details will be described later. A speaker 232 is provided in the upper part of the rear surface of the body of the camera 1. A release button 2252 as an example of an operation unit is provided in the upper part of the camera 1. The release button 2251 is an operational component for the user to instruct the camera 1 to perform photography. The release button 2251 has a piezoelectric element, and is configured to apply a tactile stimulation to the finger of the user as needed. A microphone 234 is provided in the lower part of the rear surface of the body of the camera 1.

FIG. 2 is a block diagram showing a configuration example of the camera 1. As shown in FIG. 2, the camera 1 includes an interchangeable lens 100 and a camera body 200. The interchangeable lens 100 and the camera body 200 are connected to each other to be able to communicate via an interface (I/F) 228. In the following explanation, the direction from the camera body 200 toward the subject is referred to as a forward direction, and the opposite direction is referred to as a backward direction. The axis corresponding to an optical axis O1 of an optical system of the interchangeable lens 100 is a Z-axis, and two axes intersecting at right angles with each other on a plane intersecting at right angles with the Z-axis are an X-axis and a Y-axis.

The interchangeable lens 100 has the photographic lens 101, drivers 105, 106, and 107, an interchangeable lens control microcomputer (Lucom) 108, a flash memory 109, a position sensor 110, and the touch operation device 112.

The photographic lens 101 is an optical system which forms an optical image of the subject, and has a focus lens 102, a variable power lens 103, and a diaphragm 104. The focus lens 102 focuses the optical image of the subject on a light receiving surface of an image pickup device 204 of the camera body 200. The variable power lens 103 changes the magnification of the subject by changing the focal distance of the photographic lens 101. The diaphragm 104 is opened and shut to change the amount of light of the optical image of the subject entering the camera body 200. The focus lens 102 may be configured to be independently driven, and may also be configured to be driven together with the variable power lens 103 when the variable power lens 103 is driven. The lenses shown in FIG. 2 may be single lenses, or each of the lenses may be composed of multiple lenses. Moreover, an optical element such as an optical filter may be included between the lenses shown in FIG. 2.

The driver 105 drives the variable power lens 103 in the optical axis O1 direction to change the magnification of the photographic lens 101. The driver 106 drives a diaphragm blade of the diaphragm 104 to adjust the amount of the light of the optical image of the subject. The driver 107 drives the focus lens 102 in the optical axis O1 direction to focus the photographic lens 101. The drivers 105 and 107 have actuators such as stepping motors, voice coil motors (VCM), ultrasonic motors. The driver 106 has an actuator such as a stepping motor.

The Lucom 108 controls circuits units such as the drivers 105, 106, and 107. The Lucom 108 communicates with body control microcomputer (Bucom) 223 of the camera body 200 via the I/F 228. The Lucom 108 acquires necessary information from the flash memory 109 to perform various kinds of control. The flash memory 109 stores various kinds of information necessary for the operation of the interchangeable lens 100. The Lucom 108 acquires positional information regarding the focus lens 102 from the position sensor 110 to focus the photographic lens 101.

The position sensor 110 detects the position of the focus lens 102, and outputs the detection signal to the Lucom 108. The position sensor 110 is a sensor such as a hall element or a giant magnetoresistive element (GMR element). Although not shown in FIG. 2, the interchangeable lens 100 also has a position detection mechanism to detect the positions of movable parts of the variable power lens 103 and the diaphragm 104.

The touch operation device 112 is disposed along the circumferential direction of the lens barrel of the photographic lens 101, and has a vibration member 113 and a piezoelectric body control circuit 116. The vibration member 113 has a touch detection unit 114 and a vibration unit 115. The touch detection unit 114 detects a touch by the user and then outputs an electric signal. The vibration unit 115 has a piezoelectric body configured to vibrate part by part. The piezoelectric body control circuit 116 vibrates the vibration unit 115 in accordance with a control signal from the Lucom 108.

The camera body 200 includes a shutter 201, a shutter drive mechanism 202, an optical element 203, the image pickup device 204, an analog processing unit 205, an analog/digital converter (A/D converter) 206, an AE processing unit 207, an AF processing unit 208, a distance information processing unit 209, an image processing unit 210, an image compressing/decompressing unit 211, the display device 212, a recording medium 219, a memory interface (memory I/F) 220, an SDRAM 221, a bus 222, the Bucom 223, a flash memory 224, an operation unit 225, a battery 226, an electric source circuit 227, the I/F 228, the finder display unit 229, the eye sensor 231, the speaker 232, the microphone 234, and a light emitting unit 236.

The shutter 201 is disposed in front of the light receiving surface of the image pickup device 204. The shutter 201 allows the light receiving surface of the image pickup device 204 to be exposed to light or blocked from light, and thereby controls the exposure of the image pickup device 204. The shutter drive mechanism 202 drives a shutter blade of the shutter 201 to open and shut the shutter 201.

The optical element 203 has a dustproof filter, an optical low pass filter, and an infrared cut filter, and is disposed in front of the light receiving surface of the image pickup device 204. The dustproof filter shakes off dust by ultrasonic vibration, and thereby removes the dust to be included in images. Although not shown in FIG. 2, a drive circuit of the dustproof filter is also needed when the dustproof filter is provided. The optical low pass filter removes components having a high spatial frequency in the optical image created by the photographic lens 101. The infrared cut filter removes an infrared component in the optical image created by the photographic lens 101.

The image pickup device 204 receives, in the light receiving surface, the optical image created by the photographic lens 101, and converts the received optical image to an electric signal (hereinafter referred to as an image signal). The exemplary image pickup device 204 has a phase difference detecting element in a part of the light receiving surface. The phase difference detecting element outputs phase difference information corresponding to the distance of the subject on the basis of a pair of rays emitted from a particular region of an exit pupil of the photographic lens 101. The analog processing unit 205 performs analog processing such as the removal of noise in the electric signal obtained in the image pickup device 204. The A/D converter 206 converts an analog signal obtained in the analog processing unit 205 to a digital image signal (hereinafter referred to as image data). The image pickup device 204, the analog processing unit 205, and the A/D converter 206 function as an example of an image acquiring unit.

The AE processing unit 207 measures the light from the subject and then outputs, to the Bucom 223, information to control the exposure of the image during photography. The AF processing unit 208 detects the in-focus position of the optical image created by the photographic lens 101 and then outputs, to the Bucom 223, information to control the position of the focus lens 102.

The distance information processing unit 209 as an example of a subject information generating unit generates distance information regarding each pixel of the image by using the phase difference output from the phase difference detecting element of the image pickup device 204 and also using optical data regarding the aperture value and focal distance of the photographic lens 101.

The image processing unit 210 generates image data which is finally output by the image processing of the image data obtained in the A/D converter 206. The image compressing/decompressing unit 211 compresses the image data, or restores the compressed image data back to original information.

The display device 212 has a display unit 213, a display driver 214, a vibration unit 217, and a piezoelectric body control circuit 218. The display unit 213 is, for example, a liquid crystal display, and displays images obtained by photography or information for photography. The display driver 214 controls the display operation in the display unit 213. The vibration unit 217 is disposed to correspond to a display region in the display unit 213, and has a touch detection unit 216 and the vibration unit 217. The touch detection unit 216 detects a touch by the user and then outputs an electric signal. The user can use this touch detection unit 216 to perform various setting operations such as the setting of a shutter speed, the setting of an aperture, and the setting of an exposure correction. The touch sensor detection unit 216 also functions as an example of a target specifying unit. The user can use the touch detection unit 216 to specify a target. The target is, for example, a subject which can be a photography or reproduction target and in which the user is interested. Alternatively, the target may be an object in which the user should be interested. These applications make it possible to find a target of which the user is not conscious but which the user feels like photographing. A candidate list of targets may be maintained in the form of a database. Such a database may be downloaded from the outside of the camera 1. Moreover, candidates of the target may be estimated by the analysis of the user's behavior. The vibration unit 217 is disposed to correspond to the display region in the display unit 213, and vibrates part by part. The piezoelectric body control circuit 218 which functions as a control unit together with the Bucom 223 vibrates the vibration unit 217 in accordance with a control signal from the Bucom 223.

The recording medium 219 records, as an image file, an image obtained by photography and information for the photography. The memory I/F 220 is an interface to write data into the recording medium 219 or read data from the recording medium 219. The SDRAM 221 temporarily stores information such as an image obtained by photography. The bus 222 is a transfer channel to transfer, for example, data in the camera body 200.

The Bucom 223 controls the operation of the digital camera 1 through the bus 222. The Bucom 223 communicates with the Lucom 108 of the interchangeable lens 100 via the I/F 228. The Bucom 223 acquires necessary information from the flash memory 224 to perform various kinds of control. The Bucom 223 has a function as an image determination unit, and determines the characteristics (e.g. the outline and color) of the image data to search for the target specified by the user. The Bucom 223 also recognizes the contents of voice generated by the user from voice data obtained via the microphone 234. The Bucom 223 has a function as a touch position identifying unit, and identifies the position (touch position) of a detection point touched by the finger of the user in the touch detection unit 114 and the touch detection unit 216. The Bucom 223 also has a function as an index determination unit, and determines whether an index to guide the subject into an imaging range has intruded into at least the imaging range. The Bucom 223 further has a function as a notification unit, and notifies the user that the index has intruded into at least the imaging range. The index includes at least one finger. The flash memory 224 stores various kinds of information necessary for the operation of the digital camera 1. This information is, for example, a program necessary for the operation of the digital camera 1.

The operation unit 225 includes various operation portions for the user to operate the camera body 200, such as buttons including the release button 2251 and dials.

The battery 226 is, for example, a secondary battery serving as an electric source of the camera body 200. The electric source circuit 227 is a circuit having a function, for example, to convert the voltage of the battery 226 to a voltage required by each circuit unit in the camera body 200.

The finder display unit 229 is, for example, a liquid crystal display, and is a display unit for a finder which displays images on the basis of image data input from the Bucom 223 as a display control unit. The eye sensor 231 is provided in the vicinity of the finder, and detects the user looking through the finder. The eye sensor 231 has, for example, an infrared light generating unit and an infrared light receiving unit. When the user is looking through the finder, infrared light generated in the infrared light generating unit is reflected by the user's face and received by the infrared light receiving unit. As a result, an output signal of the infrared light receiving unit changes. When, on the other hand, the user is not looking through the finder, the infrared light generated in the infrared light generating unit is not reflected, and the output of the infrared light receiving unit therefore does not change. Therefore, whether the user is looking through the finder can be recognized from the output signal of the infrared light receiving unit.

The speaker 232 converts the voice data output from the Bucom 223 to voice and outputs the voice. The contents of the voice tell that, for example, an index such as the finger of the right hand of the user has intruded into the imaging range of an imaging unit 2. For example, a voice of a predetermined frequency may be continuously or intermittently generated, or a voice saying that "the subject has come in" may be generated.

Figure 3:
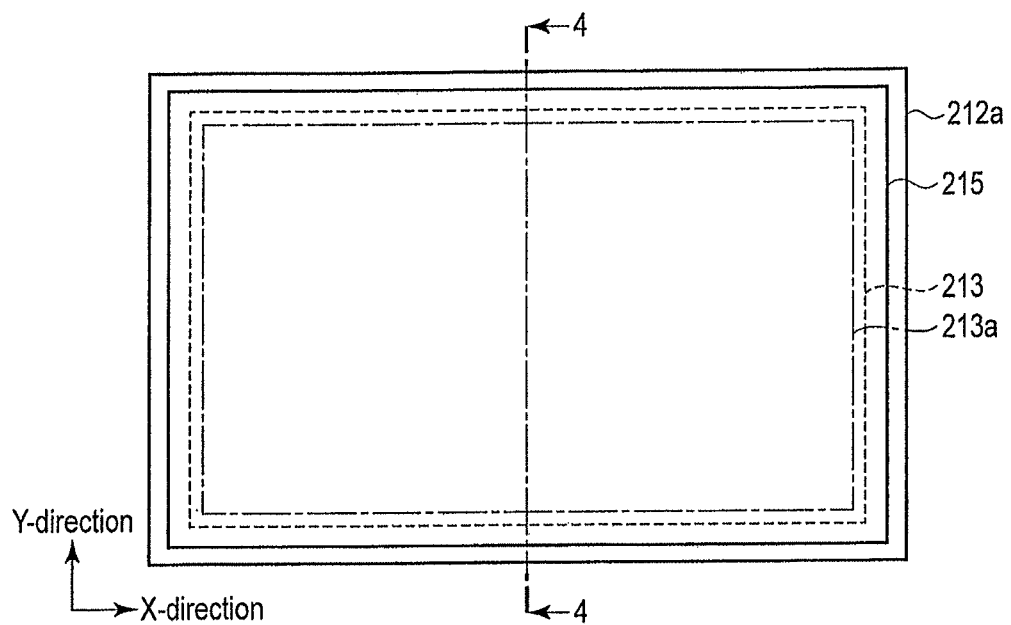
FIG. 3 is a front view of a display device 212.
Figure 4:
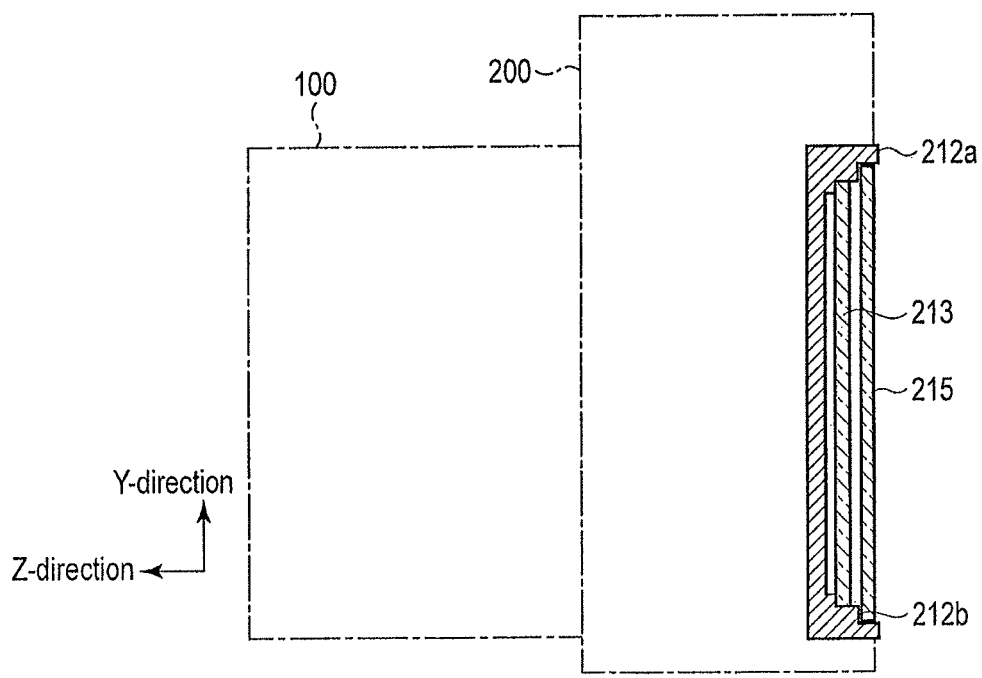
FIG. 4 is a sectional view taken along the line 4-4 of FIG. 3.

Now, the touch operation device 112 and the display device 212 are described in more detail. The configuration of the touch operation device 112 is similar to the configuration of the display device 212 except that the touch operation device 112 has no configuration regarding display. Therefore, the configuration of the display device 212 is mainly described below. FIG. 3 is a front view of the display device 212. FIG. 4 is a sectional view taken along the line 4-4 of FIG. 3. As shown in FIG. 3, the vibration unit 217 is disposed to correspond to a display region 213a in the display unit 213. As shown in FIG. 4, the display unit 213 and the vibration unit 217 are fitted in and supported by a frame 212a and disposed, for example, in the rear of the camera body 200. Further, the display unit 213 is fixed to the frame 212a by, for example, an adhesive agent 212b. A layer between the display unit 213 and the vibration unit 217 and a layer between the vibration unit 217 and the frame 212a are, for example, air layers. These layers may be filled with a member such as gel which does not hamper the vibration of the vibration unit 217.

Figure 5B:
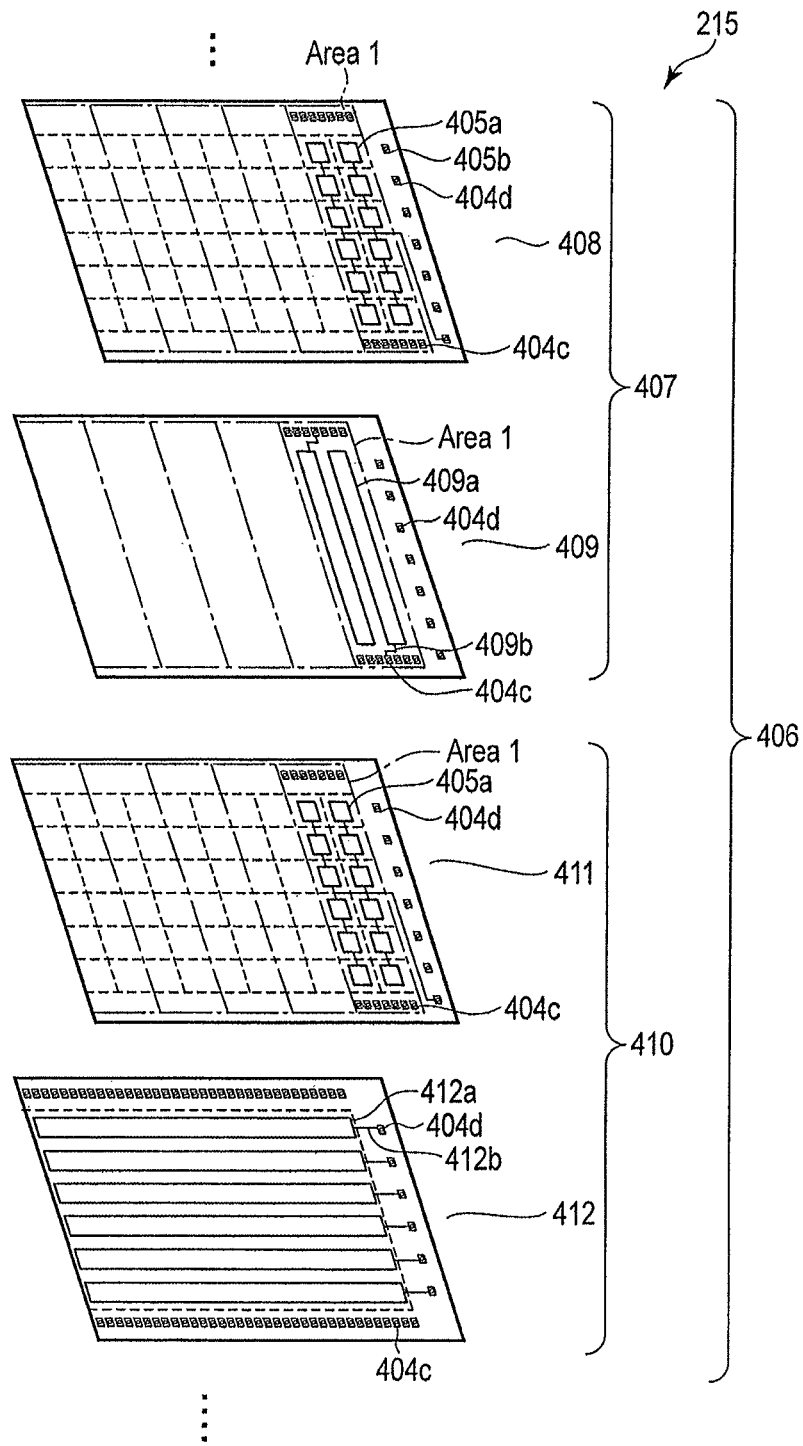
Figure 6:
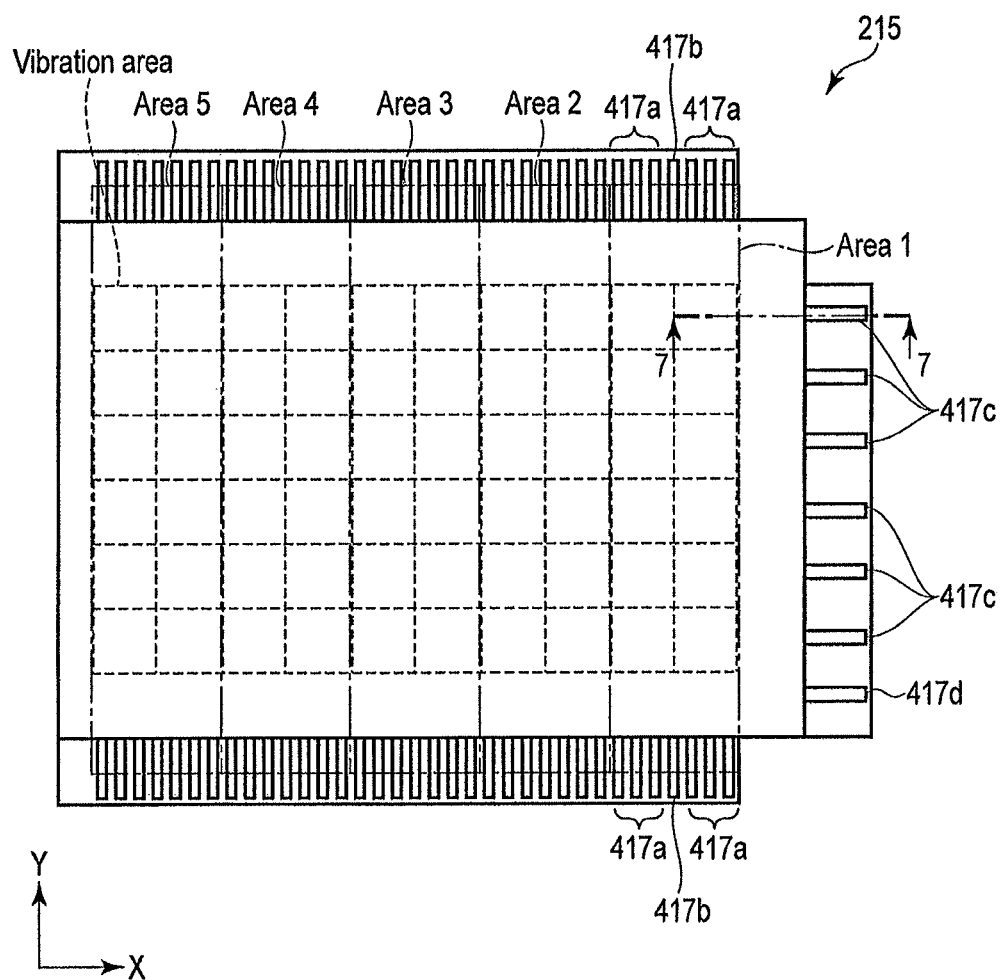
FIG. 6 is a front view of the vibration unit 217.
Figure 7:
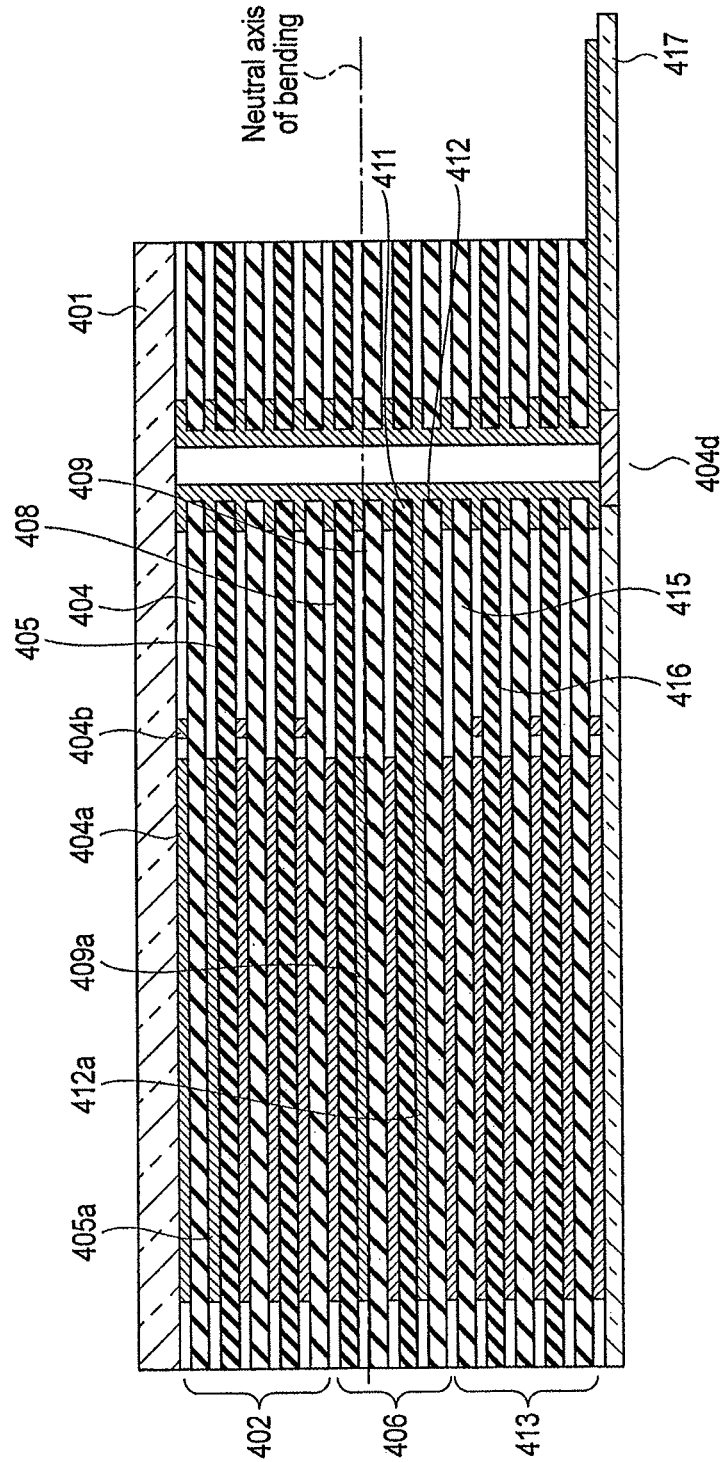
FIG. 7 is a sectional view taken along the line 7-7 of FIG. 6.

The vibration unit 217 is further described below. FIG. 5A, FIG. 5B, and FIG. 5C are exploded perspective views showing the configuration of an example of the vibration unit 217. FIG. 6 is a front view of the vibration unit 217. Here, the front surface of the vibration unit 217 is the rear side of the camera body 200. Moreover, FIG. 7 is a sectional view taken along the line 7-7 of FIG. 6.

The vibration unit 217 has a first insulating sheet 401, a first drive voltage layer 402, a detection layer 406, a second drive voltage layer 413, and a second insulating sheet 417. When viewed from the display surface of the display unit 213, the second insulating sheet 417, the second drive voltage layer 413, the detection layer 406, the first drive voltage layer 402, and the first insulating sheet 401 are stacked in this order. The detection layer 406 mainly functions as the touch detection unit 216. The first drive voltage layer 402 and the second drive voltage layer 413 mainly function as the vibration unit 217.

The first insulating sheet 401 is a sheet made of an insulating transparent material such as glass or a resin, and is formed on the most front surface of the vibration unit 217 when viewed from the rear side of the camera body 200. The first insulating sheet 401 also functions as a protective layer to protect, for example, electrodes inside the vibration unit 217 against exposure.

The first drive voltage layer 402 has at least one first vibration sheet 403. The first vibration sheet 403 is composed of the stack of a first piezoelectric sheet 404 and a second piezoelectric sheet 405.

The first piezoelectric sheet 404 is made of a piezoelectric D-polylactic acid sheet having an electrode therein. The first piezoelectric sheet 404 is divided into multiple rectangular areas (five areas 1 to 5 in FIG. 5A). Each of the areas is divided into multiple square vibration areas (twelve vibration areas in FIG. 5A). A signal electrode 404a is formed in each of the vibration areas (the signal electrode 404a is only shown in the first area in FIG. 5A). A signal line 404b is connected to each signal electrode 404a. The signal line 404b is connected to a signal terminal 417a formed on the second insulating sheet 417 via a through-hole 404c. The signal electrode 404a and the signal line 404b are formed by, for example, the vapor deposition of aluminum or made of copper foils. A through-hole 404d is formed in a region (the right edge in FIG. 5A) outside the area of the first piezoelectric sheet 404.

In FIG. 5A, the six upper signal electrodes 404a are connected from the upper end of the first piezoelectric sheet 404, and the six lower signal electrodes 404a are connected from the lower side of the first piezoelectric sheet 404. The purpose is to reduce the region necessary for wiring.

The second piezoelectric sheet 405 is made of a piezoelectric L-polylactic acid sheet having an electrode therein. Similarly to the first piezoelectric sheet 404, the second piezoelectric sheet 405 is divided into multiple rectangular areas (five areas in FIG. 5A). Each of the areas is divided into multiple square vibration areas (twelve vibration areas in FIG. 5A). A GND electrode 405a is formed in each of the vibration areas. A GND line 405b is connected to each GND electrode 405a. The GND line 405b is shared, and connected to a GND terminal 417d formed on the second insulating sheet 417 via a through-hole 404d. The GND electrode 405a and the GND line 405b are formed by, for example, the vapor deposition of aluminum or made of copper foils.

In FIG. 5A, one GND electrode 405a is formed for one vibration area. In contrast, one common GND electrode may be formed for the vibration areas.

The detection layer 406 is composed of the stack of a first detection sheet 407 and a second detection sheet 410. The first detection sheet 407 is composed of the stack of a third piezoelectric sheet 408 and a fourth piezoelectric sheet 409. The second detection sheet 410 is composed of the stack of a fifth piezoelectric sheet 411 and a sixth piezoelectric sheet 412.

The third piezoelectric sheet 408 is equivalent to the second piezoelectric sheet 405. Similarly to the second piezoelectric sheet 405, the fifth piezoelectric sheet 411 is made of a D-polylactic acid sheet having an electrode therein.

The fourth piezoelectric sheet 409 is made of a D-polylactic acid sheet having an electrode therein. The fourth piezoelectric sheet 409 is divided into multiple rectangular areas (five areas in FIG. 5B). In each area, the same number of first detection electrodes 409a as the number of columns of vibration areas included in this area is formed. A signal line 409b is connected to each of the first detection electrodes 409a. The signal line 409b is connected to a first detection terminal 417b formed on the second insulating sheet 417 via the through-hole 404c. The first detection electrodes 409a and the signal line 409b are formed by, for example, the vapor deposition of aluminum or made of copper foils. The through-hole 404d is formed in a region (the right edge in FIG. 5B) outside the area of the fourth piezoelectric sheet 409.

The sixth piezoelectric sheet 412 is made of an L-polylactic acid sheet having an electrode therein. The same number of second detection electrodes 412a as the number of rows of vibration areas is formed in the sixth piezoelectric sheet 412. A signal line 412b is connected to each of the second detection electrodes 412a. The signal line 412b is connected to a second detection terminal 417c formed on the second insulating sheet 417 via the through-hole 404d. The second detection electrodes 412a and the signal line 412b are formed by, for example, the vapor deposition of aluminum or made of copper foils.

The second drive voltage layer 413 has at least one second vibration sheet 414. The second vibration sheet 414 is composed of the stack of a seventh piezoelectric sheet 415 and an eighth piezoelectric sheet 416.

The seventh piezoelectric sheet 415 is equivalent to the fifth piezoelectric sheet 411. Similarly to the first piezoelectric sheet 404, the eighth piezoelectric sheet 416 is made of an L-polylactic acid sheet having an electrode therein.

The second insulating sheet 417 is an insulating sheet such as glass or a resin. The signal electrode 404a is formed in the second insulating sheet 417. The signal electrode 404a is a signal electrode corresponding to the seventh piezoelectric sheet 415 one layer above the second insulating sheet 417. The signal electrode 404a is connected to the signal line 404b. The signal line 404b is connected to the signal terminal 417a formed in the end (the upper and lower ends of the second insulating sheet 417 in FIG. 5C) area of the second insulating sheet 417. A wiring line is drawn from the signal terminal 417a to the piezoelectric body control circuit 218. One first detection terminal 417b is formed in each area between the signal terminals 417a. As described above, the first detection terminal 417b is connected to the first detection electrodes 409a via the through-hole 404c. A wiring line is drawn from the first detection terminal 417b to the Bucom 223.

Furthermore, the second detection terminal 417c and the GND terminal 417d are formed in the end region (the right end in FIG. 5C) of the second insulating sheet 417 where the signal terminals 417a and the first detection terminal 417b are not formed. As described above, the second detection terminal 417c is connected to the second detection electrodes 412a via the through-hole 404d. A wiring line is drawn from the second detection terminal 417c to the Bucom 223. A wiring line is also drawn from one of the second detection terminals 417c (which may be the first detection terminal 417b) to the piezoelectric body control circuit 218. The GND terminal 417d is connected to the GND electrode 405a via the through-hole 404d. When the vibration unit 217 is formed by the stacked sheets, the electrodes are only formed on one surface on the same side of the respective sheets, so that the process of turning over the sheet during manufacture is eliminated. Since it is easy to determine which is the front or rear, manufacture is easier.

Figure 8:
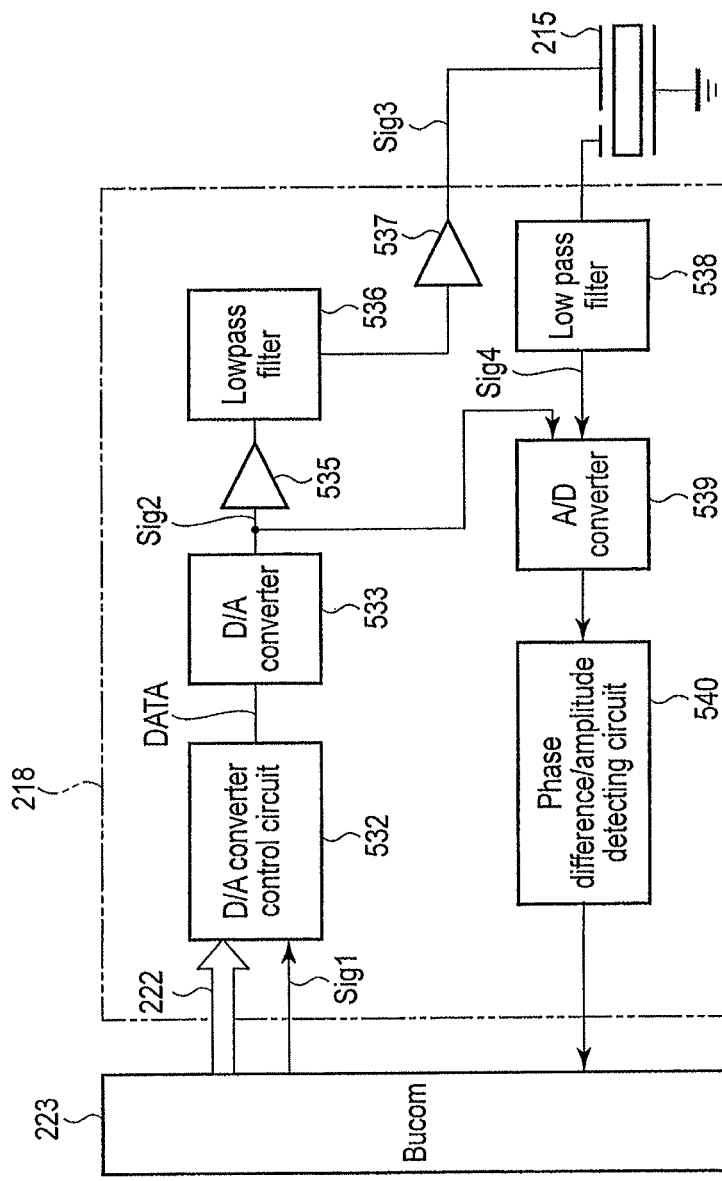
FIG. 8 is a diagram showing a schematic circuit configuration of a piezoelectric body control circuit 218.

FIG. 8 is a diagram showing a schematic circuit configuration of the piezoelectric body control circuit 218. The piezoelectric body control circuit 218 has a D/A converter control circuit 532, a D/A converter 533, an amplifier 535, a low pass filter 536, an amplifier 537, a low pass filter 538, an A/D converter 539, and a phase difference/amplitude detecting circuit 540.

The D/A converter control circuit 532 generates a digital voltage value DATA to be supplied to the D/A converter 533. The D/A converter 533 converts the digital voltage value input from the D/A converter control circuit 532 to an analog signal. The amplifier 535 amplifies the analog signal input from the D/A converter 533. The low pass filter 536 removes a high-frequency component in the analog signal input from the amplifier 535. The amplifier 537 amplifies the analog signal input from the low pass filter 536. The low pass filter 538 removes a high-frequency component in the analog signal corresponding to the displacement of the vibration unit 217 output from the detection layer 406 of the vibration unit 217. The A/D converter 539 converts, to digital signals, the analog signal input from the low pass filter 538 and the analog signal input from the D/A converter 533. The phase difference/amplitude detecting circuit 540 compares the digital voltage value corresponding to the analog signal input from the low pass filter 538 with the digital voltage value corresponding to the analog signal input from the D/A converter 533, and thereby detects the phase difference and amplitude difference therebetween.

The piezoelectric body control circuit 218 in FIG. 8 has the D/A converter control circuit 532. In contrast, the Bucom 223 may be configured to directly control the D/A converter 533. The amplifiers 535 and 537 are not always necessary, and may be provided as needed.

The operations of the vibration unit 217 and the piezoelectric body control circuit 218 are described below.

Figure 9:
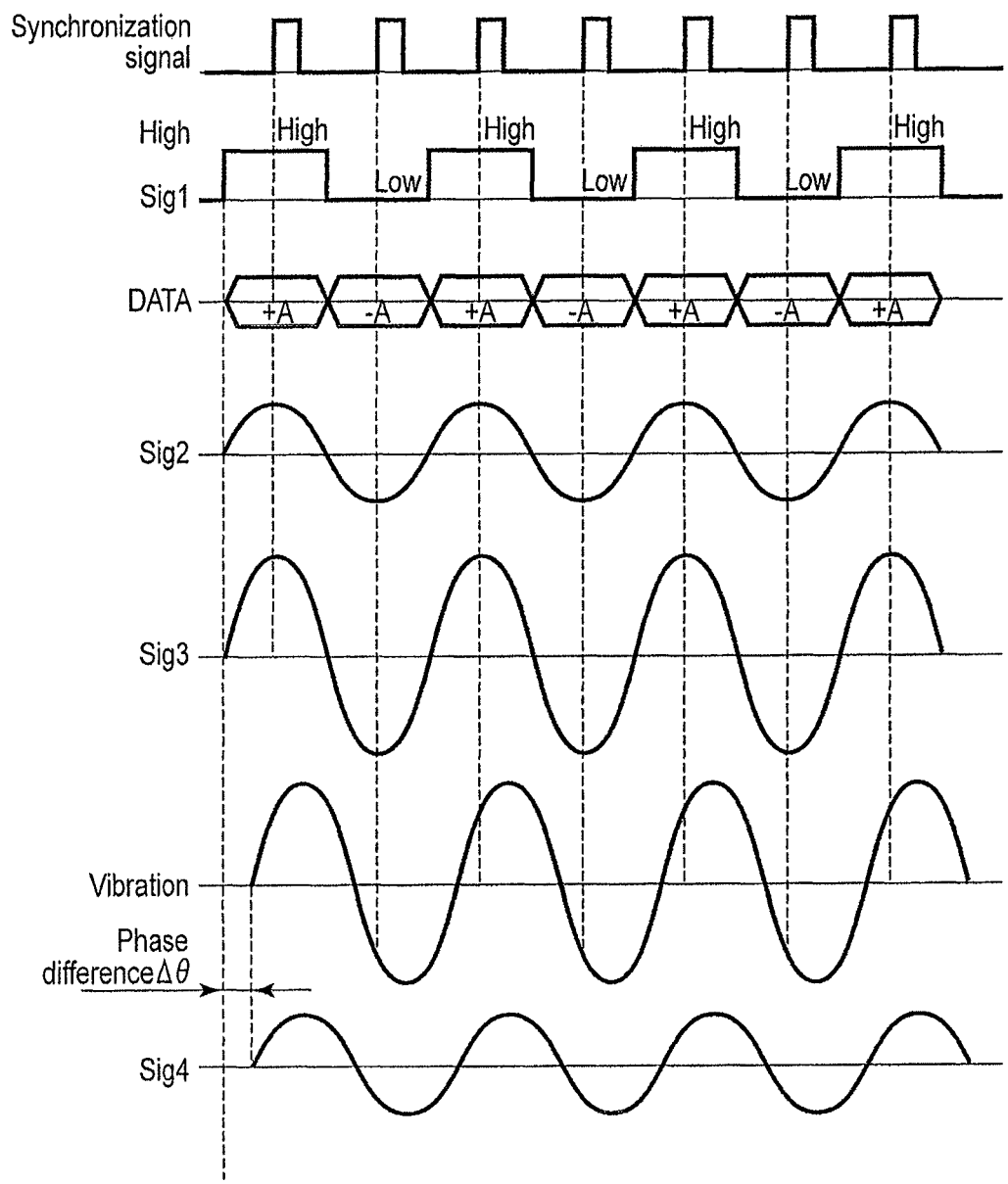
FIG. 9 is a time chart showing signals output from the piezoelectric body control circuit 218.

First, the operation of the vibration unit 217 is described. FIG. 9 is a time chart showing signals output from the piezoelectric body control circuit 218 in FIG. 8. When the vibration unit 217 is vibrated, the Bucom 223 inputs a signal Sig1 in which a phase difference $\Delta\theta$ based a synchronization signal for imaging is corrected, to the D/A converter control circuit 532 via the bus 222. When the input signal Sig1 is high, the D/A converter control circuit 532 outputs a positive digital voltage value +A to the D/A converter 533 as DATA. When the signal Sig1 is low, the D/A converter control circuit 532 outputs a negative digital voltage value −A to the D/A converter 533 as DATA. The A is an amplitude value of a drive signal, and is a value indicated by the Bucom 223. The A may be a function relative to time, and more particularly, may be data representing a waveform such as a rectangular wave, a triangular wave, or a trapezoidal wave having a predetermined amplitude.

The D/A converter 533 converts the input digital voltage value to an analog signal Sig2 and outputs the signal Sig2 to the amplifier 535. The amplifier 535 amplifies the signal Sig2 and outputs the amplified signal Sig2 to the low pass filter 536. The low pass filter 536 removes a high-frequency component from the amplified signal Sig2 and outputs a pseudo-sinusoidal wave. The amplifier 537 amplifies the signal input from the low pass filter 536, and outputs a drive signal Sig3 obtained as a result of the amplification to the signal terminal 417a to which the vibration unit 217 corresponds. The signal terminal 417a here is, for example, the signal terminal 417a corresponding to the vibration area currently touched by the user. The drive signal Sig3 input to the signal terminal 417a is applied to the corresponding signal electrode 404a. If the user touches the vibration unit 217, the vibration amplitude and phase generated in the signal terminal 417a change with the strength of a touch. The signal from the detection layer 406 is fed back to detect the amplitude and phase from the information regarding the touch, and the data in the D/A converter control circuit 532 is controlled in accordance with the amplitude and phase difference. Thus, the user can have the same vibration feel regardless of the strength of a touch. Moreover, a voltage signal is generated from the detection layer 406 because of a piezoelectric effect depending on the strength of a touch. This signal is output to the Bucom 223 from the phase difference/amplitude detecting circuit 540 in the end, and the position of the touch and the strength of the touch can be detected.

The L-polylactic acid sheet and the D-polylactic acid sheet have an inverse piezoelectric property such that one sheet expands and the other sheet contracts when a voltage is applied. For example, the D-polylactic acid sheet is displaced to expand by the application of a positive voltage, and displaced to contract by the application of a negative voltage. Contrarily, the L-polylactic acid sheet is displaced to expand by the application of a negative voltage, and displaced to contract by the application of a positive voltage. Since the L-polylactic acid sheet (second piezoelectric sheet 405) and the D-polylactic acid sheet (first piezoelectric sheet 404) are stacked in this order, the first drive voltage layer 402 is displaced to expand as a whole by the application of a positive voltage, and displaced to contract as a whole by the application of a negative voltage. The L-polylactic acid sheet (second piezoelectric sheet 405) and the D-polylactic acid sheet (first piezoelectric sheet 404) are stacked in this order in the second drive voltage layer 413 as well. However, the second drive voltage layer 413 is opposite to the first drive voltage layer 402 in how the signal electrode 404a and the GND electrode 405a are formed. Therefore, the second drive voltage layer 413 is displaced in a direction opposite to the first drive voltage layer 402 by the application of the same voltage as that applied to the first drive voltage layer 402. Thus, as a whole, the vibration unit 217 is bent (the neutral axis of such bending deformation is shown in FIG. 7) by the application of a positive voltage so that the upper side in the drawing swells. On the other hand, the vibration unit 217 is bent by the application of a negative voltage so that the upper side in the drawing is dented. The vibration unit 217 vibrates if the sign of the voltage applied to the signal electrode 404a is changed with time.

The detection layer 406 also expands and contracts together with the vibration of the vibration unit 217. At the same time, a voltage corresponding to the expansion/contraction amount is generated in the detection layer 406 because of the piezoelectric effect. This voltage is input to the low pass filter 538 of the piezoelectric body control circuit 218 via the second detection terminal 417c (or the first detection terminal 417b). The low pass filter 538 removes a high-frequency component in the analog voltage signal corresponding to the vibration of the vibration unit 217, and outputs a signal Sig4 obtained as a result to the A/D converter 539.

The A/D converter 539 loads the signal Sig2 and the signal Sig4 and converts these signals to digital data. The phase difference/amplitude detecting circuit 540 detects the phase difference $\Delta\theta$ and amplitude difference $\Delta p$ between the signal Sig2 and the signal Sig1 in accordance with the digital data input from the A/D converter 539. The Bucom 223 adjusts the phase and amplitude of the signal Sig1 in accordance with the phase difference $\Delta\theta$. The vibration unit 217 can be vibrated with a desired phase and amplitude by such feedback control.

The operation of the touch detection unit 216 is then described. When the user touches a certain area in the vibration unit 217, the vibration unit 217 expands and contracts in response to this touch. As described above, a voltage is generated by the expansion/contraction of the detection layer 406. This voltage is input to the Bucom 223. The Bucom 223 recognizes which area is touched from the output of the first detection terminal 417b and the output of the second detection terminal 417c. That is, a touch in the column direction can be detected from the output of the first detection terminal 417b. On the other hand, a touch in the row direction can be detected from the output of the second detection terminal 417c. According to this configuration, a touch in one place can be only detected. However, in order to permit the detection of touches at multiple points, it is possible to provide the fourth piezoelectric sheet 409 and the sixth piezoelectric sheet 412 with an electrode structure similar to that of the first piezoelectric sheet 404 which is provided to correspond to each area.

Figure 10:
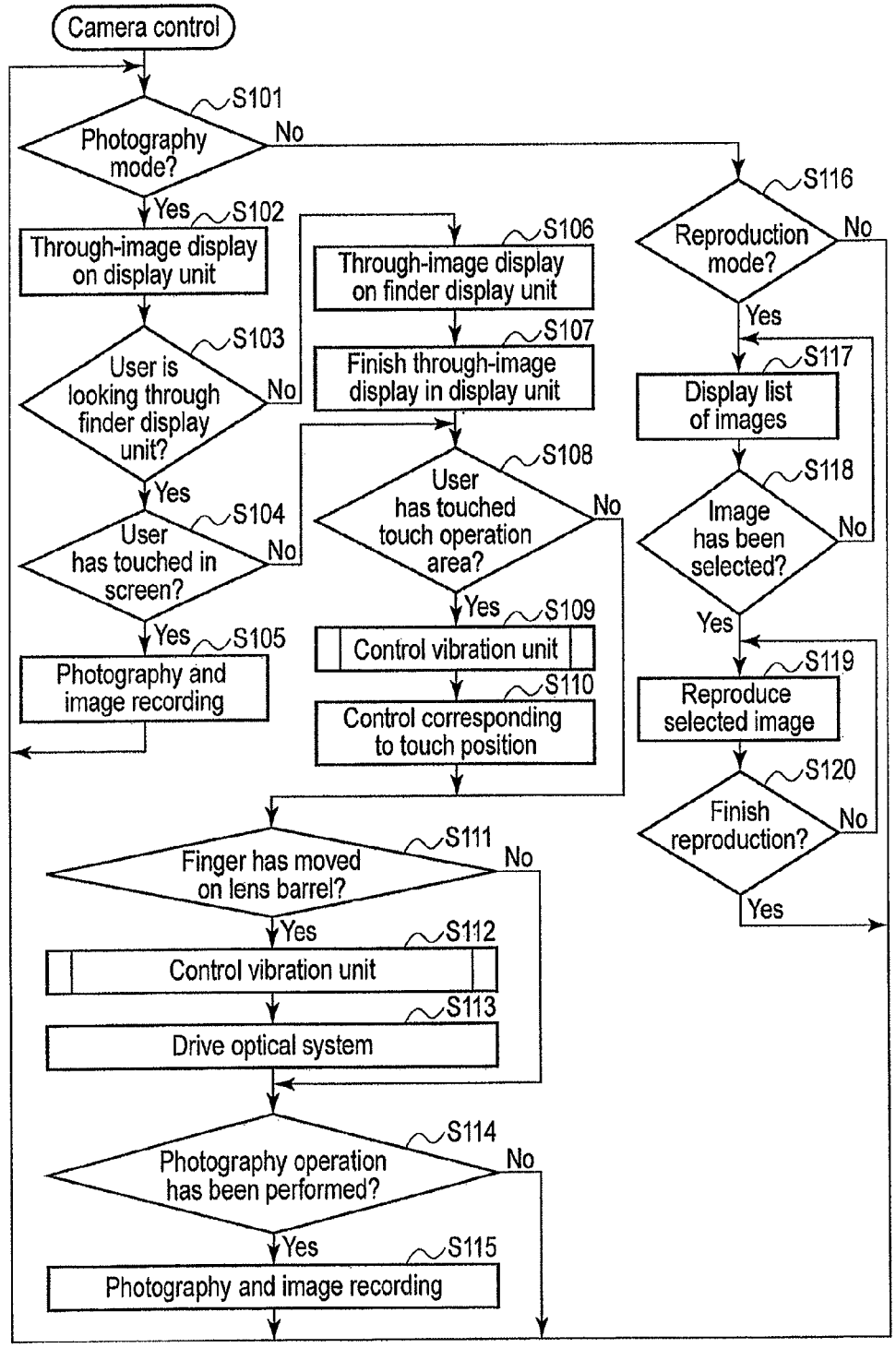
FIG. 10 is a flowchart showing the main operation of the camera 1 according to the first embodiment.

Now, the operation of the camera 1 having the touch operation device according to the present embodiment is described. FIG. 10 is a flowchart showing the main operation of the camera 1. The operation in FIG. 10 is mainly controlled by the Bucom 223. The operation in FIG. 10 is started, for example, when the electric source of the camera 1 is turned on.

When the operation in FIG. 10 is started, the Bucom 223 determines whether the operation mode of the camera 1 is a photography mode (step S101). The camera 1 has the photography mode and a reproduction mode as the operation modes. The operation mode is set, for example, in accordance with the operation of the operation unit 225 or the touch detection unit 216 by the user.

When determining in step S101 that the operation mode is the photography mode, the Bucom 223 causes the display unit 213 to perform a through-image display (step S102). As the through-image display, the Bucom 223 uses the image pickup device 204 to acquire image data for the through-image display. After the acquisition of the image data, the image processing unit 210 performs general image processing for the through-image display such as a white balance correction and a gamma correction for the acquired image data. After the image processing for the through-image display, the Bucom 223 inputs the processed image data to the display driver 214, and causes the display unit 213 to display the image.

After the through-image display in the display unit 213, the Bucom 223 determines whether the user is looking through the finder display unit 229 from the detection result by the eye sensor 231 (step S103). When determining in step S103 that the user is not looking through the finder display unit 229, the Bucom 223 determines whether the user has touched in the display screen of the display unit 213 from the detection result by the touch detection unit 216 (step S104).

When determining in step S104 that the user has touched in the display screen of the display unit 213, the Bucom 223 performs still image photography (step S105). As the still image photography operation, the Bucom 223 uses the AF processing unit 208 to perform AF control to focus the optical system of the focus lens 102, and also uses the AE processing unit 207 to perform AE control to determine an exposure condition for the still image photography. In step S105, the AF control and the AE control are performed to adjust the focus and exposure to the subject at the touched position. The Bucom 223 then causes the image pickup device 204 to perform an imaging operation for still image recording in accordance with the exposure condition determined by the AE control. After the imaging operation for still image recording, the image processing unit 210 performs general image processing for still image recording such as a white balance correction and a gamma correction for the image data acquired as a result of the imaging operation in the image pickup device 204. The image compressing/decompressing unit 211 then performs still image compression for the processed image data. The Bucom 223 then creates a still image file on the basis of the processed image data, and records the created still image file in the recording medium 219. After this still image photography, the Bucom 223 returns the processing to step S101.

When determining in step S103 that the user is looking through the finder display unit 229, the Bucom 223 causes the finder display unit 229 to perform the through-image display (step S106). The processing in step S106 is similar to the processing in step S102 except that the image data for the through-image display is input to the finder display unit 229 to display the image.

After the through-image display in the finder display unit 229, the Bucom 223 finishes the through-image display in the display unit 213 (step S107). It is considered that the display unit 213 is not used when the user is looking through the finder display unit 229. Therefore, the through-image display in the display unit 213 is finished for energy saving.

When determining in step S104 that the user has not touched in the screen or after the through-image display in the finder display unit 229, the Bucom 223 determines whether the user has touched in a touch operation area from the detection result by the touch detection unit 216 (step S108). The touch operation area is region in the touch operation device 215 which is operable by the user looking through the finder display unit 229. For example, if the user is right-handed, an area 215a at the right end of the touch operation device 215 is the touch operation area as shown in FIG. 11. Although not shown, an area at the left end of the touch operation device 215 is the touch operation area if the user is left-handed.

When determining in step S108 that the user has touched in the touch operation area, the Bucom 223 performs vibration unit control (step S109). The vibration unit control will be described later in detail.

After the vibration unit control, the Bucom 223 performs control corresponding to the touch position on the touch operation area (step S110). For example, at the time of the first touch in the touch operation area, the Bucom 223 superimposes indicators 12, 14, and 16 indicating operation buttons on the through-image in the finder display unit 229 as shown in FIG. 12A. The P- (program) button 12 is a button for setting a program mode of the camera 1 (how to determine the exposure condition for the still image photography). The St- (strobe) button 14 is a button for setting a strobe. The exposure correction button 16 is a button for setting an exposure correction. The functions allocated to these operation buttons are illustrative only and can be suitably changed.

If the user traces a part of the touch operation area in the touch operation device 215 with a finger while the indicators 12, 14, and 16 indicating the operation buttons are being displayed in the finder display unit 229 as shown in FIG. 12A, the movement of the finger at this moment is detected via the touch detection unit 216. The Bucom 223 identifies a touch position from the output of the touch detection unit 216. When the touch position is the position corresponding to any one of the operation buttons, the Bucom 223 recognizes that the corresponding operation button has been selected. At the same time, the selected operation button is displayed, for example, with a thick frame for the user to recognize that the operation button has been selected. FIG. 12A shows an example in which the exposure correction button 16 has been selected.

If any one of the operation buttons is selected, the Bucom 223 performs a display corresponding to the selected operation button on the finder display unit 229. FIG. 12B is a diagram showing a display example in which the exposure correction button 16 has been selected. When the exposure correction button 16 has been selected, the Bucom 223 displays, in the finder display unit 229, an indicator 16a indicating that, for example, an exposure correction is being set. The Bucom 223 also displays, in the finder display unit 229, a bar 16b for specifying an exposure correction amount. If the user traces the touch operation area with the finger while the bar 16b is being displayed, the Bucom 223 recognizes the movement (sliding) of the finger from the output of the touch detection unit 216, and moves the position of an index 16c displayed on the bar 16b in the finder display unit 229 in response to the sliding of the finger. When recognizing that the finger has been stopped, the Bucom 223 displays an indicator 16d indicating the value of the exposure correction amount corresponding to the position of the index 16c at this moment. The Bucom 223 then corrects so that the exposure of the image data will increase or decrease in accordance with the exposure correction amount. Thus, the user can perform the exposure correction while looking through the finder display unit 229.

An operation similar to that of the exposure correction button 16 is also performed when the P-button 12 has been selected or when the St-button 14 has been selected. Details are not described here. When the finger of the user has moved to a region different from the touch operation area during the exposure correction, the display is returned to the display in FIG. 12A from the display in FIG. 12B.

When determining in step S108 that the user has not touched in the touch operation area or after step S110, the Bucom 223 determines whether the finger has moved (slid) on the lens barrel from the detection result by the touch detection unit 114 (step S111). When determining in step S111 that the finger has slid on the lens barrel, the Bucom 223 performs the vibration unit control (step S112). The vibration unit control will be described later in detail.

After the vibration unit control, the Bucom 223 instructs the Lucom 108 so that the optical system will be driven in accordance with the sliding of the finger detected by the touch detection unit 114 (step S113). Whether to perform focus drive or zoom drive is preset by the operation of the touch operation device 112. Alternatively, the lens barrel may be provided with the touch operation devices 112 for focus drive and for zoom drive.

When determining in step S111 that the finger has not slid on the lens barrel or after step S113, the Bucom 223 determines whether the user has performed the photography operation (step S114). The photography operation is an operation of pressing, for example, the release button 2251 of the operation unit 225. When determining in step S114 that the photography operation is not performed, the Bucom 223 returns the processing to step S101.

When determining in step S114 that the photography operation has been performed, the Bucom 223 performs still image photography (step S115). The still image photography in step S115 is basically similar to the still image photography in step S105. In step S115, control is performed to adjust the focus and exposure to, for example, a subject in the center or a nearest subject. After the still image photography, the Bucom 223 returns the processing to step S101.

When determining in step S101 that the operation mode is not the photography mode, the Bucom 223 determines whether the operation mode is the reproduction mode (step S116). When determining in step S116 that the operation mode is not the reproduction mode, the Bucom 223 returns the processing to step S101.

When determining in step S116 that the operation mode is the reproduction mode, the Bucom 223 causes the display unit 213 to display a list of image files recorded in the recording medium 219 (step S117). The Bucom 223 then determines whether the user has selected an image file (step S118). When determining in step S118 that the user has not selected an image file, the Bucom 223 returns the processing to step S117. In this case, the display of the list is continued.

When determining in step S118 that the user has selected an image file, the Bucom 223 reproduces the image file selected by the user (step S119). In the reproduction processing, the Bucom 223 reads the image file selected by the user from the recording medium 219, and decompresses the read image file. The Bucom 223 inputs the decompressed image data to the display unit 213 to display the image.

After the reproduction of the image file, the Bucom 223 determines whether the user has instructed to finish the reproduction of the image file (step S120). When determining in step S120 that the user has not instructed to finish the reproduction of the image file, the Bucom 223 returns the processing to step S119. In this case, the reproduction of the image file is continued. When determining in step S120 that the user has instructed to finish the reproduction of the image file, the Bucom 223 returns the processing to step S101.

Figure 13:
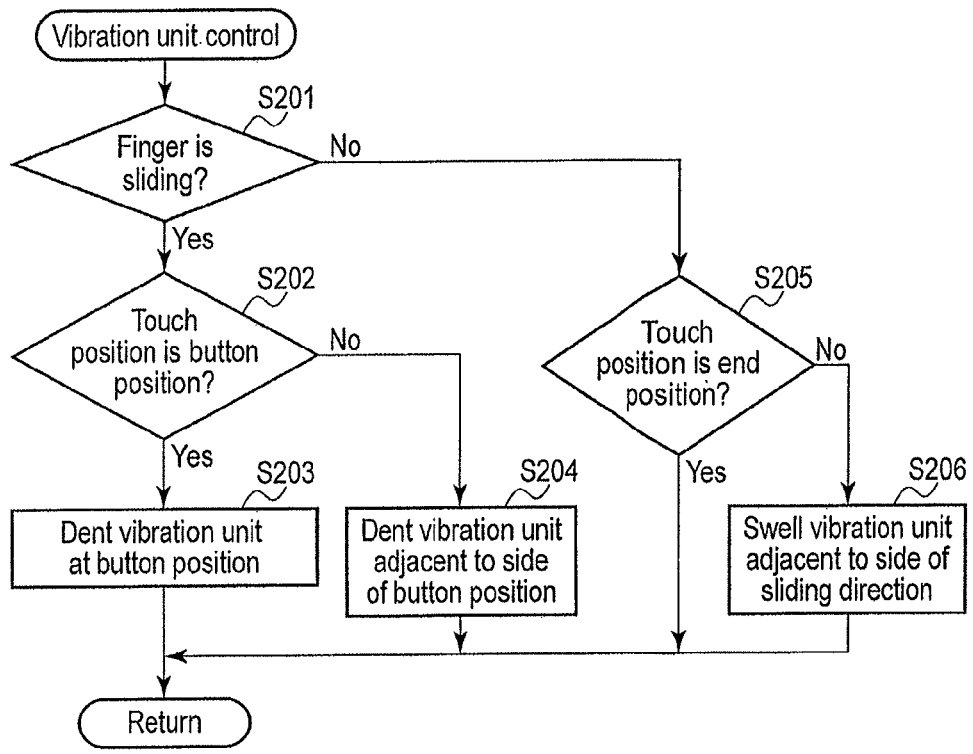
FIG. 13 is a flowchart showing processing in vibration unit control.

FIG. 13 is a flowchart showing processing in the vibration unit control. In the present embodiment, a piezoelectric element disposed on the touch detection unit is controlled to provide a tactile sensation to the user so that the user can operate without watching the touch operation device.

When the vibration unit control is started, the Bucom 223 determines whether the finger is sliding from the outputs of the touch detection units 114 and 216 (step S201). When determining in step S201 that the finger is not sliding, that is, the display in FIG. 12A is considered to be performed, the Bucom 223 determines whether the current touch position is the position of the operation button (step S202).

Figure 14:
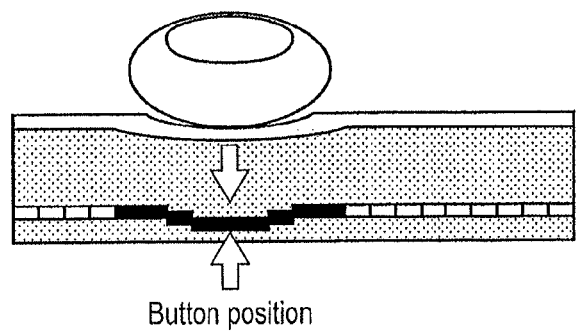
FIG. 14 is a diagram showing an example of the vibration unit control to dent the vibration unit 217 at a position corresponding to a touch position.

When determining in step S202 that the touch position is the position of the operation button, the Bucom 223 instructs the piezoelectric body control circuit 218 to dent the vibration unit 217 at the position corresponding to the touch position (step S203). Accordingly, the piezoelectric body control circuit 218 applies a voltage to the corresponding signal electrode. As a result, the position corresponding to the touch position is bent and dented as shown in FIG. 14. The position of the operation button is thus dented, and thereby serves as a nonslip and allows the user to realize that the operation can be performed at the current position of the finger.

Figure 15B:
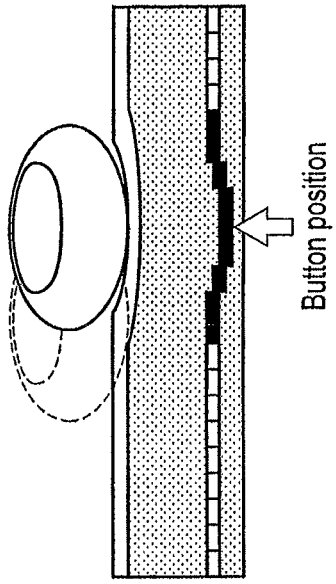
FIG. 15A and FIG. 15B are diagrams showing an example of the vibration unit control to dent the vibration unit 217 at a position corresponding to a position adjacent to the touch position.
Figure 15A:
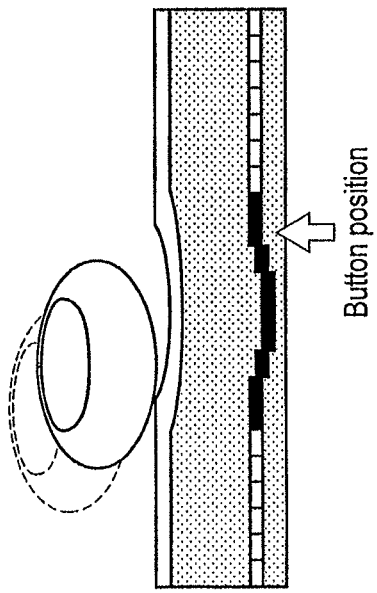

When determining in step S202 that the touch position is not the position of the operation button, that is, when determining that the touch position is off the operation button, the Bucom 223 instructs the piezoelectric body control circuit 218 to dent the vibration unit 217 at the position which is adjacent to the touch position and which is adjacent to the side of the operation button (step S204). Accordingly, the piezoelectric body control circuit 218 applies a voltage to the corresponding signal electrode. As a result, the position located in the vicinity of the touch position is dented as shown in FIG. 15A. The position located in the vicinity of the touch position is thus dented, so that the finger can be guided to the position of the operation button as shown in FIG. 15B.

When determining in step S201 that the finger is sliding, the Bucom 223 determines whether the touch position is the end position of the touch operation device 112 or 215 (step S205). The touch operation device 112 is formed along the lens barrel, and therefore has no end in the circumferential direction of the lens barrel. Thus, it is determined in step S205 that the touch position is not the end position.

When determining in step S205 that the touch position is the end position, the Bucom 223 finishes the processing in FIG. 13. When determining in step S205 that the touch position is not the end position, the Bucom 223 instructs the Lucom 108 or the piezoelectric body control circuit 218 to swell the vibration unit 115 or 217 at the position which is adjacent to the touch position and which is adjacent to the side of the sliding direction of the finger (step S206). The Lucom 108 applies a voltage to the corresponding signal electrode via the piezoelectric body control circuit 116. Alternatively, the piezoelectric body control circuit 218 applies a voltage to the corresponding signal electrode. As a result, the position located in the vicinity of the touch position is bent as shown in FIG. 16. The position located in the vicinity of the touch position is thus swelled, so that the sense of operation can be given to the finger during the sliding operation by the user.

As described above, according to the present embodiment, the signal electrode is formed in each part of the vibration unit formed in the touch operation device, so that the vibration unit can be bent part by part. Thus, any position on the touch operation device can be bent independently of the other positions. Consequently, a tactile sensation can be directly provided to the finger of the user.

According to the present embodiment, the polylactic acid layer is put between two electrodes to constitute the vibration unit. Since the polylactic acid layer is a transparent material, the display of the display unit 213 can be less likely to be blocked even if the vibration unit is formed on the display unit 213. Moreover, it is possible to increase bending displacement by stacking the D-polylactic acid layer and the L-polylactic acid layer.

Although the polylactic acid layers are used to constitute the vibration unit in the present embodiment, this is illustrative only, and the polylactic acid layers do not always need to be used to constitute the piezoelectric element. Multiple piezoelectric bodies may be arrayed to constitute the vibration unit. FIG. 17 shows a configuration example in which the vibration unit is composed of an array of piezoelectric bodies. The vibration unit in FIG. 17 is configured by the array of piezoelectric bodies 24 put between signal electrodes 22 (the signal electrodes are actually insulated from one another) and a ground (GND) electrode 26. According to this configuration as well, any position on the touch operation device can be bent independently of the other positions.

In the example described above, two kinds of positive and negative voltages are applied to the vibration unit. In contrast, three or more kinds of voltages can be applied to the vibration unit. By increasing the kinds of voltages that can be applied to the vibration unit, for example, it is possible to change the bending displacement amount in accordance with the contents of the operation button.

Second Embodiment

Figure 18B:
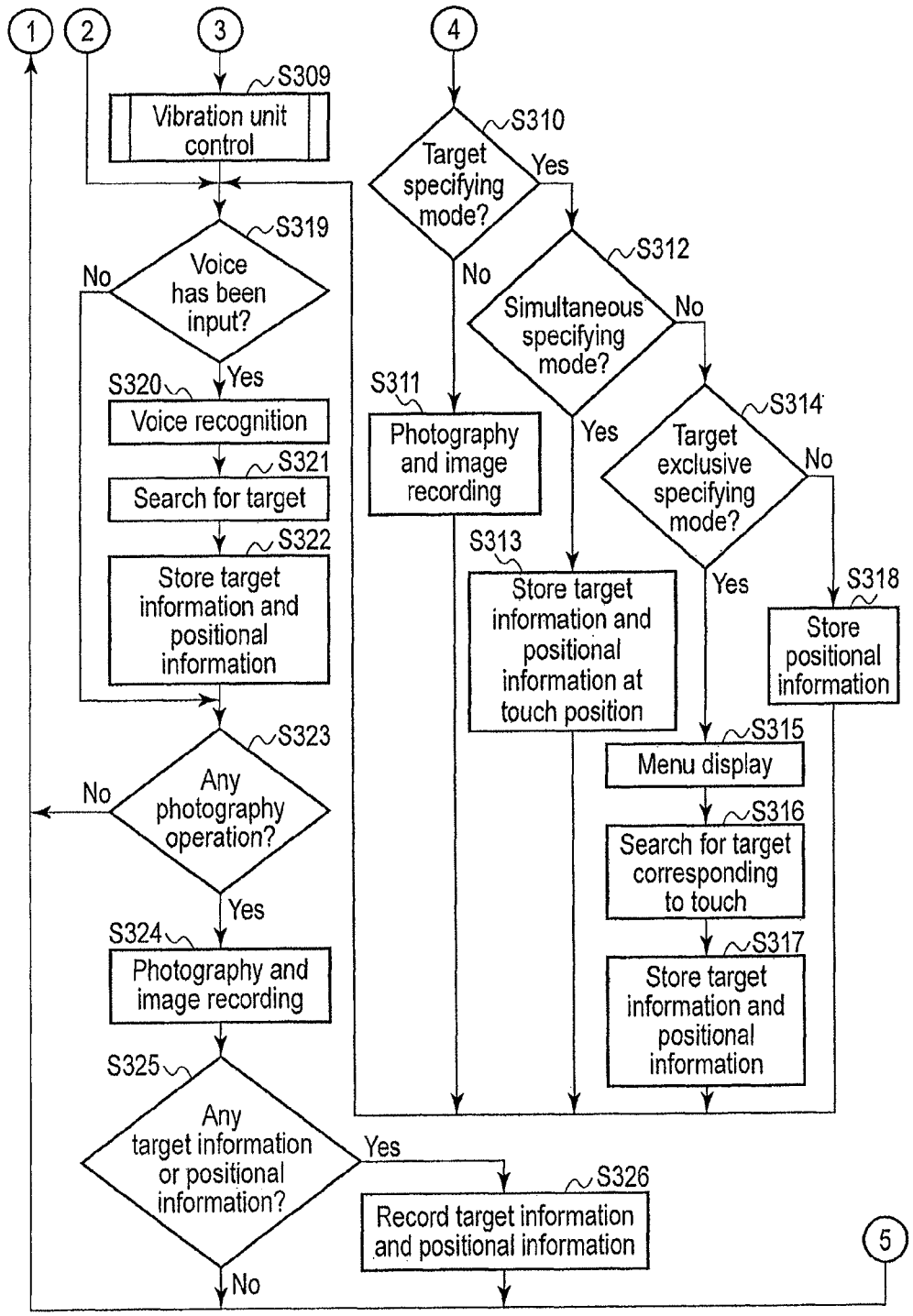

Now, the second embodiment of the present invention is described. The configuration shown in FIG. 2 is applied to the camera 1 having the touch operation device according to the second embodiment. Therefore, the configuration is not described. FIGS. 18A and 18B are flowcharts showing the main operation of the camera 1 according to the second embodiment. The operation in FIGS. 18A and 18B are mainly controlled by the Bucom 223. The operation in FIG. 18A is started, for example, when the electric source of the camera 1 is turned on.

When the operation in FIG. 18A is started, the Bucom 223 determines whether the operation mode of the camera 1 is the photography mode (step S301). When determining in step S301 that the operation mode is the photography mode, the Bucom 223 causes the display unit 213 to perform a through-image display (step S302). After the through-image display in the display unit 213, the Bucom 223 determines whether the user is looking through the finder display unit 229 from the detection result by the eye sensor 231 (step S303). When determining in step S303 that the user is not looking through the finder display unit 229, the Bucom 223 finishes the through-image display in the finder display unit 229 (step S304). When determining in step S303 that the user is looking through the finder display unit 229, the Bucom 223 causes the finder display unit 229 to perform the through-image display (step S305). After the through-image display in the finder display unit 229, the Bucom 223 finishes the through-image display in the display unit 213 (step S306).

After the through-image display, the Bucom 223 determines whether the user has touched in the display screen of the display unit 213 from the detection result by the touch detection unit 216 (step S307). When determining in step S307 that the user has touched in the display screen of the display unit 213, the Bucom 223 determines whether a target has been already specified for the vibration unit control described later in detail (step S308).

When determining in step S308 that the target has been already specified, the Bucom 223 performs the vibration unit control (step S309). The vibration unit control will be described later in detail.

When determining in step S308 that the target has not been already specified, the Bucom 223 determines whether the operation mode of the touch operation device 215 is a target specifying mode (step S310). The camera 1 according to the second embodiment includes a touch release mode and the target specifying mode as the operation modes of the touch operation device 215 during the through-image display. The touch release mode is a mode for performing photography in response to a touch operation on the touch operation device 215 by the user. On the other hand, the target specifying mode is a mode for the user to specify a target by using the touch operation device 215. These operation modes are set by a touch operation in, for example, an unshown menu screen.

When determining in step S310 that the operation mode of the touch operation device 215 is not the target specifying mode, that is, the operation mode is the touch release mode, the Bucom 223 performs photography and image recording operations (step S311). After the photography operation, the Bucom 223 moves the processing to step S319.

When determining in step S310 that the operation mode is the target specifying mode, the Bucom 223 determines whether the specifying mode is a simultaneous specifying mode (step S312). The target specifying mode has, as specifying modes, the simultaneous specifying mode, a target exclusive specifying mode, and a position exclusive specifying mode. These specifying modes are set by a touch operation in, for example, an unshown menu screen. When determining in step S312 that the specifying mode is the simultaneous specifying mode, the Bucom 223 acquires information regarding the position touched by the user and information regarding the subject (target) at this position, and stores the acquired positional information and target information in an unshown storage unit (step S313). The target information includes information such as the name and shape of the subject. The name of the subject is identified by, for example, image recognition. The shape of the subject is detected by, for example, outline extraction. Here, when the target is a movable body, it is preferable to track the target to update the positional information.

When determining in step S312 that the specifying mode is not the simultaneous specifying mode, the Bucom 223 determines whether the specifying mode is the target exclusive specifying mode (step S314). When determining in step S314 that the specifying mode is the target exclusive specifying mode, the Bucom 223 causes the display unit 213 to display a menu screen for the user to specify a target (step S315). FIG. 19 is a diagram showing an example of the menu screen. The user touches an item of a desired target from among a list of targets displayed on the menu screen. In response to the touch operation, the Bucom 223 searches image data obtained during the through-image display for the target of the item touched by the user (step S316). For example, a known face detection technique and a characteristic amount detection technique can be used to search for the target. Otherwise, for example, if the target is the sky, a low-contract part in the upper part of the screen is recognized as the sky. Characteristics of an important image may be read from a particular image database, and a target may be searched for by the comparison with this important image. In the case of an exclusive device, there is a strong possibility that the important image can be automatically set. For example, for in-vehicle equipment, an image of an oncoming car (i.e. an automobile) or a pedestrian (i.e. a person) can be the important image. For industrial equipment, an image of a crack or a broken wire can be the important image. For medical equipment, an image of a lesion can be the important image. These important images may be associated with text or sound. After the search for the target, the Bucom 223 stores the positional information for the target that has been searched for on the touch operation device 215 and target information in the unshown storage unit (step S317).

When determining in step S314 that the specifying mode is not the target exclusive specifying mode, that is, the position exclusive specifying mode, the Bucom 223 causes the user to store the information regarding the touch position in the unshown storage unit (step S318). The position exclusive specifying mode here is a mode which enables the specification of a point. Not only a position but also a range may be specified. In this case, for example, when detecting that the user has traced a certain range with the finger as indicated by an arrow A as shown in FIG. 20, the Bucom 223 stores the positional information for this range in the unshown storage unit.

The Bucom 223 then determines whether the voice of the user has been input in accordance with a signal from the microphone 234 (step S319). When determining in step S319 that the voice has not been input, the Bucom 223 moves the processing to step S323. When determining in step S319 that the voice has been input, the Bucom 223 acquires voice data, and recognizes the contents of the acquired voice data (step S320). When the contents of the recognized voice data correspond to the name (which may be the color or shape) of the target registered in advance, the Bucom 223 searches the image data obtained during the through-image display for the recognized target (step S321). After the search for the target, the Bucom 223 stores the positional information for the target that has been searched for on the touch operation device 215 and target information in the unshown storage unit (step S322).

The Bucom 223 then determines whether the user has performed a photography operation (step S323). The photography operation is an operation of pressing, for example, the release button 2251 of the operation unit 225. When determining in step S323 that the photography operation is not performed, the Bucom 223 returns the processing to step S301. When determining in step S323 that the photography operation has been performed, the Bucom 223 performs the photography and image recording operations (step S324). After the photography and image recording operations, the Bucom 223 determines whether at least one of the information regarding the target and the positional information is currently stored (step S325).

When determining in step S325 that neither the information regarding the target nor the positional information is currently stored, that is, a target is not specified, the Bucom 223 returns the processing to step S301.

When determining in step S325 that at least one of the information regarding the target and the positional information is stored, the Bucom 223 additionally writes the stored information regarding the target or positional information in the image file recorded in step S324 (step S326). The Bucom 223 then returns the processing to step S301.

When determining in step S301 that the operation mode is not the photography mode, the Bucom 223 determines whether the operation mode is the reproduction mode (step S327). When determining in step S327 that the operation mode is not the reproduction mode, the Bucom 223 returns the processing to step S301. When determining in step S327 that the operation mode is the reproduction mode, the Bucom 223 performs processing in the reproduction mode (step S328). The processing in the reproduction mode will be described later in detail.

Figure 21:
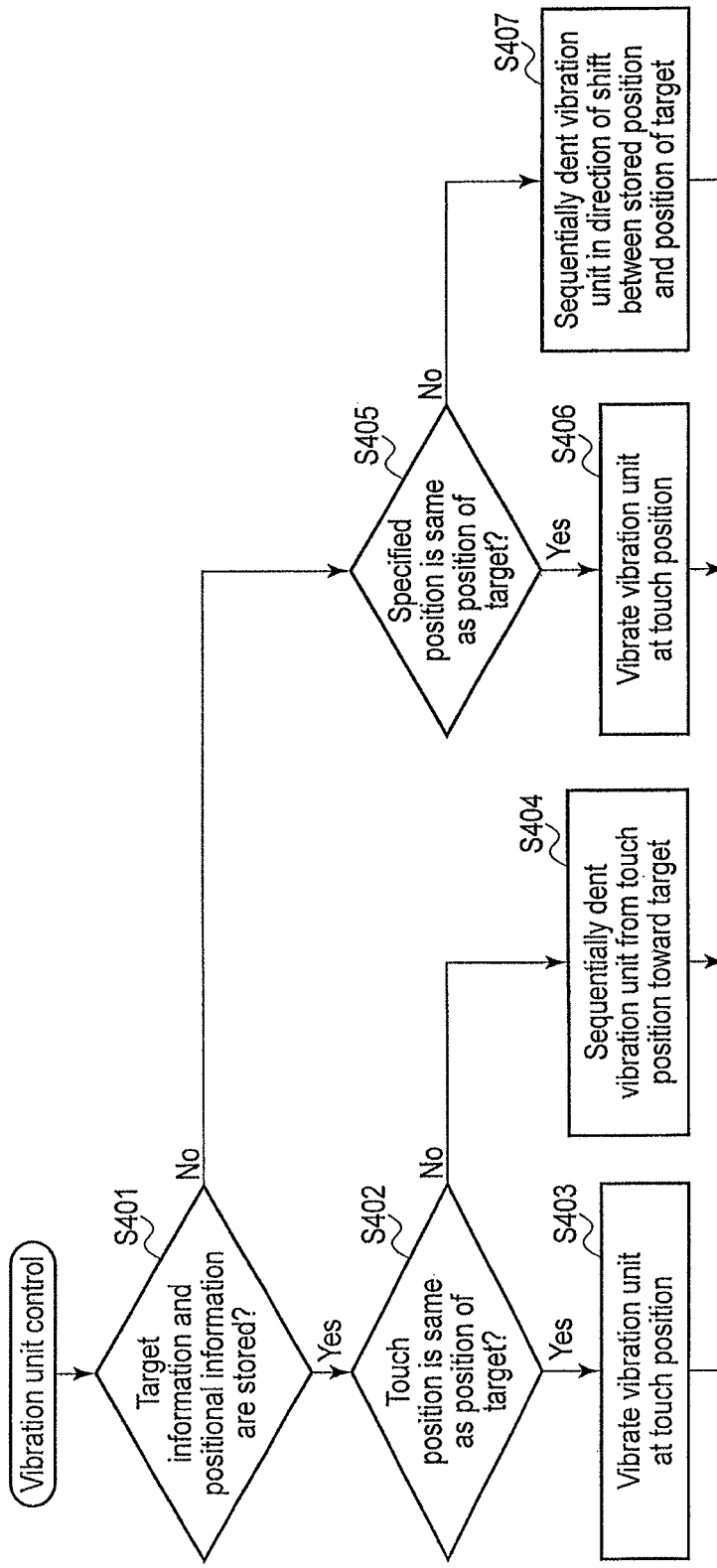
FIG. 21 is a flowchart showing processing in vibration unit control.

FIG. 21 is a flowchart showing processing in the vibration unit control according to the second embodiment. The processing in the vibration unit control is processing to apply a tactile stimulation to the finger of the user in accordance with positional relation between the position touched by the user and the position of the target. In FIG. 21, the Bucom 223 determines whether both the information regarding the target and the positional information are currently stored (step S401). When determining in step S401 that both the information regarding the target and the positional information are stored, that is, in the case of specification in a mode other than the position exclusive specifying mode, the Bucom 223 determines whether the stored position of the target is the same as the touch position (step S402). These positions are considered to be the same position if the difference between these positions is within an allowable range.

When determining in step S402 that the stored position of the target is the same as the touch position, the Bucom 223 vibrates the part of the vibration unit 217 corresponding to the detection point of the touch position as shown in FIG. 22 (step S403). The Bucom 223 then finishes the processing in FIG. 21. As described above, according to the present embodiment, a vibrating stimulation is applied to the finger when the user specifies, for example, the target "sky" by voice as shown in FIG. 23 and then touches the part of the sky. As a result, the user is able to know that the finger is touching the position of the target previously specified by the user, that is, the position of the target in the screen without watching the display in the display unit 213. Thus, the user can instantaneously determine that the target specified by the user is there, and the user can perform photography at ease without checking the screen each time, and the user can recognize that the target which is not specified but which is noteworthy is there in ways other than visual perception.

Here, FIG. 22 shows an example of how the vibration unit 217 is vibrated. Otherwise, the vibration unit 115 formed around the lens barrel may be vibrated, or the release button 2251 may be vibrated. That is, any part that can be touched by the finger of the user during photography may be vibrated. Moreover, a non-visual sensory stimulation other than the vibrating tactile stimulation, for example, other auditory ways such as an auditory stimulation may be used to notify the user of the position of the target. In the case of auditory notification, the Bucom 223 controls the speaker 232 to generate sound. When the present invention is applied to wearable equipment, the vibration of a part that is in contact with the human body is effective. In the case of in-vehicle equipment, the vibration of a steering wheel is effective. In the case of industrial equipment or medical equipment, the vibration of an operational member is effective.

Figure 25:
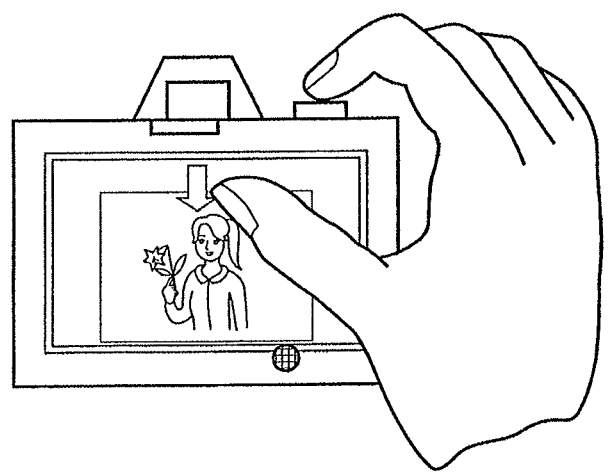
FIG. 25 is a first diagram showing an operation example of the vibration unit control in which the touch position is the same as the position of the target.
Figure 26:
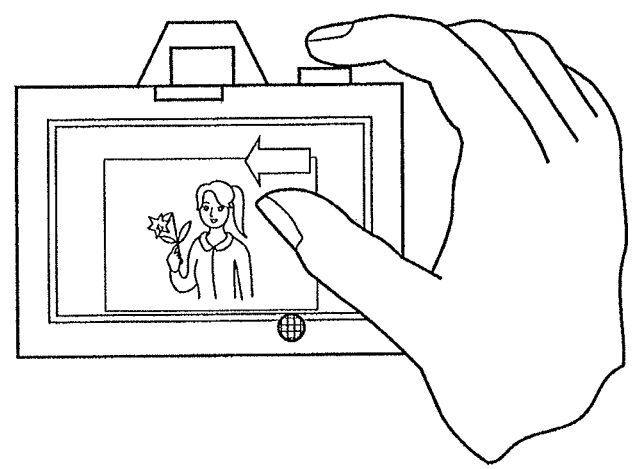
FIG. 26 is a second diagram showing an operation example of the vibration control in which the touch position is the same as the position of the target.

When determining in step S402 that the stored position of the target is not the same as the touch position, the Bucom 223 sequentially dents the vibration unit 217 from the detection point corresponding to the touch position toward the detection point at the position of the target as shown in FIG. 24A and FIG. 24B (step S404). The amount of the dent may be constant, or may be changed in accordance with the amount of the difference between the position of the target and the touch position. The Bucom 223 then finishes the processing in FIG. 21. For example, as shown in FIG. 25, when the specified target is a person (face) and the position touched by the user is shifted to the right from the position of the face, the vibration unit 217 is sequentially dented leftward from the position of the finger of the user. For example, as shown in FIG. 26, when the specified target is a person (face) and the position touched by the user is shifted upward from the position of the face, the vibration unit 217 is sequentially dented downward from the position of the finger of the user. The part from the touch position to the position of the target is thus sequentially dented, so that the finger can be guided to the position of the target. A shift can be effectively reported not only by the vibration of the touched part but also by the vibration of other parts or components if the vibration change direction corresponds to a two-dimensionally expanding image and allows the X-direction and the Y-direction to be recognized. This can be effectively replaced by horizontal and vertical vibrations. Such a device allows the recognition of a shift without visual observation. It should be appreciated that the vibration may be changed by the direction or by the degree of a shift. For example, the vibration may be stronger when the position is closer, and the vibration may be weaker when the position is farther, or vibration patterns may vary between a shift in the Y-direction and a shift in the X-direction. There may be a voice assistance, and there may be an assistance by, for example, a light emitting pattern that dispenses with the observation of the screen.

FIG. 24A and FIG. 24B show an example of how the vibration unit 217 is vibrated. Otherwise, the vibration unit 115 may be vibrated. In this case, the direction of a shift may be associated with a vibrating part. For example, when the position touched by the user is shifted to the right from the position of the face, the right part of the lens barrel is vibrated. When the position touched by the user is shifted upward from the position of the face, the upper part of the lens barrel is vibrated.

When determining in step S401 that both the information regarding the target and the positional information are not stored, that is, in the case of specification in the position exclusive specifying mode, the Bucom 223 determines whether the stored position is the same as the position of the target (step S405). Here, these positions are considered to be the same position if the difference between these positions is within an allowable range. Moreover, the target is preset. In the determination in step S405, the image data is searched for the set target, and its position is compared with the stored position.

When determining in step S405 that the stored position is the same as the position of the target, the Bucom 223 vibrates the part of the vibration unit 217 corresponding to the detection point of the touch position as in FIG. 22 (step S406). The Bucom 223 then finishes the processing in FIG. 21. In this way, the user is able to know that the target is located at the previously specified position without watching the display in the display unit 213. When there is no vibration, this means that the target is not located at the specified position. In this case, it is expected that the user moves the camera 1 while watching the target without watching the screen in the display unit 213 so that the target will come to the particular position. Thus, for example, even when an angle of field set in the camera 1 is small and the target cannot be recognized on the display screen, the target can be correctly contained in the display screen and photographed.

The target does not have to be a photographic target. The technique according to the present embodiment may be applied to exclusive observation equipment. In the case of such exclusive observation equipment, a target may be automatically set, and whether the set target is contained in the screen may be determined. Such a target corresponds to, for example, an oncoming car or a pedestrian in the case of in-vehicle equipment, an image of a crack or a broken wire in the case of industrial equipment, or an image of a lesion in the case of medical equipment. Image characteristics of these targets may be associated with text or sound, and may be specifiable. Instead of determining whether a target can be photographed, whether the target has simply intruded into the image range may be only determined.

In step S406, the vibration unit 115 formed around the lens barrel may be vibrated, or the release button 2251 may be vibrated. That is, any part that can be touched by the finger of the user during photography may be vibrated. Moreover, such means as sound other than the vibration of the vibration unit 217 may be used to notify the user of the position of the target.

When determining in step S405 that the stored position of the target is not the same as the position of the target, the Bucom 223 sequentially dents the vibration unit 217 from the touch position to the direction of the difference between the stored position and the position of the target (step S407). The amount of the dent may be constant, or may be changed in accordance with the amount of the difference between the position of the target and the touch position. The Bucom 223 then finishes the processing in FIG. 21. In step S407, the vibration unit 115 may be vibrated. In this case, the direction of the shift may be associated with the vibrated part. For example, when the position touched by the user is shifted to the right from the position of the face, the right part of the lens barrel is vibrated. When the position touched by the user is shifted upward from the position of the face, the upper part of the lens barrel is vibrated.

Figure 27:
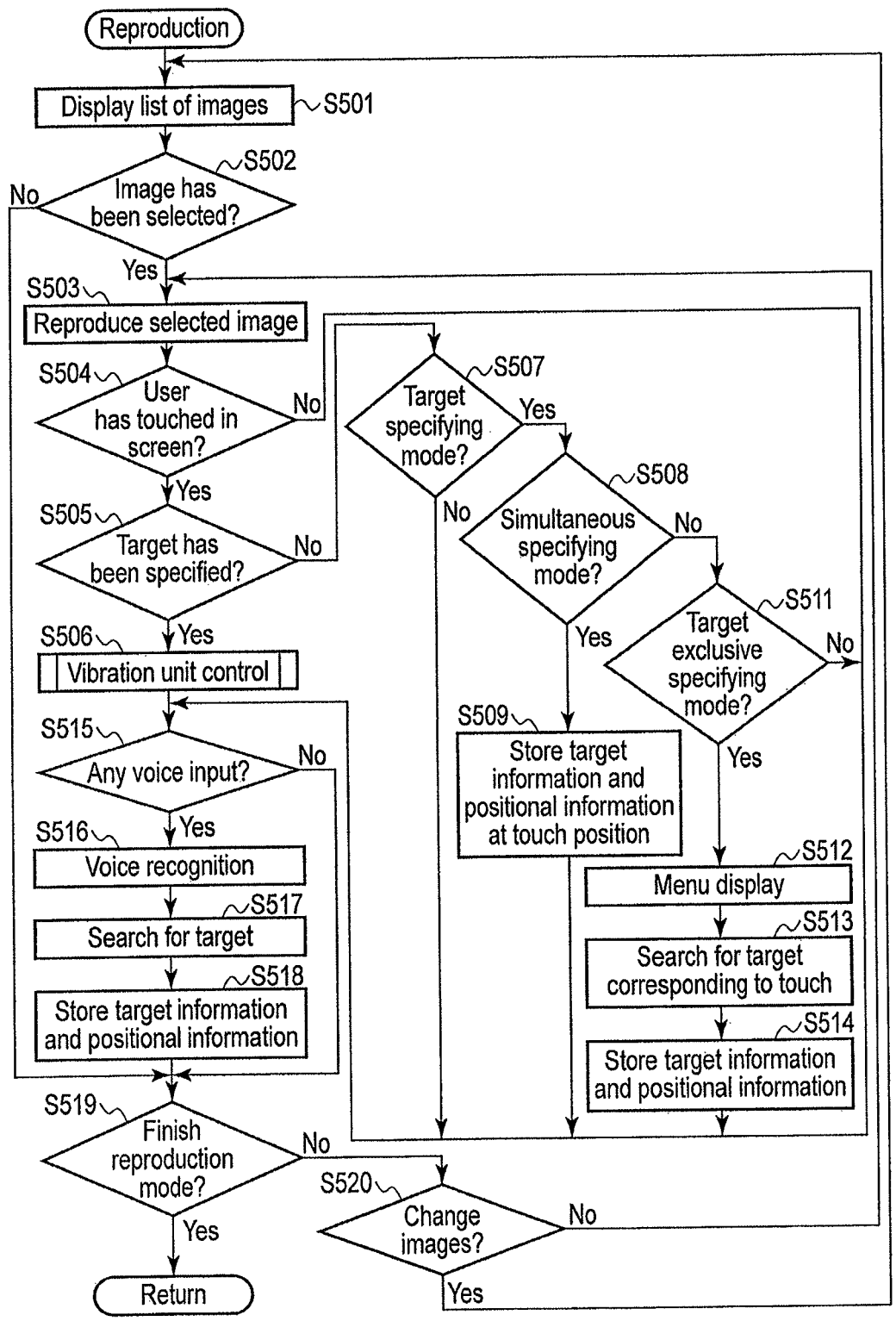
FIG. 27 is a flowchart showing processing in a reproduction mode according to the second embodiment.

FIG. 27 is a flowchart showing processing in the reproduction mode. According to the present embodiment, the vibration unit control is performed not only in the photography mode but also in the reproduction mode.

During the reproduction mode, the Bucom 223 causes the display unit 213 to display a list of image files recorded in the recording medium 219 (step S501). The Bucom 223 then determines whether the user has selected an image file (step S502). When determining in step S502 that the user has not selected an image file, the Bucom 223 moves the processing to step S519.

When determining in step S502 that the user has selected an image file, the Bucom 223 reproduces the image file selected by the user (step S503). The processing in steps S504 to S518 after the reproduction of the image file is the processing for the target specification and the vibration unit control described in steps S307 to S322. Therefore, this processing is not described. However, there is no processing associated with photography in FIG. 27. More specifically, the photography and image recording processing in step S311 and the position exclusive specifying mode in step S318 are eliminated.

After the processing of the vibration unit control and the specification of the target, the Bucom 223 determines whether the user has instructed to finish the reproduction mode (step S519). For example, when the operation mode is switched, the Bucom 223 determines that the user has instructed to finish the reproduction mode. When determining in step S519 that the user has not instructed to finish the reproduction mode, the Bucom 223 determines whether the user has instructed to change images (step S520). For example, when the user has instructed to finish the reproduction of the image being reproduced, the Bucom 223 determines that the user has instructed to change images. When determining in step S520 that the user has instructed to change images, the Bucom 223 returns the processing to step S501. When determining that the user has not instructed to change images, the Bucom 223 returns the processing to step S503.

As described above, according to the present embodiment, the piezoelectric element is bent or vibrated in accordance with positional relation between the position touched by the user and the previously specified position of the target, so that a tactile stimulation is applied to the finger. As a result, the user can recognize the position of the target in the image without watching the display screen in the display unit 213 and without any special knowledge.

The display of the image by the display unit 213 or the finder display unit 229 is not needed, for example, if the target is specified by voice. That is, the vibration unit control similar to that shown in FIG. 21 can be performed without the display unit 213 or the finder display unit 229 if the position of the detection point of a touch sensor is associated with each position of the image. Although the embodiment of the polylactic acid which vibrates and which senses the position and which is high in permeability, flexibility, and moldability has been described here in detail, it should be appreciated that similar advantageous effects are provided by the combination of other materials. The polylactic acid allows the vibration position to be easily changed, but can also be designed so that the whole touch panel is moved.

Third Embodiment

Figure 28B:
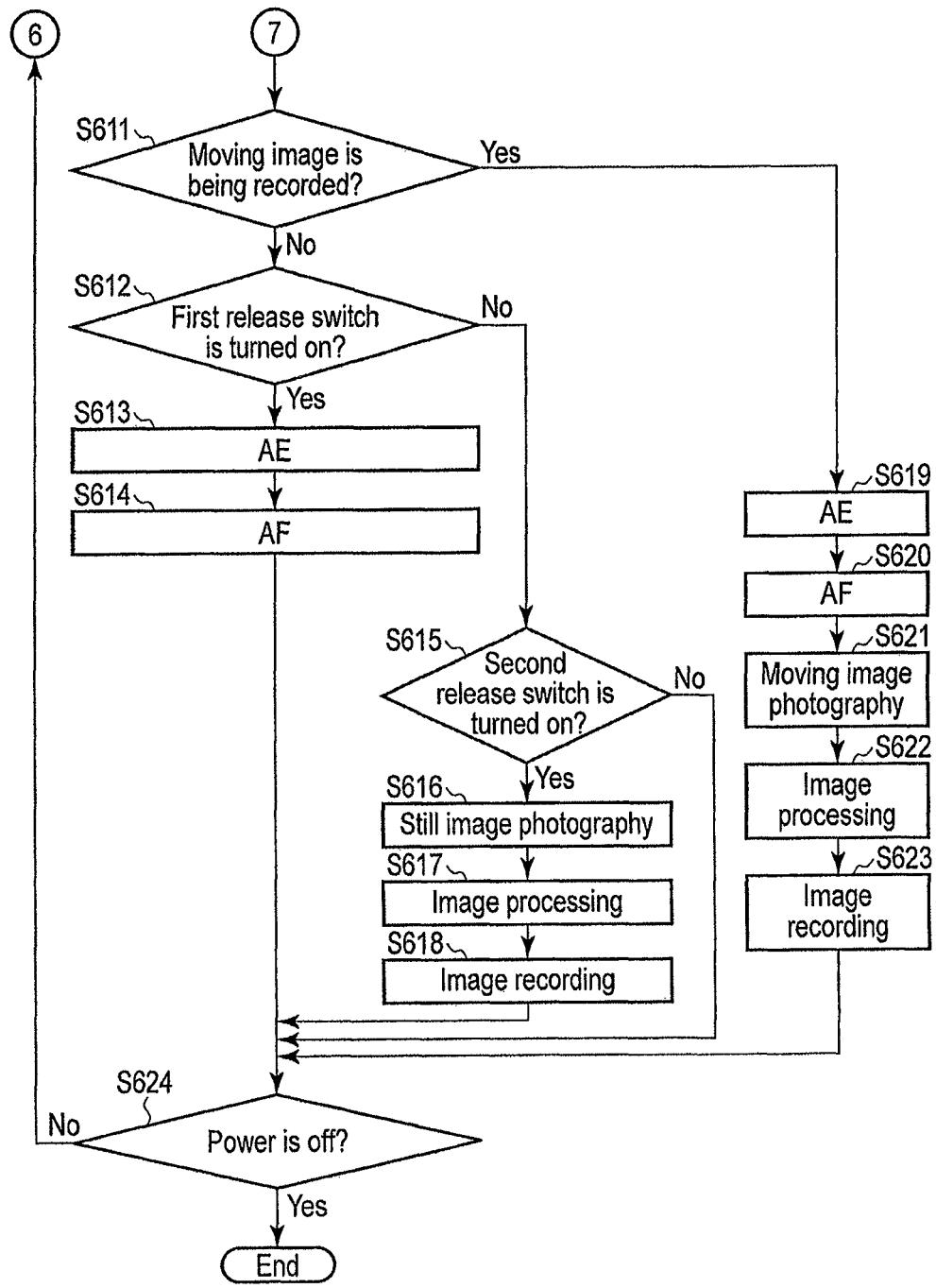

Now, the third embodiment of the present invention is described. The configuration shown in FIG. 2 is applied to the camera 1 having the touch operation device according to the third embodiment. Therefore, the configuration is not described. FIGS. 28A and 28B are flowcharts showing the main operation of the camera 1 according to the third embodiment.

The Bucom 223 performs initialization processing at system startup of the camera 1 (step S601). In step S601, for example, processing to turn off (initialize) a recording flag is performed. The recording flag is a flag that indicates whether moving images are being recorded. The recording flag that is on indicates that moving images are being recorded. The recording flag that is off indicates that moving images are not being recorded.

When the initialization processing at system startup is finished in step S601, the Bucom 223 detects accessories such as the interchangeable lens 100 connected to the camera body 200 (step S602). The Bucom 223 then detects the operation state of the operation unit 225, for example, a reproduction button (step S603).

The Bucom 223 then controls each component to perform the through-image display (step S604). The Bucom 223 determines whether the mode is a vibration display mode (step S605). The vibration display mode is a mode for transmitting information regarding the subject in the image displayed on the display unit 213 to the user by the vibration of the vibration unit 217. For example, the user operates the operation unit 225 to set whether to use the vibration display mode.

When step S605 branches to YES, the Bucom 223 performs processing in the vibration display mode (step S606). The processing in the vibration display mode will be described later in detail. On the other hand, when step S605 branches to NO, the Bucom 223 skips the processing in step S606.

The Bucom 223 then determines whether the reproduction button has been pressed in the operation unit 225 (step S607). When step S607 branches to YES, the Bucom 223 performs reproduction processing (step S608).

After the reproduction processing or when step S607 branches to NO (when the reproduction button has not been pressed), the Bucom 223 determines whether a moving image button has been pressed (step S609).

When step S609 branches to YES (when the moving image button has been pressed), the Bucom 223 inverts the recording flag (step S610). Here, whenever pressed, the moving image button alternates instructing to start the moving image photography and instructing to finish the moving image photography. Therefore, in step S610, the Bucom 223 switches on the recording flag that has been off, and switches off the recording flag that has been on.

After the recording flag is switched in step S610 or when step S609 branches to NO (when the moving image button has not been pressed), the Bucom 223 determines whether moving image is being recorded (step S611). The recording flag that is on indicates that moving image is being recorded. Thus, in this example, whether moving image is being recorded is determined by whether the recording flag is on.

When step S611 branches to NO (when moving image is not being recorded), the Bucom 223 determines whether the release button 2251 is pressed halfway (i.e. whether a first release switch that has been off is turned on) (step S612). Whether the first release switch that has been off is turned on is determined in step S612. Therefore, for example, when the on-state of the first release switch is maintained, step S612 branches to NO.

When step S612 branches to YES (when the first release switch that has been off is turned on), the Bucom 223 performs AE processing (step S613). The Bucom 223 then performs AF processing (step S614).

When step S612 branches to NO (when the first release switch that has been off is not turned on), the Bucom 223 determines whether the release button has been fully pressed (i.e. whether a second release switch that has been off is turned on) (step S615).

When step S615 branches to YES (when the second release switch is turned on), the Bucom 223 performs still image photography processing (step S616). After performing the still image photography processing, the Bucom 223 causes the image processing unit 210 to perform image processing for image data obtained via the image pickup device 204 (step S617). The Bucom 223 compresses the processed image data in the image compressing/decompressing unit 211, and records the compressed image data in the recording medium 219 as an image file of a still image (step S618).

When step S611 branches to YES (when moving images are being recorded), the Bucom 223 performs AE processing (step S619). The Bucom 223 then performs AF processing (step S620). After the AF processing, the Bucom 223 performs moving image photography (step S621). The Bucom 223 then causes the image processing unit 210 to perform image processing for image data obtained via the image pickup device 204 (step S622). The Bucom 223 then compresses the processed image data in the image compressing/decompressing unit 211, and records the compressed image data in the recording medium 219 as an image file of moving images (step S623). After the image file of the moving images has been created, the compressed image data is additionally recorded in the previously created image file before the end of the moving image photography.

When the AF processing in step S614 has been completed, when step S615 branches to NO (when the release button has not been fully pressed), or when the recording of the moving image data has been completed in step S623, the Bucom 223 determines whether the power switch of the operation unit 225 is off (step S624).

When step S624 branches to NO (when the power switch is not off), the Bucom 223 moves the processing to step S602. When step S624 branches to YES (when the power switch is off), the Bucom 223 finishes the processing in FIGS. 28A and 28B.

Figure 29:
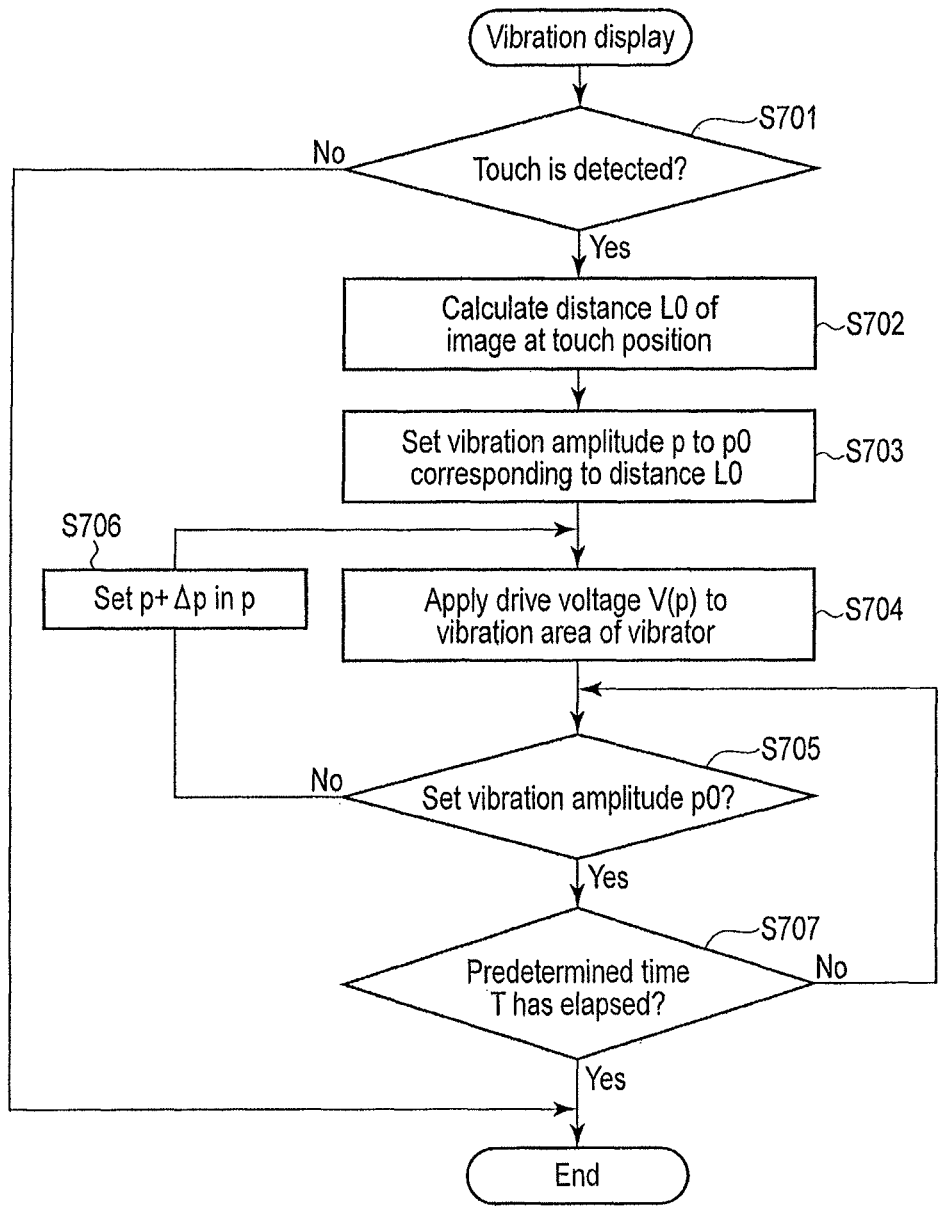
FIG. 29 is a flowchart of a vibration display mode.

FIG. 29 is a flowchart of the vibration display mode. In the vibration display mode, the Bucom 223 determines whether the user has touched the vibration unit 217 from the output signal of the vibration unit 217 (the detection layer 406) (step S701). When step S701 branches to NO (when the user has not touched), the Bucom 223 finishes the processing in FIG. 29.

When step S701 branches to YES (when the user has touched), the Bucom 223 calculates a distance L0 of the image corresponding to the touch position (step S702). As described above, the phase difference detecting element is incorporated in the image pickup device 204. Therefore, in the present embodiment, per-pixel distance information can be calculated by a known phase difference method.

After the calculation of the distance L0, the Bucom 223 sets a vibration amplitude p of the vibration unit 217 to a vibration amplitude p0 corresponding to the distance L0 (step S703). Data indicating the relation between the vibration amplitude p0 and the distance L0 is stored in, for example, the flash memory 224 as table data in advance. In the present embodiment, the table data is set, for example, so that the vibration amplitude is smaller in the case of a long distance and so that vibration amplitude is greater in the case of a short distance. The table data is set so that the vibration amplitude is smaller in the case of a long distance and so that vibration amplitude is greater in the case of a short distance. In contrast, the table data may be set so that the vibration amplitude is greater in the case of a long distance and so that vibration amplitude is smaller in the case of a short distance.

Figure 31:
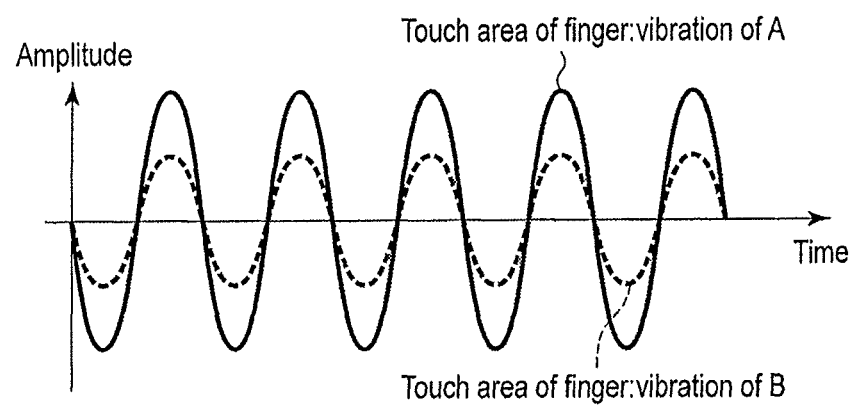
FIG. 31 is a diagram showing the comparison between vibration generated when a touch area A is touched and vibration generated when a touch area B is touched.

The Bucom 223 then controls the piezoelectric body control circuit 218 so that a drive voltage V(p) necessary to generate vibration having the vibration amplitude p0 is applied to the vibration area corresponding to the touch position in the vibration unit 217 (step S704). When the table data is set so that the vibration amplitude is smaller in the case of a long distance and so that vibration amplitude is greater in the case of a short distance, for example, the user touches in a scene having far and near parts in which a flower is located near and a mountain is located far as shown in FIG. 30. In this case, when a touch area A corresponding to the flower is touched, vibration having a greater amplitude is generated than when a touch area B corresponding to the mountain is touched. FIG. 31 is a diagram showing the comparison between vibration when the touch area A is touched and vibration when the touch area B is touched.

The Bucom 223 then determines whether the current vibration amplitude p of the vibration unit 217 is the vibration amplitude p0 set in step S703 from the output of the phase difference/amplitude detecting circuit 540 (step S705). Although the vibration amplitude is only determined here, the phase may be determined in a similar manner.

When step S705 branches to NO (when the vibration amplitude p is not the vibration amplitude p0), the Bucom 223 controls the piezoelectric body control circuit 218 so that the vibration amplitude p will be p+Δp (step S706). When the phase is determined in step S705, the phase is also adjusted in step S706.

When step S705 branches to YES (when the vibration amplitude p is the vibration amplitude p0), the Bucom 223 determines whether a predetermined time T has elapsed since the beginning of the vibration of the vibration unit 217 (step S707). When step S707 branches to NO (when the predetermined time T has elapsed), the Bucom 223 moves the processing to step S705. In this case, the vibration of the vibration unit 217 is continued. When step S707 branches to YES (when the predetermined time T has elapsed), the Bucom 223 finishes the processing in FIG. 29.

FIG. 29 shows processing during the through-image display. However, the processing similar to that in FIG. 29 may be also performed, for example, during the reproduction processing or during a rec-view display after photography. In order to perform the processing similar to that in FIG. 29 during the reproduction processing, it is necessary that the per-pixel distance information be recorded in the image file. When processing in the vibration display mode is performed during the reproduction processing, the Bucom 223 functions as the image acquiring unit.

As described above, according to the present embodiment, a tactile stimulation caused by the vibration amplitude corresponding to the distance of the subject in the displayed image is provided to the finger of the user which has touched the display device displaying this image. Thus, the user can recognize the difference of distance between subjects in images being displayed from information in ways other than visual perception. This enables quick operation without too much dependence on the screen. For the same subject, the same distance is often distributed in successive touch areas. Therefore, the rough shape of the subject and its location can also be recognized by the distribution of the distance. Moreover, the vibration unit 217 illustrated in the present embodiment is reduced in size and is able to obtain a great bending displacement. Therefore, the individual vibration areas can be reduced in size, so that the difference between a visually seen image and a tactile image can also be reduced. Thus, touching the display unit makes a sensuous appeal in ways other than visual perception, and enables operation that is performed without seeing. A sound responsive to vibration may be produced. These devices can assist the user in tactile sensation to untouchable things, and assist the user in auditory sensation. An application to a noncontact and nondestructive inspection is also possible. It is also expected that, for example, communication between a visually impaired person and a physically unimpaired person may be smoother. In the case of communication, such tactile information is transmitted and effectively confirmed by a large number of users and confirmed in remote places. In this case, the display unit and the vibration unit may be provided in different places. It is also possible to apply to photography of a visually impaired person so that this person may check his/her location of the photography using his/her smartphone.

According to the present embodiment, the amplitude and phase of vibration are adjusted by the piezoelectric body control circuit 218 so that the vibration corresponding to the distance of the subject will be generated. Consequently, it is possible to apply vibration having an amplitude corresponding to the distance to the user regardless of factors such as the strength of a touch.

Figure 32:
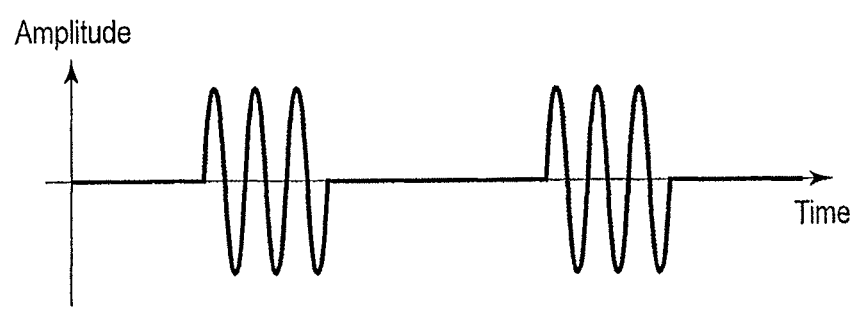
FIG. 32 is a diagram showing a modification of the change of a vibration frequency.

Here, according to the present embodiment, the vibration amplitude is changed in accordance with the distance of the subject by way of example. In contrast, for example, the frequency of the vibration may be changed. Although the vibration frequency of the vibration of the vibration unit 217 is not particularly mentioned in the present embodiment, this vibration frequency is preferably equal to or more than the upper range of the audio frequency (20 Hz to 20 kHz), or equal to or less than the lower range. More specifically, this vibration frequency is 15 kHz or more and several hundred Hz or less. However, the user may not feel the vibration if the vibration frequency is too low or too high. Therefore, burst-wave-shaped vibration shown in FIG. 32 may be generated. When a no-vibration period is separated from a high-frequency vibration period as shown in FIG. 32, the user can feel sufficient vibration even when vibration is generated at an extremely high frequency.

Various kinds of subject information other than the subject distance may correspond to the vibration amplitude. For example, the vibration amplitude may be changed in accordance with various kinds of target information such as the difference of brightness between subjects in an image, the difference of color, the presence of a face, and the sizes (difference of outline shapes) of subjects. In this case, it is necessary to provide a corresponding subject information processing unit instead of the distance information processing unit 209. Moreover, in the example described according to the present embodiment, the distance information as the subject information is calculated per pixel in an image. In contrast, subject information regarding a particular subject specified by the user may be only calculated.

When the kind and amplitude of the vibration are thus changed place by place, the target is not simply determined, and the outline can be checked by the difference of targets and distances, for example, outlines and color distributions. The user can highly correctly sense and recognize the displayed object with tactile sensation. Therefore, the user can keep the operation without seeing. The vibration may serve as sensory information, but it is important that the difference of vibrations serve as sensory information.

Therefore, the vibration unit according to the present embodiment is only one means, and can also be said to be a sensory signal generating unit, a boundary tactile information generating unit, or simply a boundary information generating unit which allows a boundary to be perceived by, for example, the difference of vibrations. There are parts intended to apply a tactile stimulation rather than vibration, which can also be referred to as tactile stimulation information or tactile information.

As a result, it is possible to obtain a two-dimensional distribution in a depth direction, three-dimensional information, and the distribution of color information while determining information obtained from the image of the target in accordance with the two-dimensional distribution of the display unit. Various situations can be determined by a small movement (amount) of the finger. In order to determine the perspective of the target solely by tactile sensation as in the actual situation, it is necessary to recognize conditions; for example, to reach and touch Mount Fuji on the background and stroke the face of a person on the front side. According to the present embodiment, these conditions can be easily checked on a display unit of a mobile device or a general device. In the microscopic world, it is possible to obtain virtual tactile information for extremely small objects as in a microscope, and obtain tactile (auditory) information from an actually untouchable small object or from a small difference. Naturally, it is also possible to obtain a tactile assist signal and perceptual assist for an image of a generally untouchable part as in an X-ray photograph, CT scan data, or an endoscopic image.

Such information regarding the distribution of a two-dimensionally arranged target specific to images may be referred to as regional information or distribution information. Such distribution information can also be obtained when a distance distribution, a color distribution, or a target is analyzed and, for example, the presence of a face, outline, contrast, brightness, and gradation are used. Read letters and coded information may be displayed in an enlarged, translated, and converted form to be easily recognized when touched.

A mountain which is invisible under a cloud may be secondarily imaged and displayed by the use of, for example, GPS information and used even if this mountain cannot be actually photographed. Thus, if an object can be two-dimensionally arranged, for example, in the form of a collage, it can be touched on a touch surface. Therefore, various applications are possible. A check that can be readily made at hand regardless of the distance is a great advantage.

In the embodiments described above, the digital camera is shown as an example of an image device. However, the technique according to the present embodiment is not only applicable to the digital camera but also applicable to various portable terminal devices such as a mobile telephone capable of displaying images. Tactile information can be obtained for a target in a noncontact manner, and this invention is also advantageous to nondestructive and non-contact image observation. Therefore, it is appreciated that this invention is applicable to medical equipment such as an endoscope for the observation of the human body, and to industrial equipment such as an inspection device and a microscope. When applied to such equipment, the invention can be used to know the situation in a remote place by information transmission. In the case of in-vehicle equipment, the eyes of a driver are not fastened to the small display unit. If the sensory signal generating unit that uses the technique according to the present embodiment is provided in a steering wheel, it is possible to check, for example, the type of a car approaching from behind, and the sexes, ages, number, and positions of the passengers. It is also possible to check, for example, the posture of a child lying on a rear seat. It is also expected that the invention is extended to a perceptual assist device for aged people having weakened visual perception and physical strength.

Fourth Embodiment

Now, the fourth embodiment of the present invention is described. The configuration shown in FIG. 2 is applied to the camera 1 having the touch operation device according to the fourth embodiment. Therefore, the configuration is not described.

When photographing a subject with the camera 1, the user grapes the camera 1, for example, with the left hand, and turns the camera 1 in a direction in which the subject is present so that the subject is brought into the imaging range of the camera 1. When the subject is in the imaging range, the user presses a release button. As a result, the subject is photographed.

According to the present embodiment, in order to guide the subject into the imaging range, the user puts, for example, a finger of the right hand in the imaging range between the camera 1 and the subject while grasping the camera 1 with the left hand, and the finger of the right hand is used as an index to bring the subject into the imaging range. In contrast, the user may put, for example, a finger of the left hand in the imaging range between the camera 1 and the subject while grasping the camera 1 with the right hand, and the finger of the left hand may be used as an index to bring the subject into the imaging range.

Figure 33:
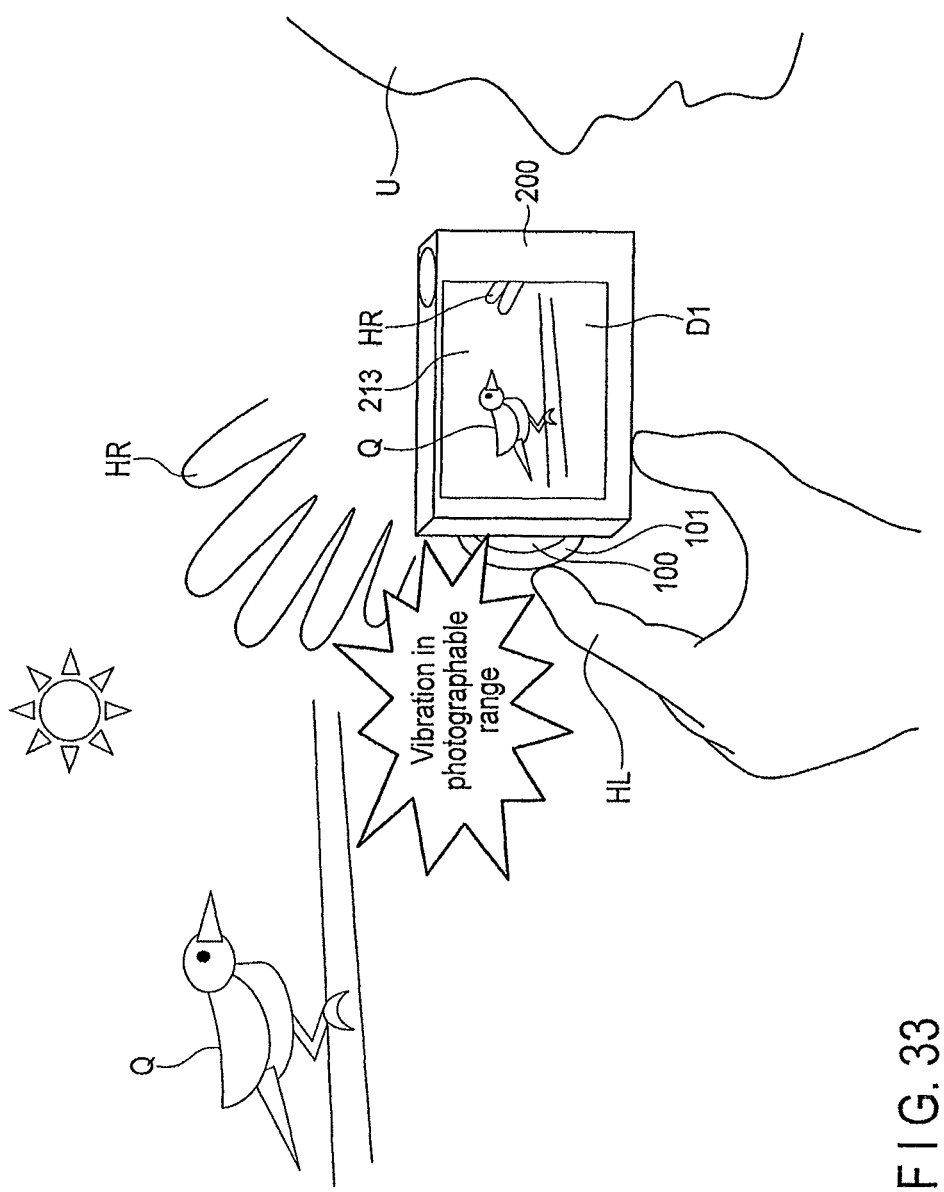
FIG. 33 is a schematic diagram showing vibration generated on the right/left (right) side to correspond to a right edge where the fingers of the right hand have intruded in the camera 1 according to the fourth embodiment.

That is, the user grasps the camera 1 with a left hand HL as shown in FIG. 33, and operates the photographic lens 101 with the left hand HL to focus on a subject Q such as a bird. The subject Q is not limited to the bird, but is any object such as a flower, a scene, a person, a structure, or a vehicle. The bird is described here by way of example.

In this condition, for example, the user intrudes a finger HR of the right hand into the imaging range between the camera 1 and the subject Q. In this case, the user puts the finger HR of the right hand at a place where the bird subject Q will come into the imaging range of the camera 1, so that the bird subject Q comes in the imaging range. Alternatively, the user may first put the finger HR of the right hand at a place where the bird subject Q will come into the imaging range of the camera 1, and the user may then place the camera 1 so that the bird subject Q will come in the imaging range through the finger HR of the right hand.

In this case, the camera 1 images the finger HR of the right hand together with the bird subject Q, so that a through-image D1 in which, for example, the finger HR of the right hand is imaged together with the bird subject Q is displayed on the display unit 213. When determining that the finger HR of the right hand is contained in the imaging range, the camera 1 notifies the user of this fact by vibration. This vibration is generated in, for example, the interchangeable lens 100 as shown in FIG. 33. The finger HR of the right hand is also indicated with the sign HR in the through-image D1 for convenience.

Figure 34:
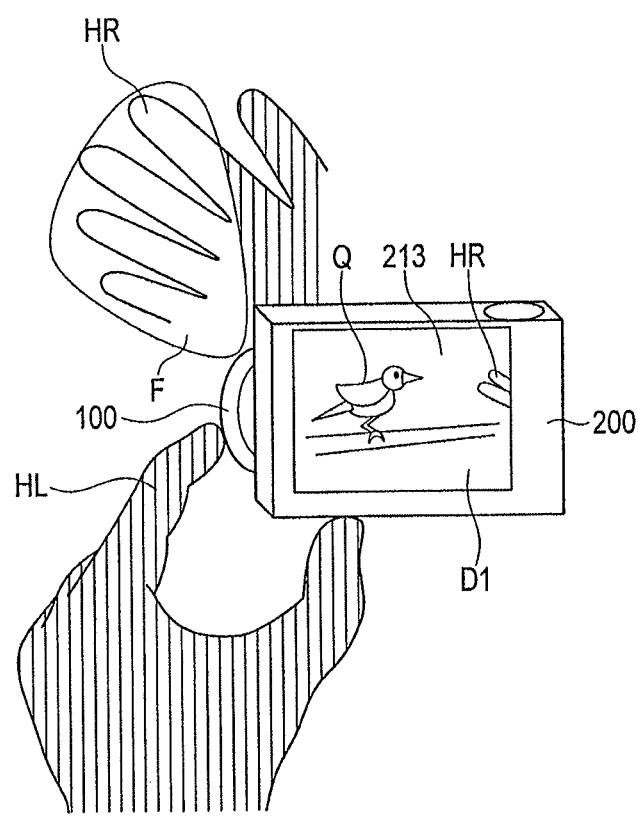
FIG. 34 is a diagram showing that the right hand has intruded from the right edge of an image on a display unit 213 in the camera 1 according to the fourth embodiment in a situation where the ambient condition for photography by a user is dark.

FIG. 34 shows a situation where the ambient condition for photography by a user U is dark. In this situation, the camera 1 emits weak light F such as spot light forward, and illuminates, for example, the finger HR of the right hand. The through-image D1 in which, for example, the finger HR of the right hand is imaged together with the bird subject Q is displayed on the display unit 213 by the illumination using the weak light F. At the same time, the camera 1 generates vibration to notify that the finger HR of the right hand is contained in the imaging range.

The part of the camera 1 where the vibration is generated corresponds to the direction of the finger HR of the right hand contained in the imaging range. For example, in FIG. 35, the finger HR of the right hand intrudes from the right edge of the image displayed on the display unit 213. In this case, the vibration is preferably generated on the right side of the interchangeable lens 100 similar to the right edge where the finger HR of the right hand has intruded as shown in FIG. 36. Even when the finger HR of the right hand has intruded from the right edge, the vibration may be generated on both the right and left sides of the interchangeable lens 100.

In FIG. 37, the finger HR of the right hand intrudes from the upper edge of the image displayed on the display unit 213. In this case, the vibration is preferably generated on the upper side of the interchangeable lens 100 similar to the upper edge where the finger HR of the right hand has intruded as shown in FIG. 38. Even when the finger HR of the right hand has intruded from the upper edge, the vibration may be generated on both the upper and lower sides of the interchangeable lens 100.

The vibration is not exclusively generated on the right, left, upper, and lower sides of the interchangeable lens 100. For example, the vibration may be generated on the upper side of the camera body 200 as shown in FIG. 39, or may be generated on the left side of the camera body 200 as shown in FIG. 40. In FIG. 39 and FIG. 40, the user is grasping the camera 1 with the left hand, and touching the touch operation device 215 formed on the display unit 213. The touch on the touch operation device 215 is determined, for example, by whether the touch area is equal to or more than a preset area, for example, 1 cm².

Figure 41A:
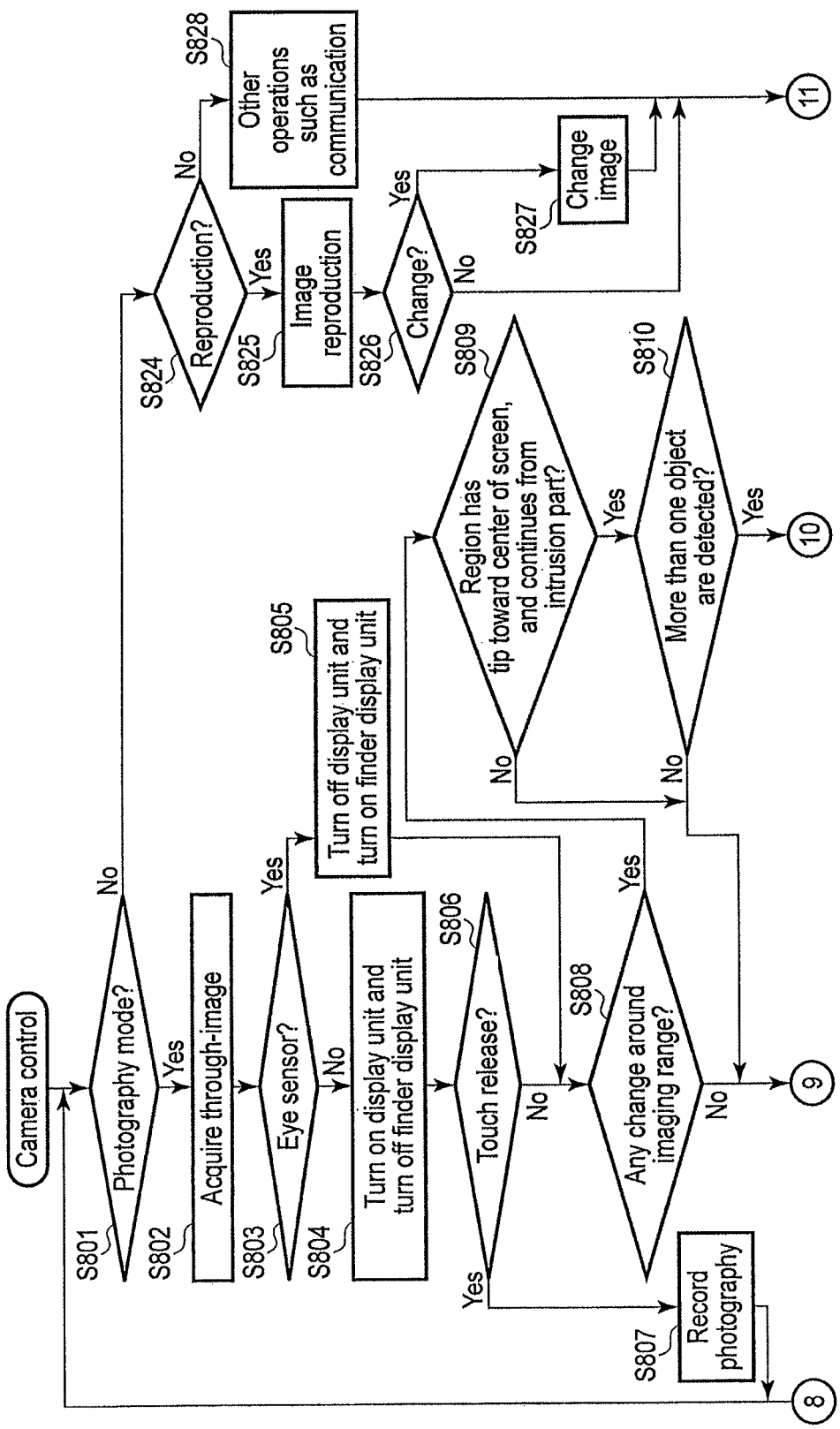
FIG. 41A and FIG. 41B are flowcharts showing the main operation of the camera 1 according to the fourth embodiment.
Figure 41B:
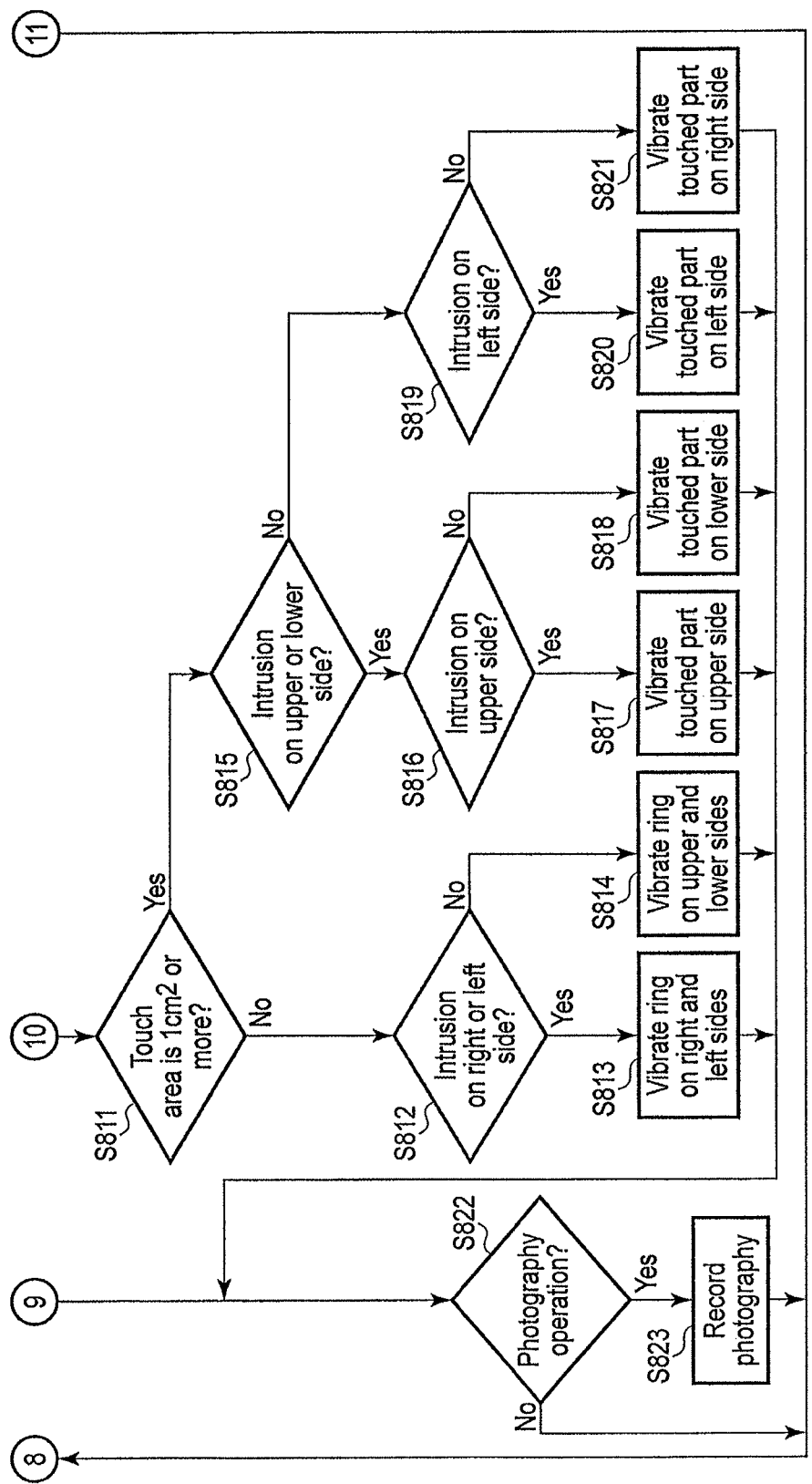

Now, the camera having the touch operation device according to the present embodiment is described with reference to flowcharts shown in FIGS. 41A and 41B. The Bucom 223 determines whether the operation mode is the photography mode (step S801). When determining that the operation mode is the photography mode, the Bucom 223 inputs an image signal corresponding to a subject image of the bird subject Q output from the image pickup device 204 to image processing unit 210. The image processing unit 210 performs image processing for this image signal, and acquires through image data (step S802). The Bucom 223 causes the display unit 213 to display the acquired image through image data as the through-image D1. If the ambient condition of the subject Q is darker than preset brightness during the display of the through-image D1, the Bucom 223 outputs a light emission instruction to the light emitting unit 236. In response to this light emission instruction, the light emitting unit 236 intermittently emits auxiliary light, and illuminates the subject Q.

The Bucom 223 determines whether the user is looking through the finder display unit 229 from a sensor signal from the eye sensor 231 (step S803). When determining that the user is not looking through the finder display unit 229, the Bucom 223 turns on the display unit 213 and displays the through-image D1, and turns off the finder display unit 229 (step S804). On the other hand, when the user is looking through the finder display unit 229, the Bucom 223 turns off the display unit 213 and turns on the finder display unit 229 to display the through-image D1 (step S805).

The Bucom 223 determines whether the camera 1 is set to the touch release (step S806). When determining that the camera 1 is set to the touch release, the Bucom 223 photographs, for example, the bird subject Q, and records the image data in the recording medium 219 when the user's touch is detected from the output of the touch detection unit 216 (step S807).

On the other hand, when the camera 1 is not set to the touch release, the Bucom 223 determines whether there is a change in the imaging range of the camera 1, for example, the edge of the through-image D1, that is, whether there is a change in the gray level at the edge of the through-image D1 (step S808). This determination shows whether some object such as the finger HR of the right hand has intruded into the imaging range between the camera 1 and the subject Q. This determination may find a thin bar-like object intruding from the outside of the screen.

When determining that there is a change in the gray level at the edge of the through-image D1, the Bucom 223 recognizes the finger of the user from the change of the image data from the outside of the imaging range. Thus, the Bucom 223 determines from the change in the gray level of the image data whether the intruding object has a tip, whether the intruding object is a bar-like object continuing from the edge of the through-image D1, and whether the bar-like object is traveling toward the center of the through-image D1 (step S809). This determination finds out that the object intruding from the outside of the imaging range is the bar-like object. This is equivalent to determining whether, for example, the finger HR of the right hand has intruded into the imaging range.

When determining that there is a change in the gray level resulting in a bar-like shape continuing from the edge of the through-image D1, the Bucom 223 determines whether there are shown more than one object having the bar-like shape (step S810). Alternatively, the finger of the user may be recognized from the change of the image data from the outside of the imaging range. For example, whether more than one finger HR of the right hand have intruded into the imaging range may be determined. One of these determinations may be used or a combination of the determinations may be used.

When determining that, for example, more than one finger HR of the right hand of the user have intruded, the Bucom 223 determines whether the touch area is equal to or more than a preset area, for example, 1 cm² (step S811). When determining that the touch area is equal to or less than the preset area, the Bucom 223 determines that the user is grasping the camera 1 with the left hand HL and that the user operates the photographic lens 101 with the left hand HL to focus on, for example, the subject Q, as shown in FIG. 33. The Bucom 223 then determines whether more than one finger HR of the right hand of the user have intruded from the right or left edge of the through-image D1 (step S812). When determining that more than one finger HR of the right hand of the user have intruded from the right or left edge of the through-image D1 as shown in FIG. 35, the Bucom 223 notifies the Lucom 108 that the fingers HR of the right hand of the user have intruded into the imaging range on both the right or left side of the interchangeable lens 100 as shown in FIG. 35. Accordingly, the Lucom 108 instructs the piezoelectric body control circuit 116 to vibrate the parts corresponding to both the right and left sides of the vibration unit 115 provided in the outer circumferential surface of the interchangeable lens 100. Accordingly, the piezoelectric body control circuit 116 vibrates the parts corresponding to both the right and left sides of the vibration unit 115 (step S813). At the same time, sound emitted by the speaker 232 may be used for the notification.

When determining that more than one finger HR of the right hand of the user have intruded from the upper edge of the through-image D1 as shown in FIG. 37, the Bucom 223 notifies the Lucom 108 that the fingers HR of the right hand of the user have intruded into the imaging range on the upper or lower side of the interchangeable lens 100 as shown in FIG. 38. Accordingly, the Lucom 108 instructs the piezoelectric body control circuit 116 to vibrate the parts corresponding to the upper and lower sides of the vibration unit 115 provided in the outer circumferential surface of the interchangeable lens 100. Accordingly, the piezoelectric body control circuit 116 vibrates the parts corresponding to both the upper and lower sides of the vibration unit 115 (step S814).

When determining in step S811 that the touch area is equal to or more than the preset touch area, the Bucom 223 determines that the user is focusing on the subject Q while grasping the camera 1 with the left hand and touching the touch operation device 215 as shown in FIG. 39 or in FIG. 40.

The Bucom 223 determines whether the fingers HR of the right hand of the user have intruded from the upper or lower side of the through-image D1 (step S815). If the user holds the camera 1 (e.g. holds the camera 1 with one hand or wears the camera 1) toward the subject and sticks out a finger of another hand, the finger sticks out from the outside of the imaging range. This may be used to recognize the finger of the user from a change of the image data from the outside of the imaging range. This does not have to be the finger, and may be represented as an image of a particular index.

When determining that the fingers HR of the right hand of the user have intruded from the upper or lower side of the through-image D1, the Bucom 223 determines whether the fingers HR of the right hand of the user have intruded from the upper side of the through-image D1 (step S816). When determining that the fingers HR of the right hand of the user have intruded from the upper side of the through-image D1, the Bucom 223 notifies the piezoelectric body control circuit 218 that the fingers HR of the right hand of the user have intruded into the imaging range on the upper side of the camera body 200 of the camera 1 as shown in FIG. 39. Accordingly, the piezoelectric body control circuit 218 vibrates the part corresponding to the upper side of the vibration unit 217 (step S817).

When determining that the fingers HR of the right hand of the user have intruded from the lower side of the through-image D1, the Bucom 223 notifies the piezoelectric body control circuit 218 that the fingers HR of the right hand of the user have intruded into the imaging range on the lower side of the camera body 200 of the camera 1. Accordingly, the piezoelectric body control circuit 218 vibrates the part corresponding to the lower side of the vibration unit 217 (step S818).

When determining in step S815 that the fingers HR of the right hand of the user have intruded from neither the upper nor lower edge of the through-image D1, the Bucom 223 determines whether the fingers HR of the right hand of the user have intruded from the left side of the through-image D1 (step S819). When determining that the fingers HR of the right hand of the user have intruded from the left side of the through-image D1, the Bucom 223 notifies the piezoelectric body control circuit 218 that the fingers HR of the right hand of the user have intruded into the imaging range on the left side of the camera body 200 of the camera 1 as shown in FIG. 40. Accordingly, the piezoelectric body control circuit 218 vibrates the part corresponding to the left side of the vibration unit 217 (step S820).

On the other hand, when determining that the fingers HR of the right hand of the user have intruded from the right side of the through-image D1, the Bucom 223 notifies the piezoelectric body control circuit 218 that the fingers HR of the right hand of the user have intruded into the imaging range on the right side of the camera body 200 of the camera 1. Accordingly, the piezoelectric body control circuit 218 vibrates the part corresponding to the right side of the vibration unit 217 (step S821).

Here, boundaries inside and outside the screen may be determined from coordinates, or may be determined in the same manner as the outline of the image. If it is possible to detect that the index image contacts or overlaps the boundary, the result can be reported to the user. A change direction (a direction that intersects at right angles with the boundary) of the changed part of the image information and a no-change direction (a direction in which the boundary continues) can be determined so that the notification result may be changed depending on how the tip of the index contacts. As a result, the boundary of the screen can be traced or searched.

The Bucom 223 then determines whether a photography operation has been performed (step S822). When determining that the photography operation has been performed, the Bucom 223 photographs, for example, the bird subject Q, and records the image data in the recording medium 219 (step S823).

When determining in step S801 that the operation mode is not the photography mode, the Bucom 223 determines whether the operation mode is the reproduction mode (step S824). IF the operation mode is the reproduction mode, the Bucom 223 reads the image data recorded in the recording medium 219, the Bucom 223 causes the display unit 213 to display an image indicating the image data (step S825). The Bucom 223 determines whether to change the image data to be reproduced (step S826). When the instruction to change the image data is input, the Bucom 223 changes the image data to be read from the recording medium 219, and displays the image indicating the changed image data on the display unit 213 (step S827). When determining in step S824 that the operation mode is not the reproduction mode, the Bucom 223 performs operations in other modes such as communication (step S828).

Thus, according to the present embodiment, it is determined from the change in the gray level of the image data whether, for example, the finger HR of the right hand of the user intrudes from the edge of the imaging range, that is, from the right and left sides or the upper and lower sides of the image data, more specifically, from the right, left, upper, or lower side of the image data. Vibration is then generated as a function of a report unit in the part of the interchangeable lens 100 or the camera body 200 corresponding to the part of the edge of the image data, for example, on the right and left sides or the upper and lower sides of the interchangeable lens 100 or the right and left sides or the upper and lower sides of the camera body 200 corresponding to the right, left, upper, or lower side of the image data. Alternatively, sound is generated by the speaker 232.

Thus, it is possible to recognize that the bird subject Q is contained in the imaging range and image the subject Q even under the ambient condition in which the image displayed on the display unit 213 cannot be checked, for example, when the ambient condition for photography is too bright, for example, when the screen of the display unit 213 to which the sunlight is directly applied is dazzling or the luminance of the image displayed on the display unit 213 is high, or on the other hand, when the ambient condition for photography is dark and the image displayed on the display unit 213 is also dark or the luminance of the image displayed on the display unit 213 is low.

Vibration is generated on the right and left sides or the upper and lower sides of the interchangeable lens 100 or the right and left sides or the upper and lower sides of the camera body 200 in accordance with the part of the edge of the imaging range into which the finger HR of the right hand of the user intrudes, for example, in accordance with the right, left, upper, or lower side of the image data. Therefore, both the intrusion of the finger HR of the right hand of the user and its direction can be checked. As a result, it is easy to obtain the timing of pressing the release button after the intrusion of the finger HR of the right hand of the user.

The notification is made not only by vibration but also by sound to ensure that the user can recognize the intrusion of the subject Q into the imaging range.

When the camera body 200 is grasped to operate the interchangeable lens 100 as shown in FIG. 33, vibration is generated in the vibration unit 115 provided in the outer circumferential surface of the interchangeable lens 100. When the camera body 200 is grasped while the display unit 213 is touched as shown in FIG. 39 or FIG. 40, vibration is generated in the corresponding part of the camera body 200. Therefore, the user can feel the vibration from the part corresponding to the condition in which the user is grasping the camera 1. This ensures that the intrusion of the subject Q into the imaging range can be reported depending on how the camera 1 is grasped.

Fifth Embodiment

Figure 42:
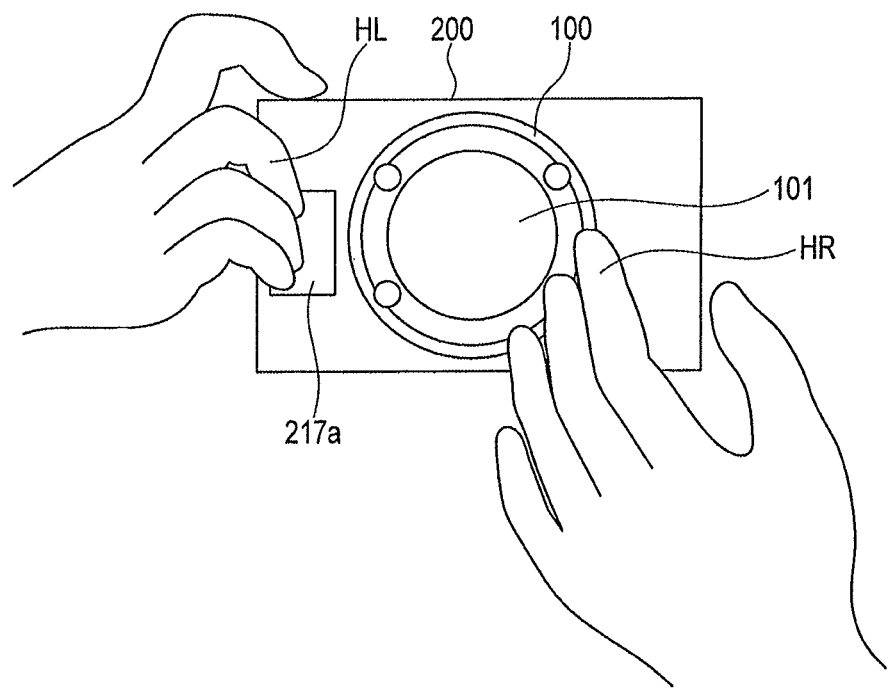
FIG. 42 is a diagram showing a vibration unit provided in a place grasped with the right hand of the user according to the fifth embodiment.

Now, the fifth embodiment of the present invention is described with reference to the drawings. The configuration of the camera 1 is basically the same as the configuration shown in FIG. 2. In the fifth embodiment, a vibration unit 217a is provided on the left side of the front surface of the camera body 200, as shown in FIG. 42. This vibration unit 217a generates vibration on the left side of the front surface of the camera body 200. As in the fourth embodiment, the vibration unit 217a vibrates, for example, when it is determined that the finger HR of the right hand of the user has intruded into the imaging range. The configuration of the vibration unit 217a is similar to that of the vibration unit 217.

Figure 43:
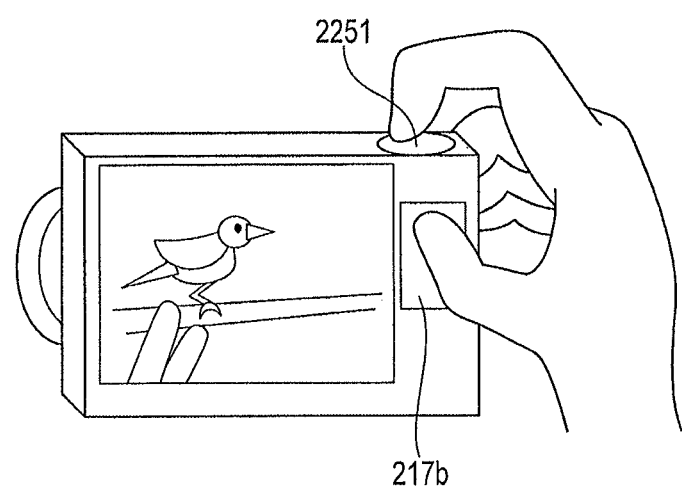
FIG. 43 is a diagram showing a vibration unit provided in a place in which the camera 1 according to the fifth embodiment is grasped with the right hand of the user and which corresponds to the press operation of a release button.

As shown in FIG. 43, a vibration unit 217b is provided on the right side of the rear surface of the camera body 200. This vibration unit 217b generates vibration on the right side of the rear surface of the camera body 200. As in the fourth embodiment, the vibration unit 217b vibrates, for example, when it is determined that the finger HR of the right hand of the user has intruded into the imaging range.

These vibration units 217a and 217b are provided in the parts grasped by the hand of the user during the use of the camera 1, that is, in the parts corresponding to a grasp portion. The vibration unit 217a is provided in the part of the camera 1 grasped by the right hand of the user as shown in FIG. 42. The vibration unit 217b is provided in the part of the camera 1 grasped when the release button 2251 is pressed by, for example, the right hand of the user as shown in FIG. 43.

In the fifth embodiment, the vibration units 217a and 217b have a first vibration pattern P1 which is a vibration pattern when, for example, the finger HR of the right hand of the user has intruded into the imaging range, and a second vibration pattern P2 which is a vibration pattern when, for example, the finger HR of the right hand of the user has contacted a subject Q such as a bird or a person in the image data. The first vibration pattern P1 and the second vibration pattern P2 are set to patterns different in, for example, the length, frequency, and magnitude of the vibration.

More specifically, as shown in FIG. 44, the user intrudes the finger HL of the left hand into the imaging range between the camera 1 and the subject Q which is a person, and puts the finger HL of the left hand in the imaging range of the camera 1 where the subject Q which is the person will come. At the same time, the vibration units 217a and 217b vibrate with the first vibration pattern P1.

When the finger HL of the left hand moves into the imaging range, the finger HL of the left hand comes into contact with the subject Q which is the person in the image data as shown in FIG. 45. At the same time, the vibration units 217a and 217b vibrate with the second vibration pattern P2.

The vibration patterns of the vibration units 217a and 217b may be set to, for example, other vibration patterns P3 and P4 depending on the determination as to whether the finger HR of the right hand of the user in the image data has contacted the face of the person which is the subject Q or the outline of the human body below the face.

Instead of the multiple vibration patterns, multiple contents of voice emitted from the speaker 232 may be set to cause vibration. For example, the contents of the voice have only to report that the index of the finger HR of the right hand of the user has intruded into the imaging range. For example, voice at a predetermined frequency may be continuously or intermittently generated. More specifically, a voice saying that "the face has come in", or "the outline of the human body below the face", for example, may be generated.

Figure 46A:
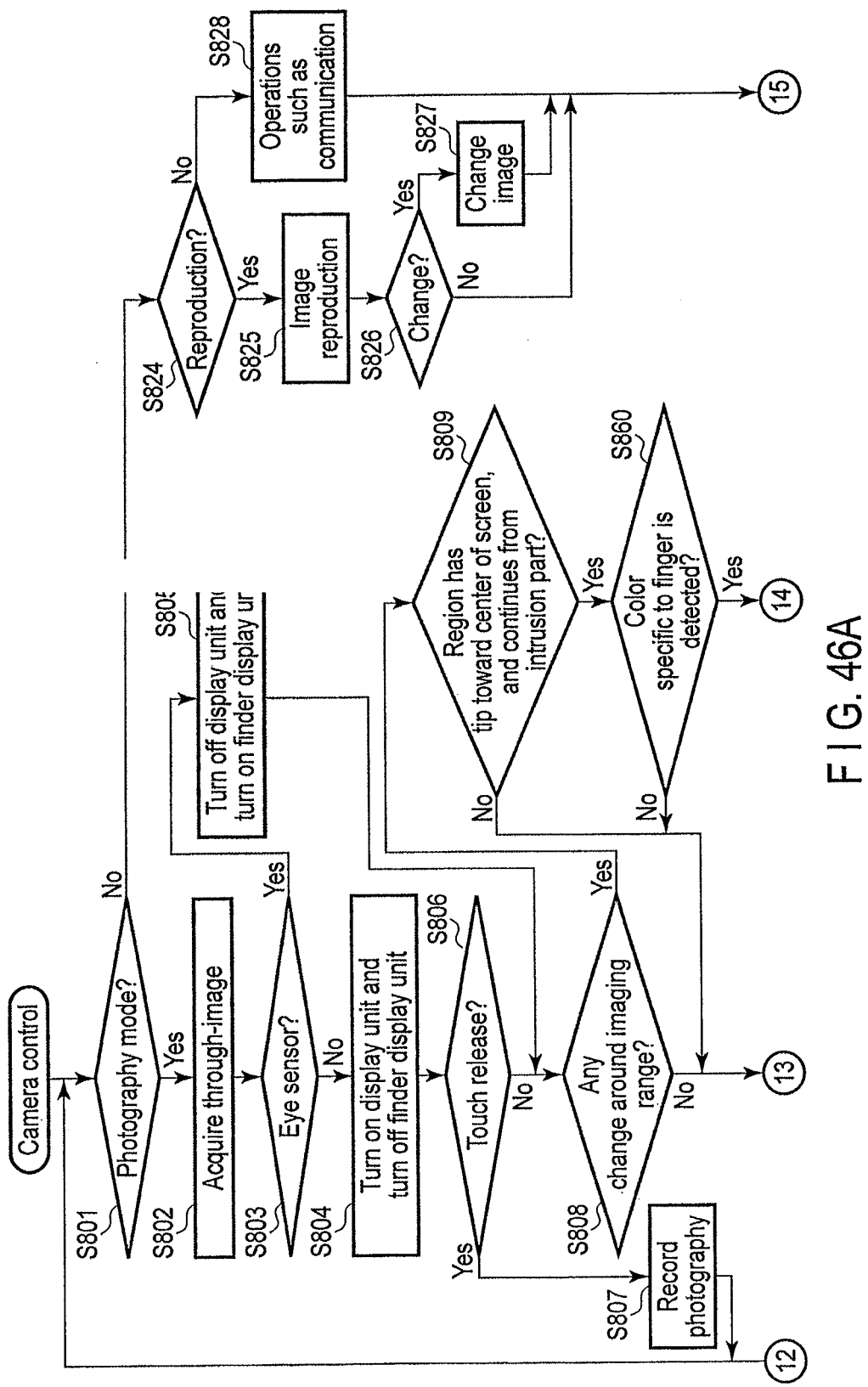
FIG. 46A and FIG. 46B are flowcharts showing the main operation of the camera 1 according to the fifth embodiment.
Figure 46B:
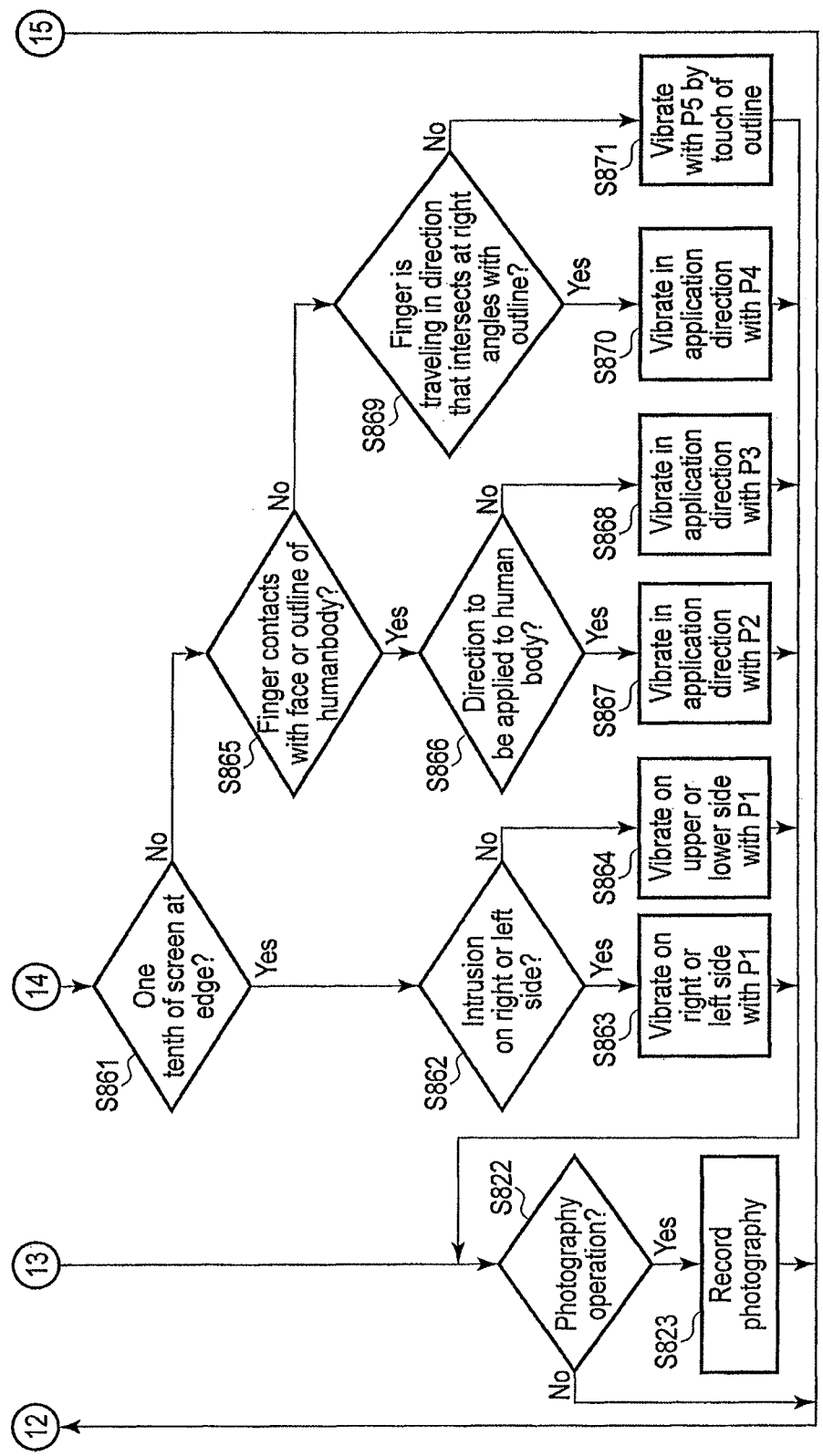

Now, the operation of the camera 1 according to the fifth embodiment is described with reference to a flowchart shown in FIGS. 46A and 46B. The same steps as the steps in the flowcharts shown in FIGS. 41A and 41B are indicated by the same step numbers, and are not described in detail.

The user is to photograph a person as the subject Q with the camera 1 as shown in FIG. 44. The Bucom 223 determines from the change in the gray level of the image data whether a region has a tip, whether the region has a bar-like shape continuing from the edge of the through-image D1, and whether the bar-like region is traveling toward the center of the through-image D1 (step S809). Naturally, the tip of an object which has intruded from the outside of the screen may be detected.

When determining that the region has a tip, the region has a bar-like shape continuing from the edge of the through-image D1, and the bar-like region is traveling toward the center of the through-image D1, the Bucom 223 determines by information regarding the through-image D1 whether the color the region which has a tip and which has a bar-like shape continuing from the edge of the through-image D1 and which is traveling toward the center of the through-image D1 is a unique color (step S860). The unique color is the color of the human skin. That is, in step S860, whether the finger HR of the right hand of the user has intruded into the imaging range is determined. This means that the finger is determined to extend from the rear of the camera 1 when the camera 1 is held toward the subject. Therefore, the finger-shaped object may be determined to stick out in the center of the image from the outside of the imaging range.

When determining that the color of the region is the unique color, the Bucom 223 determines whether the length of the bar-like region which has intruded from the edge of the through-image D1 has reached, for example, one tenth of the through-image D1 (step S861).

When determining that the length of the bar-like region has reached one tenth of the through-image D1, the Bucom 223 determines whether the fingers HR of the right hand of the user have intruded from the right or left edge of the through-image D1 (step S862). Naturally, one finger is also possible. The region may be a pencil or a pointing rod intruding into the center of the screen from the periphery of the screen. That is, it can be said to be an image of a particular index. When determining that the fingers HL of the left hand of the user have intruded from the left edge of the through-image D1 as shown in FIG. 44, the Bucom 223 notifies the Lucom 108 that the fingers HL of the left hand of the user have intruded into the imaging range on the right or left side of the interchangeable lens 100. Accordingly, the Lucom 108 instructs the piezoelectric body control circuit 116 to vibrate the part corresponding to the right or left side of the vibration unit 115 provided in the outer circumferential surface of the interchangeable lens 100 with the first vibration pattern P1. Accordingly, the piezoelectric body control circuit 116 vibrates the part corresponding to the right or left side of the vibration unit 115 with the first vibration pattern P1 (step S863).

When determining that the fingers HR of the right hand of the user have intruded from the upper or lower edge of the through-image D1, the Bucom 223 notifies the Lucom 108 that the fingers HL of the left hand of the user have intruded into the imaging range on the upper or lower side of the interchangeable lens 100. Accordingly, the Lucom 108 instructs the piezoelectric body control circuit 116 to vibrate the part corresponding to the upper or lower side of the vibration unit 115 provided in the outer circumferential surface of the interchangeable lens 100 with the first vibration pattern P1. Accordingly, the piezoelectric body control circuit 116 vibrates the part corresponding to the upper or lower side of the vibration unit 115 with the first vibration pattern P1 (step S864).

When determining in step S861 that the length of the bar-like region has not reached, for example, one tenth of the through-image D1, the Bucom 223 recognizes the face of the person from the through-image D1, for example, in accordance with the locations of the eyes, nose, and mouth, and also recognizes the outline of the human body below the face. The Bucom 223 then determines whether the finger HR of the right hand of the user contacts the face of the person which is the subject Q or the outline of the human body in accordance with the traveling direction of the fingers HR of the right hand of the user as shown in FIG. 45 (step S865).

When determining that the finger HR of the right hand of the user contacts the face of the person which is the subject Q or the outline of the human body, the Bucom 223 determines whether the traveling direction of the finger HR is to be applied to human body (step S866). When determining that the traveling direction of the finger HR is to be applied to human body, the Bucom 223 notifies the piezoelectric body control circuit 218 that the finger HR of the right hand of the user contacts the face of the person which is the subject Q or the outline of the human body. Accordingly, the piezoelectric body control circuit 218 vibrates the vibration unit 217a or 217b with the second vibration pattern P2 (step S867).

When determining in step S865 that the traveling direction of the finger HR is not to be applied to human body, the Bucom 223 notifies the piezoelectric body control circuit 218 that the finger HR of the right hand of the user does not contact the face of the person which is the subject Q or the outline of the human body. Accordingly, the piezoelectric body control circuit 218 vibrates the vibration unit 217a or 217b with the third vibration pattern P3 (step S868).

When determining in step S865 that the finger HR of the right hand of the user does not contact the face of the person which is the subject Q or the outline of the human body, the Bucom 223 determines whether the finger HR of the right hand of the user is traveling in a direction that intersects at right angles with the outline of the person which is the subject Q (step S869). When determining that the finger HR of the right hand of the user is traveling in a direction that intersects at right angles with the outline of the person which is the subject Q, the Bucom 223 sends, to the piezoelectric body control circuit 218, a signal that the finger HR of the right hand of the user is traveling in a direction that intersects at right angles with the outline of the person which is the subject Q. Accordingly, the piezoelectric body control circuit 218 vibrates the vibration unit 217a or 217b with the fourth vibration pattern P4 (step S870).

If the finger HR of the right hand of the user is not traveling in a direction that intersects at right angles with the outline of the person which is the subject Q, the Bucom 223 sends, to the piezoelectric body control circuit 218, a signal that the finger HR of the right hand of the user is not traveling in a direction that intersects at right angles with the outline of the person which is the subject Q. Accordingly, the piezoelectric body control circuit 218 vibrates the vibration unit 217a or 217b with the fifth vibration pattern P5 (step S871). The outline or the like can be determined by the change of the contrast, color, and tone of the image or by the analysis of its boundary. If it is possible to detect that the coordinates of the index image contact or overlap the coordinates where a predetermined image portion such as the outline is located, the result can be reported to the user. A change direction (a direction that intersects at right angles with the outline) of the changed part of the image information and a no-change direction (a direction in which the outline continues) can be determined so that the notification result may be changed depending on how the tip of the index contacts. As a result, the boundary of the screen can be traced or searched.

Thus, according to the fifth embodiment, it is determined that, for example, the finger HR of the right hand of the user has intruded into the imaging range, or it is determined that, for example, the finger HR of the right hand of the user has contacted a subject Q such as a bird in the image data. When the finger HR of the right hand of the user has intruded into the imaging range, the vibration unit 217a or 217b is vibrated with the first vibration pattern P1. When the finger HR of the right hand of the user has contacted a subject Q such as a bird or a person in the image data, the vibration unit 217a or 217b is vibrated with the second vibration pattern P2. The vibration patterns of the vibration units 217a and 217b are set to, for example, the other vibration patterns P3 and P4 depending on the determination as to whether the finger HR of the right hand of the user contacts the face of the person which is the subject Q in accordance with the traveling direction of the fingers HR of the right hand of the user or whether the finger HR of the right hand of the user contacts the outline of the human body below the face (the coordinates of the index image newly contact or overlap the imaging result of the coordinates where a predetermined image portion of the face or the human body previously detected is located). Consequently, advantageous effects similar to those according to the fourth embodiment are provided. Moreover, the vibration patterns P3 and P4 make it possible to recognize, without the influence of the brightness of the ambient condition, the determination as to whether the finger HR of the right hand of the user contacts the face of the person which is the subject Q or whether the finger HR of the right hand of the user contacts the outline of the human body below the face.

It is also possible to recognize that the subject Q is present between the right and left sides of the image data or between the upper and lower sides by changing the vibration pattern in accordance with the part where the finger HR of the right hand of the user intrudes, for example, in accordance with one of the right, left, upper, and lower sides of the image data.

If not only the vibration pattern but also the sound emitted from the speaker 232 is changed, the user can recognize that the subject Q is present between the right and left sides of the image data or between the upper and lower sides only by listening to the sound, and the user does not need to always check the image displayed on the display unit 213. As a result, the user can ascertain that the subject Q is present by hanging the camera 1 around the neck and listening to the sound, and photography can be easily performed without the use of the finder.

Sixth Embodiment

Now, the sixth embodiment of the present invention is described with reference to the drawings. The configuration of the camera 1 is basically the same as the configuration shown in FIG. 2. In the sixth embodiment, when set to the reproduction mode and a tactile mode, the Bucom 223 reads the image data recorded in the recording medium 219, and causes the display unit 213 to display an image indicating the image data. During this reproduction mode, the Bucom 223 determines the track of an index moving in the imaging range, for example, a marker grasped by the user with the right hand. If it is determined in this case that, for example, the track of the finger HR of the right hand of the user is correlated with the reproduced image data, a report corresponding to this correlation is performed.

Figure 47:
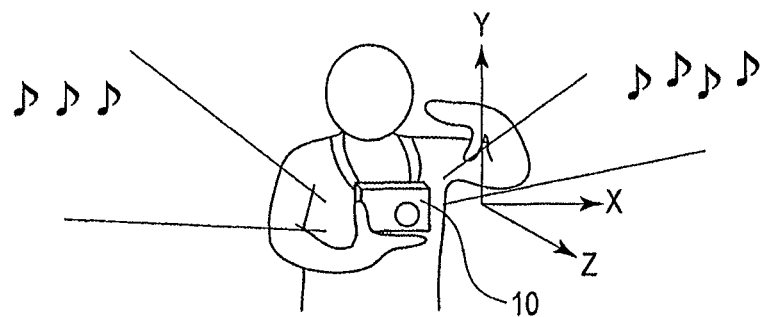
FIG. 47 is a diagram showing how the camera hung around the user's neck, a spectacle-type camera, or a head-mounted camera is used for image reproduction according to the sixth embodiment.

The camera 1 according to the sixth embodiment can be, for example, hung around the user's neck as shown in FIG. 47, or can be applied to a spectacle-type camera or a head-mounted camera. In the tactile mode, the Bucom 223 determines, for example, the track of a marker M grasped by the user with the right hand, and finds the coordinates of this track. The coordinates of the track of this marker M have an origin G located on, for example, the lower left coordinates of the image data during the reproduction mode.

Now, the operation of the camera 1 according to the present embodiment is described with reference to a flowchart. During the reproduction mode, the Bucom 223 reads the image data recorded in the recording medium 219 (step S901). The Bucom 223 determines whether the operation mode is set to the tactile mode (step S902). When determining that the operation mode is set to the tactile mode, the Bucom 223 performs the through-image display (step S903).

The Bucom 223 determines an image of a particular index by whether there is a change in the imaging range, for example, the edge of the through-image D1, that is, by whether there is a change in the gray level of the edge of the through-image D1 (step S904). When determining that there is a change in the gray level of the edge of the through-image D1, the Bucom 223 determines from the change in the gray level of the image data whether a region has a tip, whether the region has a bar-like shape continuing from the edge of the through-image D1, and whether the bar-like region is traveling toward the center of the through-image D1 (step S905). This determination finds out whether, for example, the finger HR of the right hand of the user has intruded into the imaging range. The tip of this finger HR may be determined to have a finger shape, and the round portion at the tip may be determined separately from the straight portion extending from the nail to the root of the finger, or a first joint may be determined to be the tip. Since the tip cannot be detected outside the imaging unit, whether the round tip of the finger having the nail has intruded may be determined.

When determining that the finger HR of the right hand of the user has intruded into the imaging range, the Bucom 223 determines whether there are shown changes in the gray level resulting in a bar-like shape, that is, whether the fingers HR of the right hand of the user have intruded into the imaging range (step S906).

Figure 48:
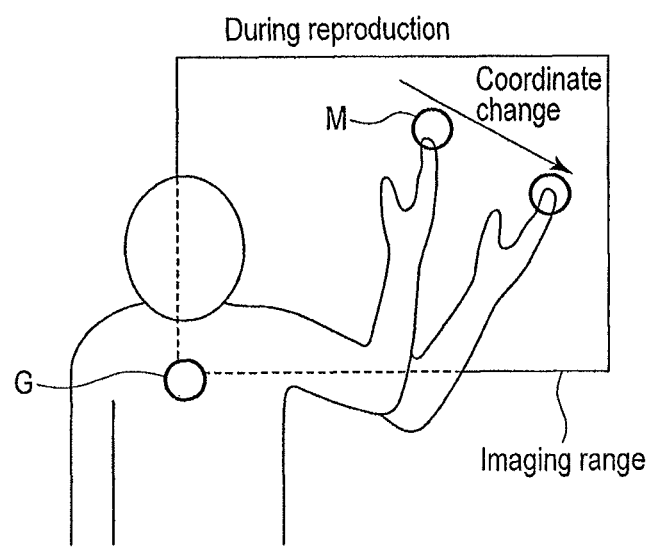
FIG. 48 is a diagram showing the determination of the track of, for example, a marker M in a tactile mode in the camera 1 according to the sixth embodiment.

When determining that the fingers HR of the right hand of the user have intruded into the imaging range, the Bucom 223 determines, for example, the coordinates of the fingers HR of the right hand of the user in the through-image D1 (step S907). That is, in the tactile mode, the Bucom 223 determines, for example, the track of the marker M grasped by the user with the right hand as shown in FIG. 48, and finds the coordinates of this track. In FIG. 48, the user draws the marker M grasped with the right hand, for example, straight from the upper left side to the lower right side. The Bucom 223 determines the track of the marker M drawn straight from the upper left side to the lower right side, and finds the coordinates of this track.

The Bucom 223 determines whether the coordinates of the track of the marker M drawn straight correspond to the coordinates of the contrast change part in the reproduction image data, that is, the coordinates are correlated in the reproduction image data read from the recording medium 219 in step S901 (step S908). For example, the track of the marker M drawn straight assumes the ridge of a mountain, and the subject in the reproduction image data is the mountain. In this case, the coordinates of the track of the marker M drawn straight correspond to the coordinates of the part changing in contrast which corresponds to the ridge of the mountain in the reproduction image data. The outline or the like can be determined by the change of the contrast, color, and tone of the image or by the analysis of its boundary. If it is possible to detect that the coordinates of the index image contact or overlap the coordinates where a predetermined image portion such as the outline is located, the result can be reported to the user. A change direction (a direction that intersects at right angles with the outline) of the changed part of the image information and a no-change direction (a direction in which the outline continues) can be determined so that the notification result may be changed depending on how the tip of the index contacts. As a result, the outline can be traced or searched.

When determining that the coordinates of the track of the marker M correspond to the coordinates of the contrast change part in the reproduction image data, the Bucom 223 finds the moving direction of the marker M from the coordinates of the track of the marker M, and determines whether the moving direction of the marker M intersects substantially at right angles with the direction of the contrast change part in the reproduction image data (step S909). When determining that the moving direction of the marker M intersects substantially at right angles with the direction of the contrast change part in the reproduction image data, the Bucom 223 sends an instruction to generate vibration with a vibration pattern A to the piezoelectric body control circuit 218 in order to notify that the moving direction of the marker M intersects substantially at right angles with the direction of the contrast change part in the reproduction image data, and the Bucom 223 also sends an instruction to generate a voice with a voice pattern a to the speaker 232 (step S910). Accordingly, the piezoelectric body control circuit 218 vibrates the vibration unit 217 with the vibration pattern A. The speaker 232 generates the voice with the voice pattern a.

On the other hand, if the moving direction of the marker M does not intersect substantially at right angles with the direction of the contrast change part in the reproduction image data, the Bucom 223 determines whether the moving direction of the marker M extends along the direction of the contrast change part in the reproduction image data (step S911).

When determining that the moving direction of the marker M extends along the direction of the contrast change part in the reproduction image data, the Bucom 223 sends an instruction to generate vibration with a vibration pattern B to the piezoelectric body control circuit 218 in order to notify that the moving direction of the marker M extends along the direction of the contrast change part in the reproduction image data, and the Bucom 223 also sends an instruction to generate a voice with a voice pattern b to the speaker 232 (step S912). Accordingly, the piezoelectric body control circuit 218 vibrates the vibration unit 217 with the vibration pattern B. The speaker 232 generates the voice with the voice pattern b.

Figure 49:
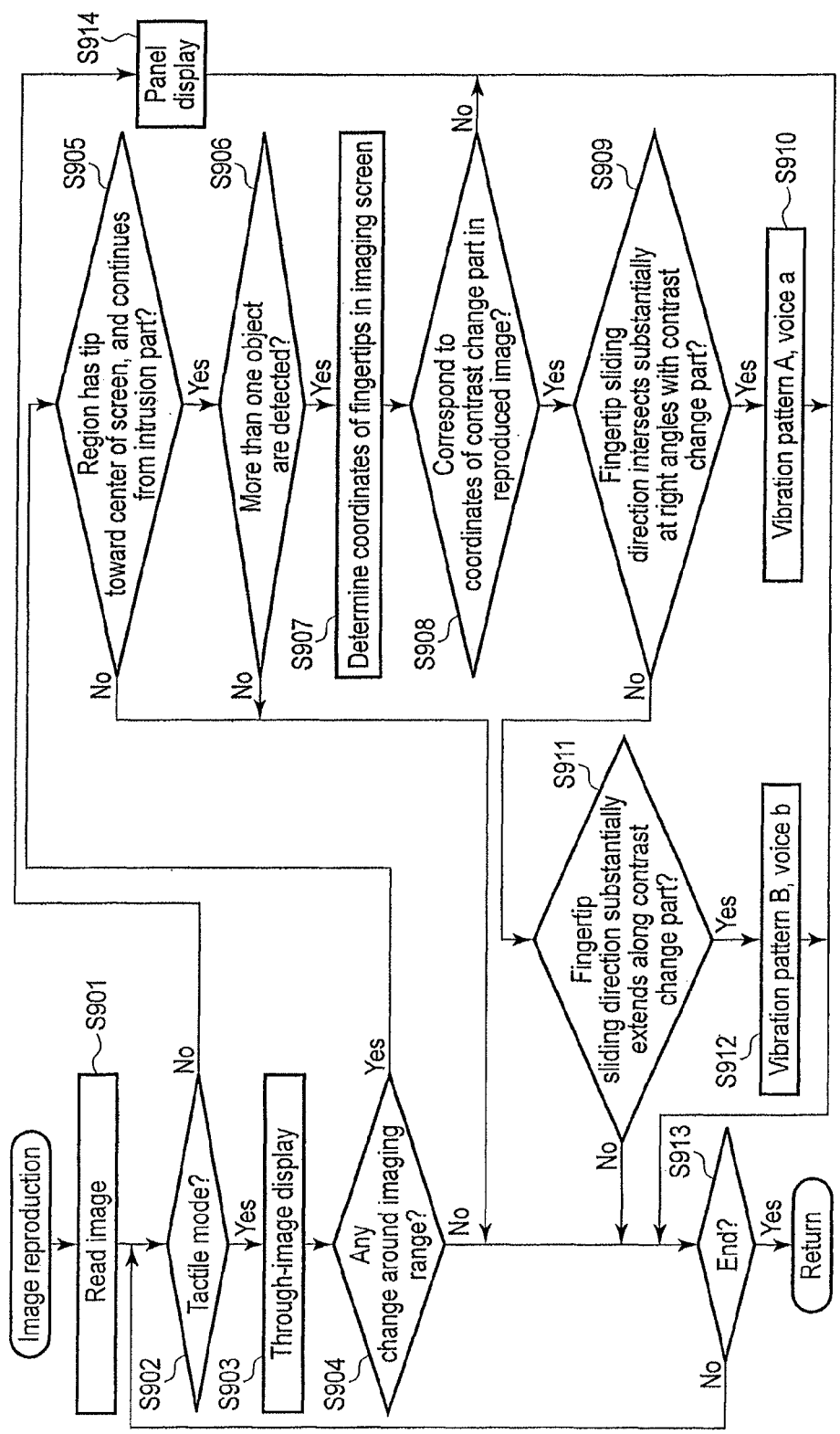
FIG. 49 is a flowchart of a reproduction mode in the tactile mode in the camera 1 according to the sixth embodiment.

After steps S904, S911, S912, and S910, Bucom 223 determines whether the reproduction is finished (step S913). When determining that the reproduction is finished, the Bucom 223 finishes the processing in FIG. 49.

Thus, according to the present embodiment, it is determined whether the coordinates of the track of the marker M correspond to, in the reproduction image data, the coordinates of the contrast change part in the reproduction image data, that is, the coordinates are correlated. Depending on whether the moving direction of the marker M intersects substantially at right angles with the direction of the contrast change part in the reproduction image data, vibration is generated with one of the different vibration patterns A and B, and a voice is generated with one of the different voice patterns a and b. Therefore, the subject Q along the direction of the marker M moved by the user can be recognized during the reproduction of the image data.

In the fourth to sixth embodiments, the vibration unit is integrated with the equipment. However, it should be appreciated that the vibration unit may be separable from the equipment and vibration may be generated by a communication. The separated vibration unit may be mounted on a finger. As a result, the touch of an image can be directly transmitted to the finger, and dependence on visual perception can be reduced. It is possible to provide a camera which enables a visually impaired person to photograph an object and check the image in a tracing manner. A target and the outline of a subject image can be determined by the change of the contrast, color, and tone of the image or by the analysis of its boundary. If it is possible to detect that the coordinates of the index image contact or overlap the coordinates where a predetermined image portion such as the outline is located, the result can be reported to the user. A change direction (a direction that intersects at right angles with the outline) of the changed part of the image information and a no-change direction (a direction in which the outline continues) can be determined so that the notification result may be changed depending on how the tip of the index contacts. As a result, the outline can be traced or searched.

A voice generating unit may be also separable, and may be a wireless or wired earphone. This makes it possible to provide wearability as in a hearing aid without nuisance to others. The camera may also be mountable on the chest or head as shown in FIG. 47 so that the whole equipment may be configured to be wearable to allow the free use of the hands. The equipment also serves as a visual aid device that can be easily used.

It is to be noted that the present invention also includes the following inventions in addition to the claimed inventions.

(1) An imaging apparatus comprising:

an imaging unit which has a preset imaging range and which images a target within the imaging range;

an index determining unit which determines whether an image of a particular index image has intruded into the imaging range;

a predetermined image detecting unit which detects a predetermined image part within the imaging range; and a notification unit which notifies that the index determining unit determines that the index image overlaps the predetermined image part.

(2) The imaging apparatus according to (1), wherein the index determining unit recognizes a finger of a user from a change of image data from an outside of the imaging range of the imaging unit and then determines that the finger is the index image.

(3) The imaging apparatus according to (1), wherein the predetermined image detecting unit detects, as the predetermined image part, a changed part of image information acquired by the imaging unit.

(4) The imaging apparatus according to (1), wherein the predetermined image detecting unit is configured to determine a change direction of a changed part of image information and a no-change direction, and the notification unit notifies in accordance with the relation between a change direction of the index image and a change direction of image information.

(5) The imaging apparatus according to (1), wherein the predetermined image detecting unit detects, as the predetermined image part, a boundary of a region in image data acquired by the imaging unit.

(6) An operation apparatus comprising:

an imaging unit which has a preset imaging range and which images a target within the imaging range;

an index determining unit which determines whether a particular index image has intruded into the imaging range; and a notification unit which generates vibration or a voice signal when the index determining unit determines that a tip of the index image overlaps a predetermined image part within the imaging range.

(7) The imaging apparatus according to (6), wherein the index determining unit recognizes a finger of a user from a change of image data from an outside of the imaging range of the imaging unit and an image shape and then determines that the finger is the index image.

(8) The imaging apparatus according to (6), wherein the predetermined image detecting unit detects, as the predetermined image part, a boundary of a region in image data acquired by the imaging unit.

(9) The imaging apparatus according to (6), wherein the predetermined image part is a changed part of image information in image data acquired by the imaging unit.

(10) The imaging apparatus according to (6), wherein the notification unit switches notification depending on whether the tip of the index image overlaps a boundary of a region in the image data acquired by the imaging unit or the tip of the index image overlaps image information in the image data acquired by the imaging unit.

(11) An operation apparatus comprising:
an imaging unit which has a preset imaging range and which images a subject within the imaging range;
an index determining unit which determines whether an index to guide the subject into the imaging range has intruded into at least the imaging range; and
a notification unit which notifies that the index determining unit determines that the index has intruded into at least the imaging range.

(12) The operation apparatus according to (11), wherein the index determining unit recognizes a finger of a user from a change of image data from an outside of the imaging range of the imaging unit, and determines whether the recognized finger overlaps a predetermined image part.

(13) The operation apparatus according to (11), wherein the notification unit notifies by at least one of vibration and sound that the index has intruded into at least the imaging range.

(14) The operation apparatus according to (11), wherein the imaging unit images the subject and then outputs image data including the subject,
the index determining unit determines that the index has intruded into the imaging range or determines that the index has contacted the subject in the image data, and
the notification unit performs the notification by at least one of the vibration and the sound when the index determining unit determines that the index has intruded into at least the imaging range or that the index has contacted the subject in the image data.

(15) The operation apparatus according to (11), wherein the index determining unit determines a direction in which the index intrudes into the imaging range or a direction in which the index contacts the subject in the image data, and
the notification unit changes the kind of sound in accordance with the direction in which the index determined by the index determining unit intrudes into the imaging range or the direction in which the index contacts the subject.

(16) The imaging operation according to (11), wherein during the reproduction of image data for the subject,
the index determining unit determines a track of the index which moves within the imaging range, and
the notification unit notifies that the track of the index determined by the index determining unit is related to the reproduced image data.

(17) A target checking method comprising:
imaging a target within an imaging range;
determining whether an image of a particular index has intruded into the imaging range; and
notifying that the index image is determined to overlap a predetermined image part within the imaging range.

(18) The method according to (17), wherein the determining includes recognizing a finger of a user from a change of image data from an outside of the imaging range and then determining that the finger is the index image.

(19) The method according to (17), wherein the predetermined image part is a changed part of image information acquired by the imaging.

(20) A non-transitory storage medium storing a program, the program causing a computer to perform:
imaging by using an imaging unit;
determining whether a particular index image has intruded into an imaging range of the imaging unit;
determining the index image;
determining that a tip of the index image overlaps a predetermined image part within the imaging range; and
generating vibration or a voice signal when the overlap is determined.

(21) The storage medium according to (20), wherein the determining includes recognizing a finger of a user from a change of image data from an outside of the imaging range of the imaging unit and an image shape and then determining that the finger is the index image.

(22) The storage medium according to (20), wherein the predetermined image part is a boundary of a region acquired by the imaging unit or an image change part.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A touch operation device comprising:
a first piezoelectric layer having a piezoelectric property and flexibility;
a second piezoelectric layer having a piezoelectric property and flexibility and disposed to correspond with the first piezoelectric layer;
a touch detection layer positioned in a stacked arrangement between the first piezoelectric layer and the second piezoelectric layer piezoelectric layer and which is disposed to correspond with the first piezoelectric layer and the second piezoelectric layer, the touch detection layer detects a touch operation; and
a piezoelectric body control circuit which selectively applies a signal to a part of the first piezoelectric layer and a corresponding part of the second piezoelectric layer corresponding to the touch operation detected by the touch detection layer and then bends the part of the first piezoelectric layer and the corresponding part of the second piezoelectric layer.

2. The touch operation device according to claim 1, wherein the piezoelectric body control circuit selectively applies a signal to the part of the first piezoelectric layer and the corresponding part of the second piezoelectric layer corresponding to a particular position when a touch on a particular position is detected as the touch operation.

3. The touch operation device according to claim 2, wherein the piezoelectric body control circuit selectively applies a signal to the part of the first piezoelectric layer and the corresponding part of the second piezoelectric layer corresponding to a position which is adjacent to a position shifted from the particular position and which is adjacent to a side of the particular position when a touch on the position shifted from the particular position is detected as the touch operation.

4. The touch operation device according to claim 2, wherein the piezoelectric body control circuit sequentially applies a signal to the part of the first piezoelectric layer and the corresponding part of the second piezoelectric layer corresponding to a position which is adjacent to the particular position and which is adjacent to a side of a direction of a slide operation when the slide operation from the particular position is detected as the touch operation.

5. The touch operation device according to claim 1, wherein the first piezoelectric layer and the second piezoelectric layer each comprises:

a signal electrode formed in each part of the first piezoelectric layer and the second piezoelectric layer,
a ground electrode disposed to face each signal electrode, and
a piezoelectric body disposed between each signal electrode and the ground electrode.

6. The touch operation device according to claim 5, wherein the piezoelectric body is configured so that an L-polylactic acid layer and a D-polylactic acid layer are stacked.

7. The touch operation device of claim 1, wherein:
the first and second piezoelectric layers are divided into a plurality of first areas, each first area has a piezoelectric property and flexibility;
the touch detection layer is divided into a plurality of second areas which are disposed to correspond to the first areas of the first and second piezoelectric layers, each second area detects a touch operation; and
the piezoelectric body control circuit selectively applies the signal to at least one of the first areas of the first piezoelectric layer and at least one of the first areas of the second piezoelectric layer corresponding to the touch operation detected by at least one of the second areas of the touch detection layer and then bends the at least one first area of the first piezoelectric layer and the at least one first area of the second piezoelectric layer.

8. The touch operation device according to claim 7, wherein the piezoelectric body control circuit selectively applies a signal to the at least one first area of the first piezoelectric layer and the at least one first area of the second piezoelectric layer corresponding to a particular position when a touch on at least one of the second areas of the touch detection layer corresponding to the particular position is detected as the touch operation.

9. The touch operation device according to claim 1, wherein the touch detection layer has a neutral axis of bending when the piezoelectric body control circuit applies a signal to a part of the first piezoelectric layer and a corresponding part of the second piezoelectric layer.

10. The touch operation device according to claim 1, wherein the first piezoelectric layer is displaced in a direction opposite to the second piezoelectric layer when the piezoelectric body control circuit applies a signal to a part of the first piezoelectric layer and a corresponding part of the second piezoelectric layer.

11. The touch operation device according to claim 10, wherein the touch detection layer has a neutral axis of bending when the piezoelectric body control circuit applies a signal to a part of the first piezoelectric layer and a corresponding part of the second piezoelectric layer.

12. An information device comprising:
a touch detection layer which has detection points associated with positions of an image and which detects a touch operation on at least one of the detection points by a user;
a target specifying unit which specifies a target to be photographed or reproduced;
first and second sensory stimulation layers positioned in a stacked arrangement with the touch detection layer, with the touch detection layer disposed between the first and second sensory stimulation layers, and each of the first and second sensory stimulation layers have stimulation areas in positional relation to the detection points to provide a sensory stimulation to the user; and
a control unit which applies a signal to the first and second sensory stimulation layers to provide the sensory stimulation in accordance with positional relation between the position of the target in the image and a touch position detected by the touch detection layer.

13. The information device according to claim 12, wherein the sensory stimulation is a tactile stimulation.

14. The information device according to claim 13, wherein when the position of the target is different from the touch position, the control unit changes vibration in accordance with the difference to provide the sensory stimulation.

15. The information device according to claim 12, wherein the sensory stimulation providing unit provides the sensory stimulation by bending the touch position.

16. The information device according to claim 15, wherein when the position of the target is equal to the touch position, the control unit bends and vibrates a part of the first and second sensory stimulation layers corresponding to the touch position to provide the sensory stimulation.

17. The information device according to claim 15, wherein when the position of the target is not equal to the touch position, the control unit applies a signal to the first and second sensory stimulation layers to change a bending position of the first and second sensory stimulation layers in accordance with a shift direction between the position of the target and the touch position to provide the sensory stimulation.

18. The information device according to claim 12, further comprising a position specifying unit which specifies a position in the image,
wherein the control unit applies a signal to the first and second sensory stimulation layers to provide the sensory stimulation in accordance with positional relation between the position specified by the position specifying unit and the position of the target in the image.

19. The information device according to claim 12, wherein the target specifying unit specifies the target by voice input.

20. The information device according to claim 12, wherein the target specifying unit specifies the target by a touch operation.

21. The information device according to claim 12, further comprising an imaging unit which acquires an image of the target,
wherein the control unit searches for the position of the target in an image acquired in the imaging unit from characteristics of the image.

22. A touch operation device comprising:
first and second piezoelectric layers, each of the first and second piezoelectric layers divided into a plurality of piezoelectric areas, each piezoelectric area in the first piezoelectric layer is disposed to correspond with a corresponding piezoelectric area in the second piezoelectric layer, and each piezoelectric area having a piezoelectric property and flexibility;
a touch detection layer positioned in a stacked arrangement between the first and second piezoelectric layers and divided into a plurality of touch detection areas which are disposed to correspond to the corresponding piezoelectric areas in the first and second piezoelectric layers, each touch detection area detects a touch operation; and
a piezoelectric body control circuit which selectively applies a signal to at least one of the piezoelectric areas of the first piezoelectric layer and the at least one corresponding piezoelectric area of the second piezoelectric layer corresponding to the touch operation detected by the at least one corresponding touch detection area of the touch detection layer, and then bends the at least one piezoelectric area of the first piezoelectric layer and the at least one corresponding piezoelectric area of the second piezoelectric layer;

wherein the first piezoelectric layer is displaced in a direction opposite to the second piezoelectric layer and the touch detection layer has a neutral axis of bending when the piezoelectric body control circuit applies a signal to the at least one piezoelectric area of the first piezoelectric layer and the at least one corresponding piezoelectric area of the second piezoelectric layer.

* * * * *